(12) United States Patent
Jung et al.

(10) Patent No.: US 8,267,526 B2
(45) Date of Patent: *Sep. 18, 2012

(54) METHODS ASSOCIATED WITH RECEIVING AND TRANSMITTING INFORMATION RELATED TO PROJECTION

(75) Inventors: Edward K. Y. Jung, Bellevue, WA (US); Eric C. Leuthardt, St. Louis, MO (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 557 days.

This patent is subject to a terminal disclaimer.

(21) Appl. No.: 12/290,240

(22) Filed: Oct. 27, 2008

(65) Prior Publication Data

US 2009/0310099 A1 Dec. 17, 2009

Related U.S. Application Data

(63) Continuation-in-part of application No. 12/214,422, filed on Jun. 17, 2008, and a continuation-in-part of application No. 12/217,118, filed on Jun. 30, 2008, and a continuation-in-part of application No. 12/217,116, filed on Jun. 30, 2008, and a continuation-in-part of application No. 12/217,115, filed on Jun. 30, 2008, and a continuation-in-part of application No. 12/217,123, filed on Jun. 30, 2008, and a continuation-in-part of application No. 12/217,135, filed on Jun. 30, 2008, and a continuation-in-part of application No. 12/217,117, filed on Jun. 30, 2008, and a continuation-in-part of application No. 12/218,269, filed on Jul. 11, 2008, and a continuation-in-part of application No. 12/218,266, filed on Jul. 11, 2008, and a continuation-in-part of application No. 12/218,267, filed on Jul. 11, 2008, and a continuation-in-part of application No. 12/218,268, filed on Jul. 11, 2008, and a continuation-in-part of application No. 12/220,906, filed on Jul. 28, 2008, and a continuation-in-part of application No. 12/229,534, filed on Aug. 22, 2008, and a continuation-in-part of application No. 12/229,518, filed on Aug. 22, 2008, and a continuation-in-part of application No. 12/229,505, filed on Aug. 22, 2008, and a continuation-in-part of application No. 12/229,519, filed on Aug. 22, 2008, and a continuation-in-part of application No. 12/229,536, filed on Aug. 22, 2008, and a continuation-in-part of application No. 12/229,508, filed on Aug. 22, 2008, and a continuation-in-part of application No. 12/286,731, filed on Sep. 30, 2008, and a continuation-in-part of application No. 12/286,750, filed on Sep. 30, 2008, and a continuation-in-part of application No. 12/290,241, filed on Oct. 27, 2008.

(51) Int. Cl.
*G03B 21/14* (2006.01)
*G06F 17/00* (2006.01)
*G06F 15/16* (2006.01)
*H04N 5/64* (2006.01)
*G06G 5/00* (2006.01)

(52) U.S. Cl. ............ 353/79; 353/121; 353/122; 700/90; 348/744; 709/205; 345/619; 345/501

(58) Field of Classification Search ............... 353/79, 353/121, 122; 700/90; 348/744; 709/205; 345/619, 501
See application file for complete search history.

(56) References Cited

U.S. PATENT DOCUMENTS

| | | |
|---|---|---|
| 3,622,223 A | 11/1971 | Brakell |
| 4,012,133 A | 3/1977 | Burton |
| 4,320,664 A | 3/1982 | Rehn et al. |
| 4,684,136 A | 8/1987 | Turner |
| 4,739,567 A | 4/1988 | Cardin |
| 4,779,240 A | 10/1988 | Dorr |
| 5,026,152 A | 6/1991 | Sharkey |
| 5,469,258 A | 11/1995 | Grasso |
| 5,515,079 A | 5/1996 | Hauck |
| 5,581,783 A | 12/1996 | Ohashi |
| 5,635,725 A | 6/1997 | Cooper |
| 5,747,690 A | 5/1998 | Park et al. |
| 5,757,490 A | 5/1998 | Martin |
| 5,838,889 A | 11/1998 | Booker |
| 5,902,030 A | 5/1999 | Blanchard |
| 5,914,756 A | 6/1999 | Maeda et al. |
| 5,951,015 A | 9/1999 | Smith et al. |
| 6,002,505 A | 12/1999 | Kraenert et al. |
| 6,115,022 A | 9/2000 | Mayer, III et al. |
| 6,266,048 B1 | 7/2001 | Carau, Sr. |
| 6,272,231 B1 | 8/2001 | Maurer et al. |
| 6,310,650 B1 | 10/2001 | Johnson et al. |
| 6,310,988 B1 | 10/2001 | Flores et al. |
| 6,334,063 B1 | 12/2001 | Charlier et al. |
| 6,340,976 B1 | 1/2002 | Oguchi et al. |
| 6,362,797 B1 | 3/2002 | Dehmlow |
| 6,414,672 B2 | 7/2002 | Rekimoto et al. |
| 6,424,998 B2 * | 7/2002 | Hunter ............ 709/207 |
| 6,456,339 B1 | 9/2002 | Surati et al. |
| 6,489,934 B1 | 12/2002 | Klausner |
| 6,498,651 B1 | 12/2002 | Loil |
| 6,516,666 B1 | 2/2003 | Li |
| 6,527,395 B1 | 3/2003 | Raskar et al. |
| 6,549,487 B2 | 4/2003 | Gualtieri |
| 6,550,331 B2 | 4/2003 | Fujii et al. |
| 6,551,493 B2 | 4/2003 | Mori et al. |
| 6,554,431 B1 | 4/2003 | Binsted et al. |
| 6,563,504 B1 | 5/2003 | Rose et al. |
| 6,573,887 B1 | 6/2003 | O'Donnell, Jr. |
| 6,577,496 B1 | 6/2003 | Gioscia et al. |
| 6,595,644 B2 | 7/2003 | Kostrzewski et al. |
| 6,601,037 B1 | 7/2003 | Kolls |
| 6,611,252 B1 | 8/2003 | DuFaux |
| 6,611,253 B1 | 8/2003 | Cohen |
| 6,614,422 B1 | 9/2003 | Rafii et al. |
| 6,626,543 B2 | 9/2003 | Derryberry |
| 6,665,100 B1 | 12/2003 | Klug et al. |
| 6,675,630 B2 | 1/2004 | Challoner et al. |
| 6,708,087 B2 | 3/2004 | Matsumoto |
| 6,710,754 B2 | 3/2004 | Hanson et al. |
| 6,710,770 B2 | 3/2004 | Tomasi et al. |
| 6,727,864 B1 | 4/2004 | Johnson et al. |
| 6,733,138 B2 | 5/2004 | Raskar |
| 6,750,849 B2 | 6/2004 | Potkonen |
| 6,755,537 B1 | 6/2004 | Raskar et al. |
| 6,760,075 B2 | 7/2004 | Mayer, III et al. |
| 6,764,185 B1 | 7/2004 | Beardsley et al. |
| 6,793,350 B1 | 9/2004 | Raskar et al. |
| 6,798,401 B2 | 9/2004 | DuFaux |
| 6,802,614 B2 | 10/2004 | Haldiman |
| 6,811,264 B2 | 11/2004 | Raskar et al. |
| 6,840,627 B2 | 1/2005 | Olbrich |
| 6,857,746 B2 | 2/2005 | Dyner |
| 6,909,670 B1 | 6/2005 | Li |
| 6,919,892 B1 | 7/2005 | Cheiky et al. |
| 6,955,297 B2 | 10/2005 | Grant |
| 6,984,039 B2 | 1/2006 | Agostinelli |
| 7,013,029 B2 | 3/2006 | Keskar et al. |
| 7,016,711 B2 | 3/2006 | Kurakane |
| 7,036,936 B2 | 5/2006 | Hattori et al. |
| 7,043,987 B2 | 5/2006 | Jeong et al. |
| 7,071,924 B2 | 7/2006 | Wilbrink et al. |
| 7,088,352 B2 | 8/2006 | Wampler |
| 7,088,440 B2 | 8/2006 | Buermann et al. |
| 7,103,313 B2 | 9/2006 | Heinonen et al. |
| 7,134,078 B2 | 11/2006 | Vaarala |
| 7,151,530 B2 | 12/2006 | Roeber et al. |
| 7,151,764 B1 | 12/2006 | Heinonen et al. |
| 7,155,978 B2 | 1/2007 | Lo et al. |
| 7,159,441 B2 | 1/2007 | Challoner et al. |
| 7,173,605 B2 | 2/2007 | Fong et al. |
| 7,191,653 B2 | 3/2007 | Park et al. |
| 7,193,241 B2 | 3/2007 | Hayashi et al. |
| 7,195,170 B2 | 3/2007 | Matsumoto et al. |
| 7,209,569 B2 | 4/2007 | Boesen |
| 7,216,799 B2 | 5/2007 | Amemiya |
| 7,231,063 B2 | 6/2007 | Naimark et al. |
| 7,232,700 B1 | 6/2007 | Kubena |
| 7,239,445 B2 | 7/2007 | Pouslen |
| 7,242,388 B2 | 7/2007 | Lieberman et al. |
| 7,245,381 B2 | 7/2007 | Marino et al. |
| 7,248,151 B2 | 7/2007 | McCall |
| 7,252,002 B2 | 8/2007 | Zerbini et al. |
| 7,256,923 B2 | 8/2007 | Liu et al. |
| 7,257,255 B2 | 8/2007 | Pittel |
| 7,259,658 B2 | 8/2007 | Noguchi et al. |
| 7,266,391 B2 | 9/2007 | Warren |
| 7,270,003 B2 | 9/2007 | Sassolini et al. |
| 7,282,712 B2 | 10/2007 | Shibayama |
| 7,284,866 B2 | 10/2007 | Buchmann |
| 7,287,428 B2 | 10/2007 | Green |
| 7,290,885 B2 | 11/2007 | Salvatori et al. |
| 7,301,648 B2 | 11/2007 | Foxlin |
| 7,305,368 B2 | 12/2007 | Lieberman et al. |
| 7,328,616 B2 | 2/2008 | Won et al. |
| 7,330,269 B2 | 2/2008 | Zurn et al. |
| 7,332,717 B2 | 2/2008 | Murata et al. |
| 7,336,271 B2 | 2/2008 | Ozeki et al. |
| 7,337,669 B2 | 3/2008 | Nozoe |
| 7,350,923 B2 | 4/2008 | Olson et al. |
| 7,355,583 B2 | 4/2008 | Beardsley et al. |
| 7,355,584 B2 | 4/2008 | Hendriks et al. |
| 7,355,796 B2 | 4/2008 | Robinson |
| 7,358,986 B1 | 4/2008 | Knighton et al. |
| 7,361,899 B2 | 4/2008 | Iida |
| 7,363,816 B2 | 4/2008 | Judy et al. |
| 7,373,833 B2 | 5/2008 | Hopper et al. |
| 7,379,630 B2 | 5/2008 | Lagakos et al. |
| 7,382,599 B2 | 6/2008 | Kikuiri et al. |
| 7,460,185 B2 | 12/2008 | Saletta |
| 7,484,855 B2 | 2/2009 | Kobayashi et al. |
| 7,549,754 B2 | 6/2009 | Furui |
| 7,595,809 B2 * | 9/2009 | Widdowson ............ 345/629 |
| 7,630,522 B2 | 12/2009 | Popp et al. |
| 7,742,949 B2 | 6/2010 | Evangelist et al. |
| 7,783,892 B2 | 8/2010 | Russell et al. |
| 7,810,114 B2 | 10/2010 | Flickinger et al. |
| 7,870,592 B2 | 1/2011 | Hudson et al. |
| 7,874,679 B2 | 1/2011 | Stonier |
| 7,891,826 B2 | 2/2011 | Fujinawa et al. |
| 7,936,943 B2 * | 5/2011 | Way et al. ............ 382/274 |
| 7,967,445 B2 | 6/2011 | Hamano et al. |
| 7,980,707 B2 | 7/2011 | Murphy |
| 8,024,762 B2 | 9/2011 | Britt |
| 8,049,721 B2 | 11/2011 | Tagawa |
| 8,055,907 B2 | 11/2011 | Deem et al. |
| 2001/0000300 A1 | 4/2001 | Haile-mariam |
| 2001/0012001 A1 | 8/2001 | Rekimoto et al. |
| 2001/0024231 A1 | 9/2001 | Nakamura et al. |
| 2002/0105624 A1 | 8/2002 | Quori |
| 2003/0017846 A1 | 1/2003 | Estevez et al. |
| 2003/0038925 A1 | 2/2003 | Choi |
| 2003/0038927 A1 | 2/2003 | Alden |
| 2003/0038928 A1 | 2/2003 | Alden |
| 2003/0051256 A1 | 3/2003 | Uesaki et al. |
| 2003/0061607 A1 | 3/2003 | Hunter et al. |
| 2003/0098957 A1 | 5/2003 | Haldiman |
| 2004/0003398 A1 | 1/2004 | Donian et al. |
| 2004/0012849 A1 | 1/2004 | Cruz-Uribe et al. |
| 2004/0027539 A1 | 2/2004 | Plunkett |
| 2004/0075820 A1 | 4/2004 | Chu et al. |
| 2004/0158865 A1 | 8/2004 | Kubler et al. |
| 2004/0184010 A1 | 9/2004 | Raskar et al. |
| 2004/0184013 A1 | 9/2004 | Raskar et al. |

| | | |
|---|---|---|
| 2004/0239884 A1 | 12/2004 | Nagashima et al. |
| 2005/0036117 A1 | 2/2005 | Kobayashi |
| 2005/0046803 A1 | 3/2005 | Akutsu |
| 2005/0060210 A1 | 3/2005 | Levi et al. |
| 2005/0068501 A1 | 3/2005 | Nonaka et al. |
| 2005/0076372 A1 | 4/2005 | Moore et al. |
| 2005/0091671 A1 | 4/2005 | Deem et al. |
| 2005/0117130 A1 | 6/2005 | Bohn et al. |
| 2005/0153759 A1 | 7/2005 | Varley |
| 2005/0153760 A1 | 7/2005 | Varley |
| 2005/0179875 A1 | 8/2005 | Aoyanagi |
| 2005/0184958 A1 | 8/2005 | Gnanamgari et al. |
| 2005/0219467 A1 | 10/2005 | Nomizo et al. |
| 2005/0237492 A1 | 10/2005 | Shinozaki |
| 2005/0240417 A1 | 10/2005 | Savage |
| 2005/0253776 A1 | 11/2005 | Lee et al. |
| 2005/0259084 A1 | 11/2005 | Popovich et al. |
| 2005/0259231 A1 | 11/2005 | Salvatori et al. |
| 2005/0280628 A1 | 12/2005 | Adams et al. |
| 2006/0001543 A1 | 1/2006 | Raskar et al. |
| 2006/0017890 A1 | 1/2006 | Inazumi |
| 2006/0020515 A1 | 1/2006 | Lee et al. |
| 2006/0028624 A1 | 2/2006 | Kaise et al. |
| 2006/0038814 A1 | 2/2006 | Rivera |
| 2006/0038965 A1 | 2/2006 | Hennes |
| 2006/0044513 A1 | 3/2006 | Sakurai |
| 2006/0059002 A1 | 3/2006 | Shibata et al. |
| 2006/0066564 A1 | 3/2006 | Yee et al. |
| 2006/0075019 A1 | 4/2006 | Donovan et al. |
| 2006/0095515 A1* | 5/2006 | Forstadius ............... 709/205 |
| 2006/0103811 A1 | 5/2006 | May et al. |
| 2006/0129551 A1 | 6/2006 | Teicher |
| 2006/0158623 A1 | 7/2006 | Kobayashi et al. |
| 2006/0164526 A1 | 7/2006 | Suzuki et al. |
| 2006/0170875 A1 | 8/2006 | Falck et al. |
| 2006/0170885 A1 | 8/2006 | Kitahara |
| 2006/0171008 A1 | 8/2006 | Mintz et al. |
| 2006/0184977 A1 | 8/2006 | Mueller et al. |
| 2006/0187421 A1 | 8/2006 | Hattori et al. |
| 2006/0198550 A1* | 9/2006 | Jung et al. ............... 382/113 |
| 2006/0234784 A1 | 10/2006 | Reinhorn |
| 2006/0256076 A1 | 11/2006 | Liou et al. |
| 2006/0266135 A1 | 11/2006 | Nishikawa et al. |
| 2006/0271486 A1 | 11/2006 | Cross et al. |
| 2007/0005450 A1 | 1/2007 | Krishnamoorthy et al. |
| 2007/0024580 A1 | 2/2007 | Sands et al. |
| 2007/0024763 A1 | 2/2007 | Chung |
| 2007/0075982 A1 | 4/2007 | Morrison et al. |
| 2007/0085977 A1 | 4/2007 | Fricke et al. |
| 2007/0091278 A1 | 4/2007 | Zakoji et al. |
| 2007/0103652 A1 | 5/2007 | Nijim et al. |
| 2007/0106950 A1 | 5/2007 | Hutchinson et al. |
| 2007/0109500 A1 | 5/2007 | Kobori et al. |
| 2007/0109505 A1 | 5/2007 | Kubara et al. |
| 2007/0109509 A1 | 5/2007 | Lee |
| 2007/0115440 A1 | 5/2007 | Wiklof et al. |
| 2007/0178973 A1 | 8/2007 | Camhi |
| 2007/0188450 A1 | 8/2007 | Hernandez et al. |
| 2007/0199108 A1 | 8/2007 | Angle et al. |
| 2007/0220575 A1 | 9/2007 | Cooper et al. |
| 2007/0242033 A1 | 10/2007 | Cradick et al. |
| 2007/0242233 A1 | 10/2007 | Sokeila et al. |
| 2007/0247422 A1 | 10/2007 | Vertegaal et al. |
| 2007/0266412 A1 | 11/2007 | Trowbridge et al. |
| 2007/0273842 A1 | 11/2007 | Morrison et al. |
| 2007/0273848 A1 | 11/2007 | Fan et al. |
| 2008/0036969 A1 | 2/2008 | Otsuka et al. |
| 2008/0060014 A1 | 3/2008 | Bentley et al. |
| 2008/0066111 A1 | 3/2008 | Ellis et al. |
| 2008/0079752 A1 | 4/2008 | Gates et al. |
| 2008/0121701 A1 | 5/2008 | Gabriel |
| 2008/0129647 A1 | 6/2008 | Canova |
| 2008/0168523 A1 | 7/2008 | Ansari et al. |
| 2008/0183820 A1 | 7/2008 | Golovchinsky et al. |
| 2008/0192017 A1 | 8/2008 | Hildebrandt et al. |
| 2008/0212039 A1 | 9/2008 | Taylor |
| 2008/0224251 A1 | 9/2008 | Troost et al. |
| 2008/0256453 A1 | 10/2008 | Fein et al. |
| 2008/0291213 A1 | 11/2008 | Bhogal et al. |
| 2008/0319857 A1 | 12/2008 | Dobbins et al. |
| 2009/0019078 A1 | 1/2009 | Chisholm et al. |
| 2009/0037382 A1 | 2/2009 | Ansari et al. |
| 2009/0051961 A1 | 2/2009 | Ohsawa |
| 2009/0070276 A1 | 3/2009 | Kodimer et al. |
| 2009/0070881 A1 | 3/2009 | Yellepeddy et al. |
| 2009/0079945 A1 | 3/2009 | Klosowiak et al. |
| 2009/0088204 A1 | 4/2009 | Culbert et al. |
| 2009/0091714 A1 | 4/2009 | Aufranc et al. |
| 2009/0096994 A1 | 4/2009 | Smits |
| 2009/0117846 A1 | 5/2009 | Mavrakakis |
| 2009/0136212 A1 | 5/2009 | Klein |
| 2009/0150947 A1 | 6/2009 | Soderstrom |
| 2009/0181645 A1 | 7/2009 | Chan et al. |
| 2009/0186700 A1 | 7/2009 | Konkle |
| 2009/0217320 A1 | 8/2009 | Aldrey |
| 2009/0295712 A1 | 12/2009 | Ritzau |
| 2009/0310099 A1 | 12/2009 | Jung et al. |
| 2009/0310101 A1 | 12/2009 | Jung et al. |
| 2009/0310102 A1 | 12/2009 | Jung et al. |
| 2009/0311965 A1* | 12/2009 | Jung et al. ............... 455/66.1 |
| 2009/0316671 A1 | 12/2009 | Rolf et al. |
| 2010/0082743 A1 | 4/2010 | Zeng et al. |
| 2011/0255059 A1 | 10/2011 | Furui |

FOREIGN PATENT DOCUMENTS

| | | |
|---|---|---|
| JP | 2005-165129 A | 6/2005 |
| WO | WO 2006/027855 A1 | 3/2006 |
| WO | WO 2006/040725 A1 | 4/2006 |
| WO | WO 2007/111382 A1 | 10/2007 |

OTHER PUBLICATIONS

Allen, Danny; "Before Nikon's S1000pj: The Cine-Twin Was the First Camera/Projector Hybrid"; printed on Nov. 25, 2009; pp. 1-2; gizmodo.com; located at http://gizmodo.com/5347564/before-nikons-s1000pj-the-cine+twin-was-the-first-cameraprojector-hybrid.

Allen, Danny; "Ericsson's Spider PC Concept Projects the Keyboard and Screen"; printed on Nov. 25, 2009; pp. 1-3;gizmodo.com; located at http://gizmodo.com/5392667/ericssons-spider-pc-concept-projects-the-keyboard-and-screen.

Herrman, John; "Nikon S1000pj Projector Camera Review: Screw You All, I Love This Thing"; printed on Nov. 25, 2009; pp. 1-5; gizmodo.com; located at http://gizmodo.com/5402528/nikon-s1000pj-projector-camera-review-screw-you-all-i-love-this-thing.

Miller, Paul; "Optoma's screen-in-a-bag actually makes a lot of sense"; bearing a date of Nov. 12, 2009; printed on Nov. 25, 2009; pp. 1-5; engadget.com; located at http://www.engadget.com/2009/11/12/optomas-screen-in-a-bag-actually-makes-a-lot-of-sense.

Blass, Evan; "Hands-On With Texas Instruments' Cellphone Projector"; Engadget; Bearing a date of Sep. 20, 2007; pp. 1-7; Weblogs, Inc.; located at: http://www.engadget.com/2007/09/20/hands-on-with-texas-instruments-cellphone-projector/; printed on Apr. 10, 2008.

Browne et al.; "Using Motion Control to Guide Augmented Reality Manufacturing Systems"; Motion Control Technology; Bearing a date of 2006; pp. 1-4; ABP International, Inc.; located at: http://www.nasatech.com/motion/features/feat_1007.html; printed on May 8, 2008.

"Cell Phone With Built-in Projector"; Physorg; Bearing a date of Mar. 24, 2005; p. 1; located at: http://www.physorg.com/news3505.html; printed on Apr. 10, 2008.

"Concepts: Cellphone Projector Concept Allows Impromptu Sales Meetings"; Gizmodo; pp. 1-3; located at: http://gizmodo.com/gadgets/concepts/cellphone-projector-concept-allows-impromptu-sales-meetings-311590.php; printed on Apr. 10, 2008.

Harding, Margaret; "Futuristic Windshield Helps Drivers See the Road"; Siliconvalley.com; Bearing a date of Jul. 18, 2008; pp. 1-2; located at: http://www.siliconvalley.com/ci_9919977?IADID=Search-www.siliconvalley.com-www.siliconvalley.com; printed on Aug. 18, 2008.

"Hybrid Technology"; InterSense; p. 1; InterSense, Inc.; located at: http://www.isense.com/products.aspx?id=43; printed on May 8, 2008.

"6-DOF Tracking (IS-900, IS-1200 Product Families)"; InterSense; p. 1; InterSense, Inc.; located at: http://www.isense.com/products.aspx?id=45&; printed on May 8, 2008.

"Precision Motion Tracking Solutions"; InterSense; p. 1; InterSense, Inc.; located at: http://www.isense.com/; printed on May 8, 2008.

"Is That a Projector in Your Pocket or a . . . Cell Phone?"; Gadget Review; Bearing a date of Mar. 27, 2007; pp. 1-6; located at: http://www.gadgetreview.com/2007/03/is-that-a-projector-in-your-pocket-or-acell-phone.html; printed on Apr. 10, 2008.

Kanellos, Michael; "TI Demos Its Movie Projector in a Phone"; CNET News; Bearing a date of Mar. 26, 2007; pp. 1-2; CNET Networks, Inc.; located at: http://earthlink.com.com/TI+demos+its+movie+projector+in+a+phone/2100-1041_3-6170619.html; printed on Apr. 10, 2008.

Lagorio, Christine; "Weird Science! NYU Student Invents Virtual Girlfriend"; New York Magazine; Bearing a date of May 14, 2008; pp. 1-2; New York Media LLC; located at: http://nymag.com/daily/intel/2008/05/weird_science_nyu_student_inve.html; printed on May 15, 2008.

"LCD Projector Cell Phone Next April"; Gadget Review; Bearing a date of Apr. 13, 2006; pp. 1-6; located at: http://www.gadgetreview.com/2006/04/lcd-project-cell-phone-next-april.html; printed on Apr. 10, 2008.

Menon, Anuradha; "Flexible Computers Conform to Any Shape"; The Future of Things; Bearing a date of Jul. 3, 2008; pp. 1-3; located at: http://thefutureofthings.com/news/1222/flexible-computers-able-to-conform-any-shape.html; printed on Jul. 9, 2008.

"Micro Piezo Gyro"; Heli-Max Performance Parts; Bearing a date of 1998; pp. 1-2; located at: http://manuals.hobbico.com/hmx/hmxm1010-manual.pdf.

"Mint V10: World's Smallest Pocket Projector"; Gizmodo; Bearing a date of Aug. 18, 2008; pp. 1-3; located at: http://gizmodo.com/5031873/mint-v10-worlds-smallest-pocket-projector; printed on Aug. 18, 2008.

Mooney, Allison; "Mobile Phone Projectors"; PSFK; Bearing a date of Oct. 22, 2007; pp. 1-6; located at: http://www.psfk.com/2007/10/mobile-phone-projectors.html; printed on Apr. 10, 2008.

Murph, Darren; "3M Reveals MPro110 Pocket Projector: Ships This Month"; Engadget; Bearing a date of Sep. 13, 2008; pp. 1-5; Weblogs, Inc.; located at: http://www.engadget.com/2008/09/13/3m-reveals-mpro110-pocket-projector-ships-this-month/; printed on Sep. 22, 2008.

"Nano Projector Now in Cellphones"; Ubergizmo; Bearing a date of Jul. 2, 2007; pp. 1-4; located at: http://www.ubergizmo.com/15/archives/2007/07/nano_projector_now_in_cellphones.html; printed on Apr. 10, 2008.

"PicoP: Mobile Phone Projector From Microvision"; Planet Cell Phone Blog; Bearing a date of Sep. 23, 2006; pp. 1-9; located at: http://blog.planet-cell-phone.com/2006/9/23/picop-mobile-phone-projector-from-microvision/; printed on Apr. 10, 2008.

"Pico: Optoma to Launch 'World's First' Pico Projector in 2008"; Gizmodo; Bearing a date of Jun. 18, 2008; pp. 1-3; located at: http://gizmodo.com/5017516/optoma-to-launch-worlds-first-pico-projector-in-2008; printed on Jun. 23, 2008.

"Projectors: LG Projector Phone is Like a Media-Throwing Web Shooter"; Gizmodo; Bearing a date of Jul. 9, 2008; pp. 1-3; located at: http://gizmodo.com/5022626/lg-projector-phone-is-like-a-media+throwing-web-shooter; printed on Jul. 9, 2008.

"Projectors: 18 Super Small Projectors"; Gizmodo; Bearing a date of Aug. 18, 2008; pp. 1-3; located at: http://gizmodo.com/5031238/18-super-small-projectors; printed on Aug. 18, 2008.

Ricker, Thomas; "Video: Camera-Based Concept Turns Any Surface into a DJ Deck"; Engadget; Bearing a date of Jul. 31, 2008; pp. 1-5; Weblogs, Inc.; located at: http://www.engadget.com/2008/07/31/video-camera-based-concept-turns-any-s urface-into-a-dj-deck; printed on Aug. 18, 2008.

Sakata et al.; "Digital Annotation System for Printed Paper Documents Using Camera-Projector Systems"; ACTA Press; Bearing a date of 2007; p. 1; located at: http://www.actapress.com/Abstract.aspx?paperId=27986; printed on May 2, 2008 (Abstract Only).

"Silicon Gyroscopes"; Boeing; pp. 1-3; located at: http://www.boeing.com/defense-space/space/bss/factsheets/gyro/gyro.html; printed on Apr. 25, 2008.

Svensson, Peter; "Projectors to Magnify Cell-Phone Cinema"; Physorg; Bearing a date of Apr. 3, 2008; pp. 1-2; The Associated Press; located at: http://www.physorg.com/news126457642.html; printed on Apr. 10, 2008.

"Technology: Micro Projectors:: Nice and Steady: Vibration-Compensated Mini Projectors"; Symbian-freak; Bearing a date of Jun. 14, 2007; pp. 1-3; Symbian Freak; located at: http://www.symbian-freak.com/news/007/06/tiny_projector_nice_and_steady.htm; printed on Apr. 28, 2008.

Topolsky, Joshua; "SenseSurface Sticks Knobs Onto Screens, Turns Virtual Controls Physical"; Engadget; Bearing a date of Jul. 16, 2008; pp. 1-7; Weblogs, Inc.; located at: http://www.engadget.com/2008/07/16/sensesurface-sticks-knobs-onto-screens-turns-virtual-controls-p/; printed on Aug. 18, 2008.

Diaz, Jesus; "Is There an iPad Cinema in Your Future?"; Bearing a date of Mar. 16, 2010, printed on Mar. 19, 2010; pp. 1-2; Gizmodo.com; located at http://gizmodo.com/5494787/is-there-an-ipad-cinema-in-your-future.

Hannaford, Kat; "Pico Projector From Light Blue Optics Throws Up a 10-inch Touchscreen Laser Projection"; Bearing a date of Jan. 5, 2010, printed on Jan. 19, 2010; pp. 1-2; Gizmodo.com; located at http://gizmodo.com/5440651/pico-projector-from-light-blue-optics-throws-up-a-10+inch-touchscreen-laser-projection.

Loftus, Jack; "Dell Froot Concept Design Does Away with Keyboard, Monitor"; Bearing a date of Jan. 17, 2010, printed on Jan. 19, 2010; pp. 1-2; Gizmodo.com; located at http://gizmodo.com/5450176/dell-froot-concept-design-does-away-with-keyboard-monitor.

Diaz, Jesus; "Rear-Projection Urinal Lets You Pee Over Football Games or Bill O'Reilly"; Gizmodo; bearing a date of Aug. 10, 2009; pp. 1; located at http://gizmodo.com/5333854/; printed on Aug. 10, 2009.

Wilson, Andrew D.; Benko, Hrvoje; "Combining Multiple Depth Cameras and Projectors for Interactions on, Above, and Between Surfaces"; UIST'10; 10 total pages; bearing a date of Oct. 3-6, 2010; ACM.

U.S. Appl. No. 12/459,581, filed Mar. 18, 2010, Jung et al.
U.S. Appl. No. 12/459,580, filed Mar. 18, 2010, Jung et al.
U.S. Appl. No. 12/454,184, filed Dec. 31, 2009, Jung et al.
U.S. Appl. No. 12/380,595, filed Dec. 17, 2009, Jung et al.
U.S. Appl. No. 12/380,582, filed Dec. 17, 2009, Jung et al.
U.S. Appl. No. 12/380,571, filed Dec. 17, 2009, Jung et al.
U.S. Appl. No. 12/322,876, filed Dec. 17, 2009, Jung et al.
U.S. Appl. No. 12/322,875, filed Dec. 17, 2009, Jung et al.
U.S. Appl. No. 12/322,063, filed Dec. 17, 2009, Jung et al.
U.S. Appl. No. 12/291,025, filed Dec. 17, 2009, Jung et al.
U.S. Appl. No. 12/291,024, filed Dec. 17, 2009, Jung et al.
U.S. Appl. No. 12/291,023, filed Dec. 17, 2009, Jung et al.
U.S. Appl. No. 12/291,019, filed Dec. 17, 2009, Jung et al.
U.S. Appl. No. 12/290,241, filed Dec. 17, 2009, Jung et al.
U.S. Appl. No. 12/286,750, filed Dec. 17, 2009, Jung et al.
U.S. Appl. No. 12/286,731, filed Dec. 17, 2009, Jung et al.
U.S. Appl. No. 12/229,536, filed Dec. 17, 2009, Jung et al.
U.S. Appl. No. 12/229,534, filed Dec. 17, 2009, Jung et al.
U.S. Appl. No. 12/229,519, filed Dec. 17, 2009, Jung et al.
U.S. Appl. No. 12/229,518, filed Dec. 17, 2009, Jung et al.
U.S. Appl. No. 12/229,508, filed Jul. 21, 2011, Jung et al.
U.S. Appl. No. 12/229,505, filed Dec. 17, 2009, Jung et al.
U.S. Appl. No. 12/220,906, filed Dec. 17, 2009, Jung et al.
U.S. Appl. No. 12/218,269, filed Dec. 17, 2009, Jung et al.
U.S. Appl. No. 12/218,268, filed Dec. 17, 2009, Jung et al.
U.S. Appl. No. 12/218,267, filed Dec. 17, 2009, Jung et al.
U.S. Appl. No. 12/218,266, filed Dec. 17, 2009, Jung et al.
U.S. Appl. No. 12/217,135, filed Dec. 31, 2009, Jung et al.
U.S. Appl. No. 12/217,123, filed Dec. 17, 2009, Jung et al.
U.S. Appl. No. 12/217,118, filed Jan. 7, 2010, Jung et al.
U.S. Appl. No. 12/217,117, filed Dec. 17, 2009, Jung et al.
U.S. Appl. No. 12/217,116, filed Dec. 17, 2009, Jung et al.
U.S. Appl. No. 12/217,115, filed Dec. 17, 2009, Jung et al.
U.S. Appl. No. 12/214,422, filed Dec. 17, 2009, Jung et al.
"2010 Toyota Prius Touch Tracer Display"; KickingTires; printed on Mar. 4, 2009; pp. 1-5; located at http://blogs.cars.com/kickingtires/2009/03/2010-toyota-prius-touch-tracer-display.html.

Foo, Juniper; "MIT's 6th Sense device could trump Apple's multitouch"; Crave; bearing a date of Feb. 9, 2009; printed on Feb. 19, 2009; pp. 1-4; located at http://news.cnet.com/8301-17938_105-10159601-1.html.

Frucci, Adam; "MiLi Pro Turns Your iPhone Into a Projector"; Gizmodo; bearing a date of Jun. 26, 2009; printed on Jul. 8, 2009; pp. 1-3; located at http://gizmodo.com/5302942/mili-pro-turns-your-iphone-into-a-projector/gallery/.

Hereld, Mark et al.; "Introduction to Building Projection-based Tiled Display Systems"; pp. 1-9; Computer Science Department, University of Chicago.

June, Laura; "Toshiba announces TDP-F10U pico projector"; Engadget; bearing a date of Jan. 7, 2009; printed on Jan. 15, 2009; pp. 1-2; Weblogs, Inc.; located at: http://www.engadget.com/2009/01/07/toshiba-announces-tdp-f10u-pico-projector/.

Lam, Brian; "Bug Labs Open Source Gadgets Getting Pico Projector, 3G modules and More"; Gizmodo; bearing a date of Jan. 7, 2009; printed on Jan. 15, 2009; pp. 1-2; located at: http://i.gizmodo.com/5125563/bug-labs-open-source-gadgets-getting-pico-projector-3g-modules-and-more.

Melanson, Donald; "Apple patent filing suggests a safer in-car touchscreen"; Engadget; bearing a date of Mar. 30, 2009; printed on Apr. 10, 2009; pp. 1-8; located at http://www.engadget.com/2009/03/30/apple-patent-filing-suggests-a-safer-in-car-touchscreen/.

Melanson, Donald; "Light Blue Optics promises tough-interface pico projectors"; Engadget; bearing a date of Jun. 3, 2009; printed on Jun. 8, 2009; pp. 1-4; located at http://www.engadget.com/2009/06/03/light-blue-optics-promises-touch-interface-pico-projectors/.

Miller, Ross; "WowWee Cinemin Swivel, Stick, and Station pico PJs hands-on"; Engadget; bearing a date of Jan. 7, 2009; printed on Jan. 15, 2009; pp. 1-3; Weblogs, Inc.; located at: http://www.engadget.com/2009/01/07/wowwee-cinemin-swivel-stick-and-station-pico-pjs-hands-on/.

Murph, Darren; "TI's DLP Pico technology unveiled in new round of pico projectors"; Engadget; bearing a date of Jan. 7, 2009; printed on Jan. 15, 2009; pp. 1-2; Weblogs, Inc.; located at: http://www.enadget.com/2009/01/07/tis-dlp-pico-technology-unveiled-in-new-round-of-pico-projector/.

Nosowitz, Dan; "Official Specs and Prices for New Nikon Coolpix Line, Including Mutant Projector-Camera"; Gizmodo; bearing a date of Aug. 4, 2009; printed on Aug. 4, 2009; pp. 1-4; located at http://gizmodo.com/5329376/official-specs-and-prices-for-new-nikon-coolpix-line-including-mutant-projector+camera.

Oliver, Sam; "Apple may add micro projectors to iPhones, iPod touches"; AppleInsider; bearing a date of Jul. 6, 2009; printed on Jul. 8, 2009; pp. 1-8; located at http://www.appleinsider.com/articles/09/07/06/apple_may_add_micro_projectors_to_iphones_ipod-touches.html/.

"Rear Projection Products and Technology"; Christie Digital; printed on Feb. 13, 2009; pp. 1-2; located at http://controlrooms.christiedigital.com/Products/RearScreenTilingProjectors/.

"What is Science on a Sphere® (SOS)?"; Science on a Sphere®; printed on Mar. 4, 2009; pp. 1-2; NOAA; located at http://sos.noaa.gov/about/.

Wilson, Mark; "Logic Bolt: The US's First Projecting Cellphone"; Gizmodo; bearing a date of Jan. 8, 2009; printed on Jan. 15, 2009; pp. 1-3; located at: http://i.gizmodo.com/5126754/logic-bolt-the-uss-first-projecting-cellphone.

Wilson, Mark; "New Pico Projectors Offer DVD-Quality Resolution"; Gizmodo; bearing a date of Feb. 17, 2009; printed on Feb. 19, 2009; pp. 1; located at http://i.gizmodo.com/5155132/new-pico-projectors-offer-dvd+quality-resolution.

Lee et al.; "Automatic Projector Calibration with Embedded Light Sensors"; UIST '04; dates of Oct. 24-27, 2004; pp. 1-4; ACM.

* cited by examiner

*Primary Examiner* — Georgia Y Epps
*Assistant Examiner* — Magda Cruz

(57) ABSTRACT

The present disclosure relates to systems and methods that are related to projection. For example, in at least some embodiments, methods in accordance with the present disclosure include receiving information associated with one or more projection parameters; processing the information associated with the one or more projection parameters to generate one or more projection associated instructions; transmitting the one or more projection associated instructions; and wherein at least one of the receiving information, the processing the information, or the transmitting is performed at least partially using one or more processing devices.

45 Claims, 27 Drawing Sheets

METHODS ASSOCIATED WITH RECEIVING AND TRANSMITTING INFORMATION RELATED TO PROJECTION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/214,422, entitled SYSTEMS AND DEVICES, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 17 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,118, entitled MOTION RESPONSIVE DEVICES AND SYSTEMS, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,116, entitled SYSTEMS AND METHODS FOR PROJECTING, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,115, entitled SYSTEMS AND METHODS FOR TRANSMITTING INFORMATION ASSOCIATED WITH PROJECTING, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,123, entitled SYSTEMS AND METHODS FOR RECEIVING INFORMATION ASSOCIATED WITH PROJECTING, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,135, entitled SYSTEMS AND METHODS FOR PROJECTING IN RESPONSE TO POSITION, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,117, entitled SYSTEMS AND METHODS FOR PROJECTING IN RESPONSE TO CONFORMATION, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/218,269, entitled SYSTEMS AND METHODS FOR TRANSMITTING IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 11 Jul. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/218,266, entitled SYSTEMS AND METHODS FOR PROJECTING IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 11 Jul. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/218,267, entitled SYSTEMS AND METHODS ASSOCIATED WITH PROJECTING IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 11 Jul. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/218,268, entitled SYSTEMS AND METHODS ASSOCIATED WITH PROJECTING IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 11 Jul. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/220,906, entitled METHODS AND SYSTEMS FOR RECEIVING AND TRANSMITTING SIGNALS ASSOCIATED WITH PROJECTION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 28 Jul. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,534, entitled PROJECTION IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,518, entitled PROJECTION IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,505, entitled METHODS AND SYSTEMS FOR PROJECTING IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,519, entitled METHODS AND SYSTEMS FOR PROJECTING IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,536, entitled METHODS AND SYSTEMS FOR PROJECTING IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,508, entitled METHODS AND SYSTEMS FOR PROJECTING IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/286,731, entitled PROJECTION ASSOCIATED METHODS AND SYSTEMS, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 30 Sep. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/286,750, entitled PROJECTION ASSOCIATED METHODS AND SYSTEMS, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 30 Sep. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/290,241, entitled SYSTEMS ASSOCIATED WITH RECEIVING AND TRANSMITTING INFORMATION RELATED TO PROJECTION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 27 Oct. 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present disclosure relates to systems and methods that are related to projection.

SUMMARY

In one aspect, a method includes but is not limited to receiving information associated with one or more projection parameters, processing the information associated with one or more projection parameters to generate one or more projection associated instructions, and transmitting the one or more projection associated instructions. In addition to the foregoing, other aspects are described in the claims, drawings, and text forming a part of the present disclosure.

In one aspect, a system includes but is not limited to circuitry for receiving information associated with one or more projection parameters, circuitry for processing the information associated with one or more projection parameters to generate one or more projection associated instructions, and circuitry for transmitting the one or more projection associated instructions. In addition to the foregoing, other aspects are described in the claims, drawings, and text forming a part of the present disclosure.

In one aspect, a system includes but is not limited to means for receiving information associated with one or more projection parameters, means for processing the information associated with one or more projection parameters to generate one or more projection associated instructions, and means for transmitting the one or more projection associated instructions. In addition to the foregoing, other aspects are described in the claims, drawings, and text forming a part of the present disclosure.

In one aspect, a system includes but is not limited to a signal-bearing medium bearing one or more instructions for receiving information associated with one or more projection parameters, one or more instructions for processing the information associated with one or more projection parameters to generate one or more projection associated instructions, and one or more instructions for transmitting the one or more projection associated instructions. In addition to the foregoing, other system aspects are described in the claims, drawings, and text forming a part of the present disclosure.

In one or more various aspects, means include but are not limited to circuitry and/or programming for effecting the herein referenced functional aspects; the circuitry and/or programming can be virtually any combination of hardware, software, and/or firmware configured to effect the herein referenced functional aspects depending upon the design choices of the system designer. In addition to the foregoing, other system aspects means are described in the claims, drawings, and/or text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein referenced method aspects depending upon the design choices of the system designer. In addition to the foregoing, other system aspects are described in the claims, drawings, and/or text forming a part of the present application.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

DETAILED DESCRIPTION

Figure 1:
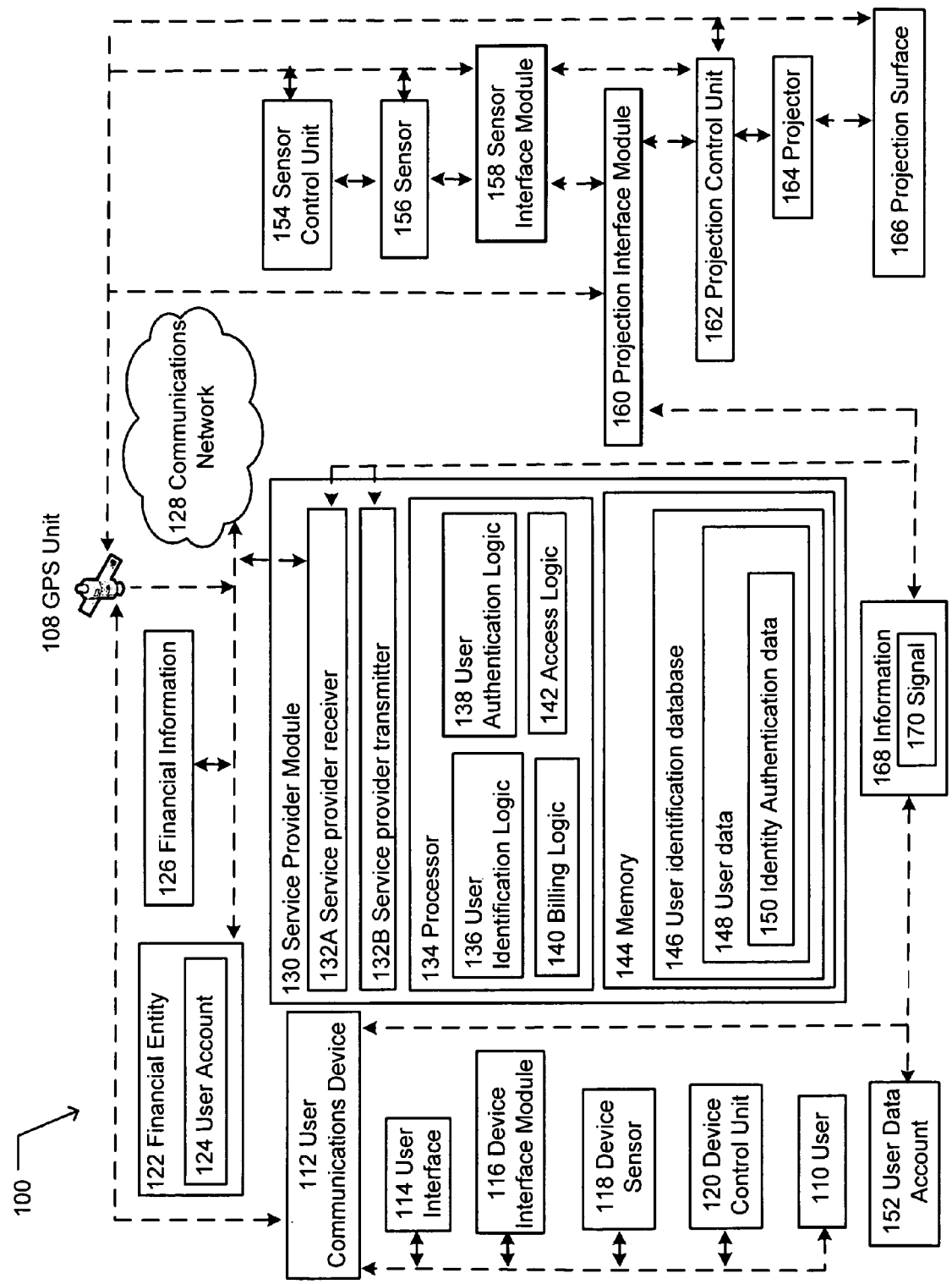
FIG. 1 illustrates an example system 100 in which embodiments may be implemented.
Figure 1A:
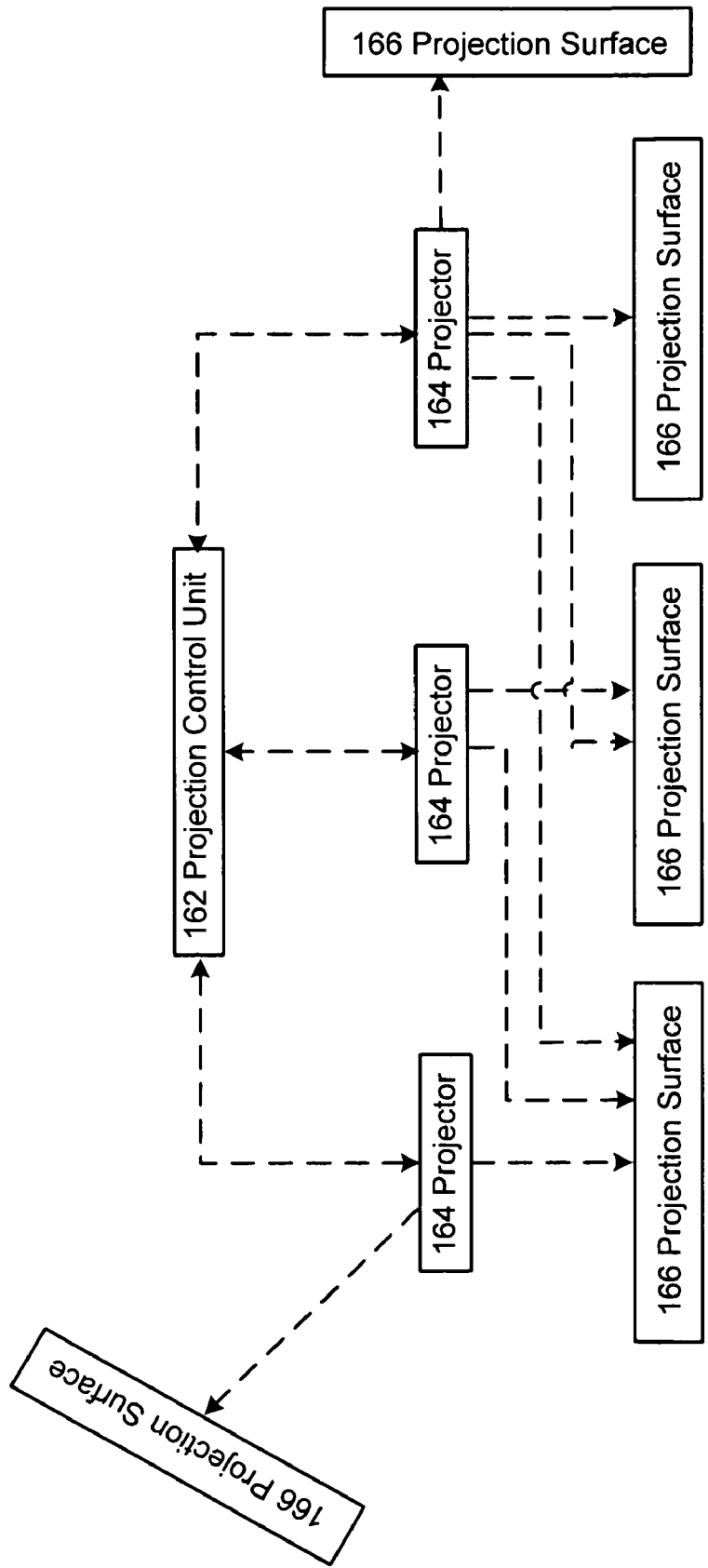
FIG. 1A illustrates embodiments of components shown in FIG. 1.
Figure 1B:
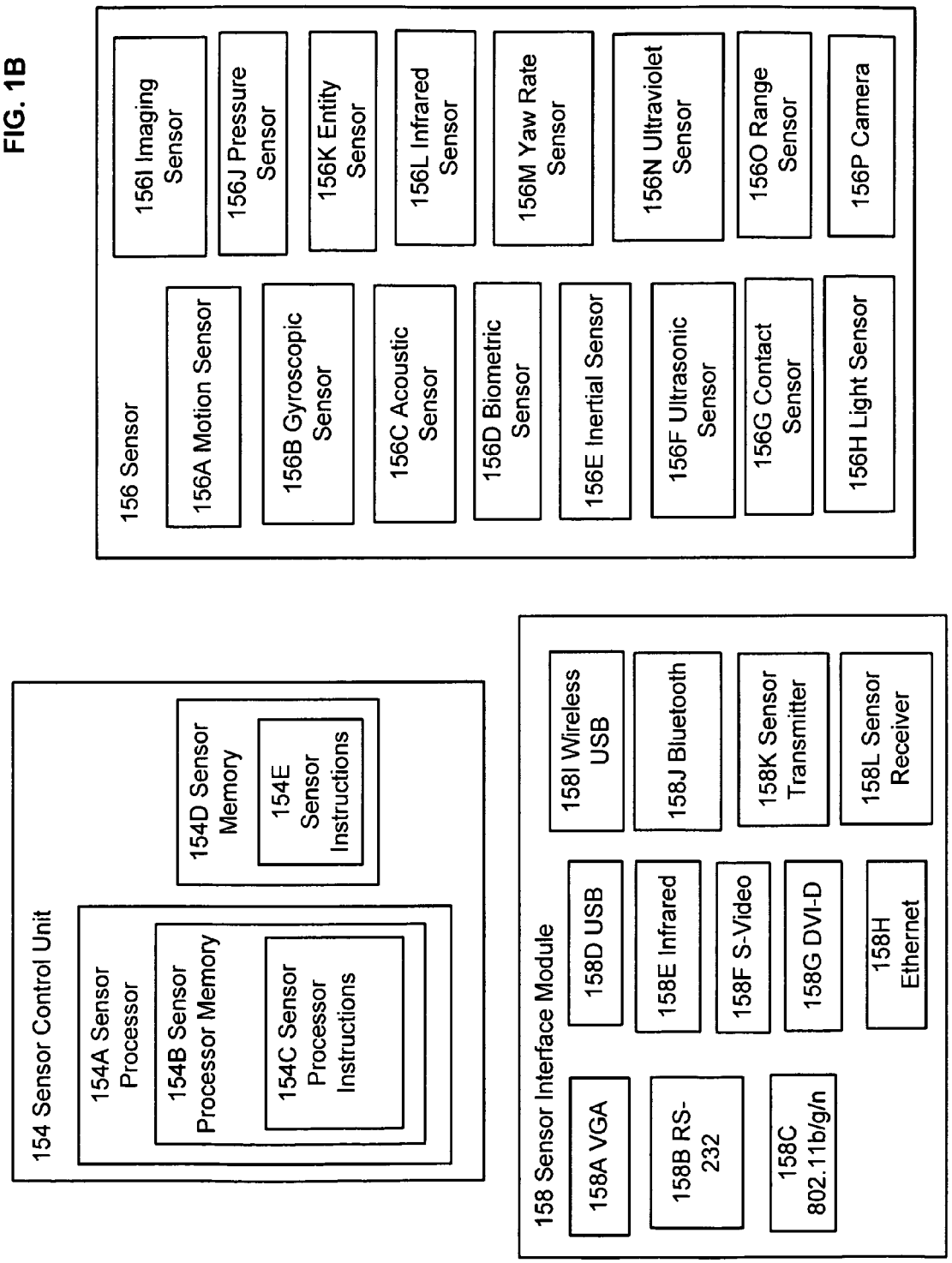
FIG. 1B illustrates embodiments of components shown in FIG. 1.
Figure 1C:
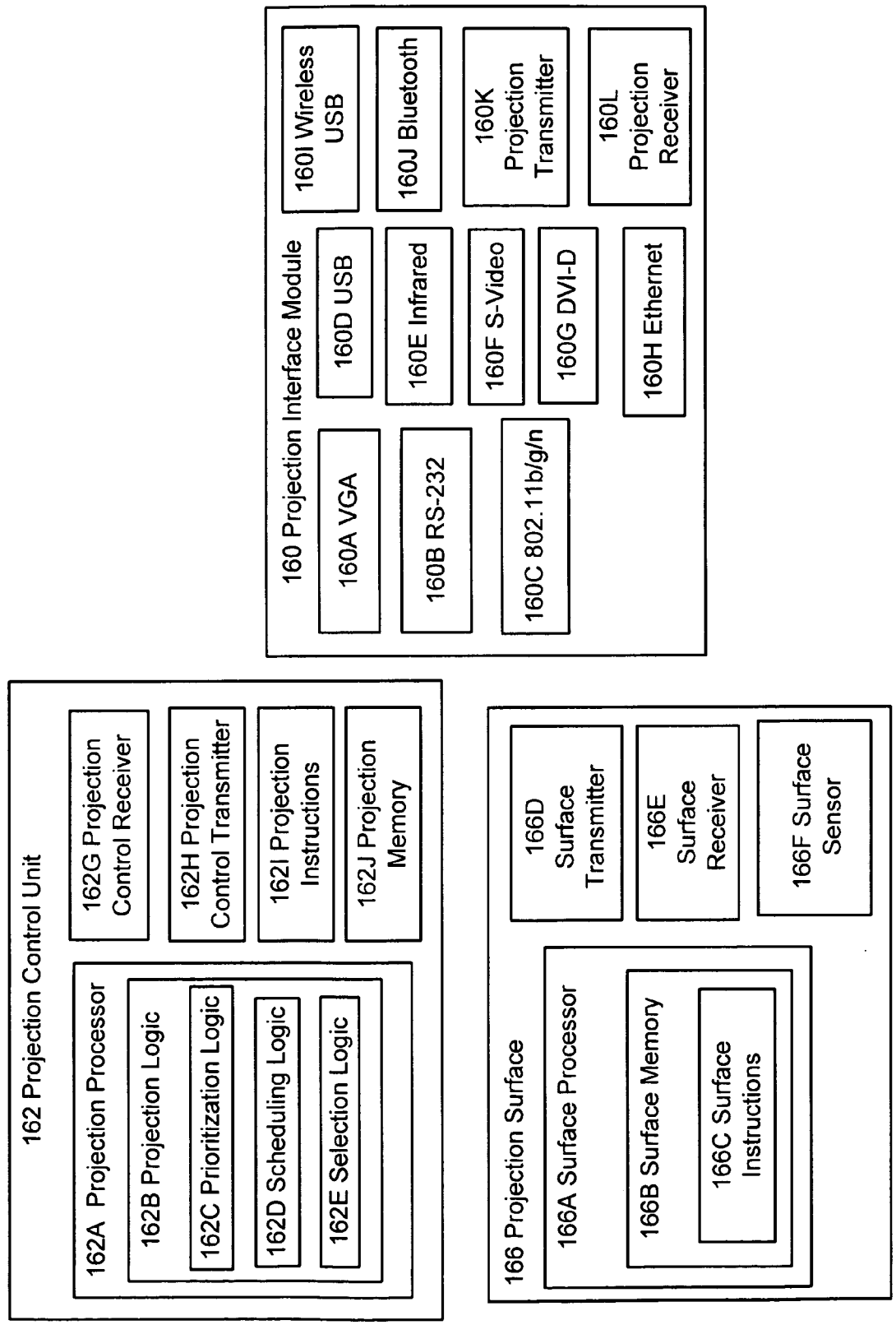
FIG. 1C illustrates embodiments of components shown in FIG. 1.
Figure 1D:
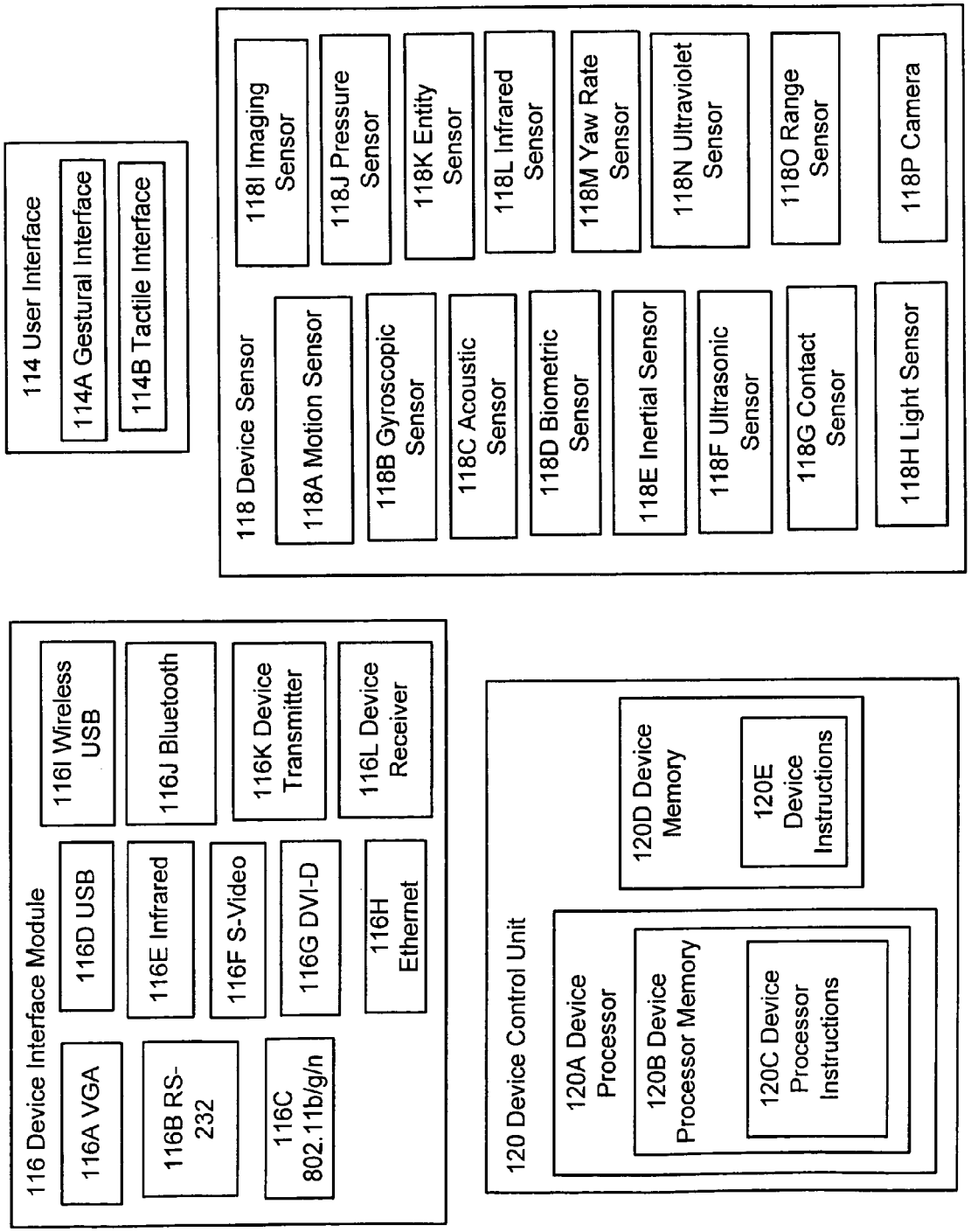
FIG. 1D illustrates embodiments of components shown in FIG. 1.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

FIG. 1 illustrates an example system 100 in which embodiments may be implemented. In some embodiments, system 100 may include one or more user communications devices 112. In some embodiments, system 100 may include one or more user interfaces 114. In some embodiments, system 100 may include one or more device interface modules 116. In some embodiments, system 100 may include one or more device sensors 118. In some embodiments, system 100 may include one or more device control units 120. In some embodiments, system 100 may include one or more sensor control units 154. In some embodiments, system 100 may include one or more sensors 156. In some embodiments, system 100 may include one or more sensor interface modules 158. In some embodiments, system 100 may include one or more projection control units 162. In some embodiments, system 100 may include one or more projectors 164. In some embodiments, system 100 may include one or more projection interface modules 160. In some embodiments, system 100 may include one or more projection surfaces 166. In some embodiments, system 100 may be configured to communicate with one or more communications networks 128. In some embodiments, system 100 may be configured to communicate with one or more service provider modules 130. In some embodiments, a service provider module 130 may include one or more service provider receivers 132A. In some embodiments, a service provider module 130 may include one or more service provider transmitters 132B. In some embodiments, a service provider module 130 may include one or more processors 134. In some embodiments, a service provider module 130 may include user identification logic 136. In some embodiments, a service provider module 130 may include billing logic 140. In some embodiments, a service provider module 130 may include user authentication logic 138. In some embodiments, a service provider module 130 may include access logic 142. In some embodiments, a service provider module 130 may include memory 144. In some embodiments, a service provider module 130 may include one or more user identification databases 146. In some embodiments, a service provider module 130 may include user data 148. In some embodiments, a service provider module 130 may include identity authentication data 150. In some embodiments, system 100 may be configured to communicate with one or more financial entities 122. In some embodiments, a financial entity 122 may include one or more user accounts 124. In some embodiments, system 100 may include financial information 126. In some embodiments, system 100 may include one or more user data accounts 152.

User Communications Device

In some embodiments, system 100 may include one or more user communications devices 112. A user communications device 112 may be configured in numerous ways. For example, in some embodiments, a user communications device 112 may be configured as a personal digital assistant (PDA). In some embodiments, a user communications device 112 may be configured as a cellular telephone. In some embodiments, a user communications device 112 may be configured as a computer (e.g., a laptop computer).

In some embodiments, a user communications device 112 may be operably associated with one or more user interfaces 114. User interfaces 114 may be configured in numerous ways. Examples of such configurations include, but are not limited to, touchscreens, keyboards, and the like. In some embodiments, a user interface 114 may be configured as a gestural user interface 114A. For example, in some embodiments, a user interface 114 may be configured to respond to one or more physical actions. Examples of such physical actions include, but are not limited to, acceleration, negative acceleration, shock, squeeze, movement (e.g., substantially defined motions), and the like. In some embodiments, one or more user interfaces 114 may be configured to be programmable to respond to one or more gestures. For example, in some embodiments, one or more user interfaces 114 may be configured to respond to pressure produced by squeezing the user interface 114. In some embodiments, one or more user interfaces 114 may be configured to respond to one or more motions. Accordingly, one or more user interfaces 114 may be configured to respond to numerous types of gestures. In some embodiments, one or more user interfaces 114 may be configured to include one or more tactile interfaces 114B. In some embodiments, one or more user interfaces 114 may be configured to utilize vibration to interact with a user 110. For example, in some embodiments, a user interface 114 may be configured to vibrate if a user communications device 112 enters into proximity with one or more available projection control units 162. Accordingly, a user interface 114 may be configured to utilize numerous tactile interfaces 114B.

In some embodiments, a user communications device 112 may be operably associated with one or more device interface modules 116. In some embodiments, one or more device interface modules 116 may be configured to operably communicate with one or more projectors 164. In some embodiments, one or more projection interface modules 160 may be configured to operably communicate with one or more projection control units 162. In some embodiments, one or more projection interface modules 160 may be configured to operably communicate with one or more projection interface modules 160. In some embodiments, one or more device interface modules 116 may be configured to operably communicate with one or more service provider receivers 132A. In some embodiments, one or more device interface modules 116 may be configured to operably communicate with one or more service provider transmitters 132B. In some embodiments, one or more device interface modules 116 may be configured to operably communicate with one or more service provider modules 130. In some embodiments, one or more device interface modules 116 may be configured to operably communicate with one or more sensors 156. In some embodiments, one or more device interface modules 116 may be configured to operably communicate with one or more sensor interface modules 158. In some embodiments, one or more device interface modules 116 may be configured to operably communicate with one or more sensor control units 154. In some embodiments, one or more device interface modules 116 may be configured to operably communicate with one or more financial entities 122. In some embodiments, one or more device interface modules 116 may be configured to operably communicate with one or more communications networks 128. A device interface module 116 may communicate with other components of system 100 through use of numerous communication formats and combinations of communications formats. Examples of such formats include, but are not limited to, 116A VGA, 116D USB, 116I wireless USB, 116B RS-232, 116E infrared, 116J Bluetooth, 116C 802.11b/g/n, 116F S-video, 116H Ethernet, 116G DVI-D, and the like. In some embodiments, one or more device interface modules 116 may be configured to receive information from one or more global positioning units 108.

In some embodiments, a user communications device 112 may be operably associated with one or more device sensors 118. A user communications device 112 may be operably associated with many types of device sensors 118 alone or in combination. Examples of device sensors 118 include, but are not limited to, 118P cameras, 118H light sensors, 118O range sensors, 118G contact sensors, 118K entity sensors, 118L infrared sensors, 118M yaw rate sensors, 118N ultraviolet sensors, 118E inertial sensors, 118F ultrasonic sensors, 118I imaging sensors, 118J pressure sensors, 118A motion sensors, 118B gyroscopic sensors, 118C acoustic sensors, 118D biometric sensors, and the like. In some embodiments, one or more device sensors 118 may be configured to detect motion. In some embodiments, one or more device sensors 118 may be configured to detect motion that is imparted to one or more user communications devices 112. In some embodiments, one or more device sensors 118 may be configured to detect one or more projectors 164. In some embodiments, one or more device sensors 118 may be configured to detect one or more projection interface modules 160. In some embodiments, one or more device sensors 118 may be configured to detect one or more projection control units 162. In some embodiments, one or more device sensors 118 may be configured to detect one or more users 110. In some embodiments, one or more device sensors 118 may be configured to detect one or more individuals. In some embodiments, one or more device sensors 118 may be configured to detect one or more additional user communications devices 112.

In some embodiments, a user communications device 112 may be operably associated with one or more device control units 120. In some embodiments, a device control unit 120 may be operably associated with one or more device processors 120A. In some embodiments, a device control unit 120 may be configured to process one or more instructions. For example, in some embodiments, one or more device control units 120 may process information associated with prioritization of projection. In some embodiments, one or more device control units 120 may process information associated with scheduling projection. Accordingly, in some embodiments, one or more device control units 120 may act to control the transmission of information associated with projection. In some embodiments, a device control unit 120 may be operably associated with device processor memory 120B. Accordingly, in some embodiments, device processor memory 120B may include information associated with the operation of the device processor 120A. For example, in some embodiments, device processor memory 120B may include device processor instructions 120C. Device processor instructions 120C may include numerous types of instructions. For example, in some embodiments, device processor instructions 120C may instruct one or more device processors 120A to correlate one or more motions that are imparted to a device with one or more commands. In some embodiments, a device control unit 120 may be operably associated with device memory 120D. Device memory 120D may include numerous types of information. Examples of such information include, but are not limited to, pictures, text, internet addresses, maps, instructions, and the like. In some embodiments, device memory 120D may include device instructions 120E. For example, in some embodiments, device instructions 120E may instruct a device to pair a certain communications protocol with another device (e.g., use of Bluetooth to communicate with a laptop computer).

Financial Entity

In some embodiments, system 100 may be configured to communicate with one or more financial entities 122. System 100 may be configured to communicate with numerous types of financial entities 122. Examples of such financial entities 122 include, but are not limited to, banks, credit unions, retail stores, credit card companies, issuers of prepaid service cards (e.g., prepaid telephone cards, prepaid internet cards, etc.). In some embodiments, a financial entity 122 may include a user account 124. Examples of such user accounts 124 include, but are not limited to, checking accounts, savings accounts, prepaid service accounts, credit card accounts, and the like.

Financial Information

In some embodiments, system 100 may include financial information 126. For example, in some embodiments, system 100 may include memory in which financial information 126 may be saved. In some embodiments, system 100 may include access to financial information 126. For example, in some embodiments, system 100 may include access codes that may be used to access financial information 126. In some embodiments, financial information 126 may include information about an individual (e.g., credit history, prepaid accounts, checking accounts, saving accounts, credit card accounts, and the like). In some embodiments, financial information 126 may include information about an institution (e.g., information about an institution that issues credit cards, prepaid service cards, automatic teller machine cards, and the like). Accordingly, in some embodiments, system 100 may be configured to allow a user 110 to access financial information 126 to pay for the use of system 100 or a component thereof. In some embodiments, financial information 126 may include financial transactions (e.g. funds transfers), financial reports (e.g. account statements), financial requests (e.g. credit checks), and the like. Numerous types of financial entities 122 may receive the transmitted financial information 126. The financial entity 122 may include banking systems, credit systems, online payment systems (e.g. PayPal®), bill processing systems, and the like. The financial entity 122 including a user account 124 may be maintained as a component of the service provider module 130 or as an independent service.

Service Provider Module

In some embodiments, system 100 may be configured to communicate with one or more service provider modules 130. The service provider module 130 may be an integrated or distributed server system associated with one or more communications networks 128. Numerous types of communications networks 128 may be used. Examples of communications networks 128 may include, but are not limited to, a voice over internet protocol (VoIP) network (e.g. networks maintained by Vonage®, Verizon®, Sprint®), a cellular network (e.g. networks maintained by Verizon®, Sprint®, AT&T®, T-Mobile®), a text messaging network (e.g. an SMS system in GSM), an e-mail system (e.g. an IMAP, POP3, SMTP, and/or HTTP e-mail server), and the like.

The service provider module 130 may include one or more service provider receivers 132A. The service provider module 130 may include one or more service provider transmitters 132B. Numerous types of service provider receivers 132A and transmitters 132B may be used. Examples of service provider receivers 132A and transmitters 132B may include, but are not limited to, a cellular transceiver, a satellite transceiver, a network portal (e.g. a modem linked to an internet service provider), and the like.

The service provider module 130 may include a processor 134. Numerous types of processors 134 may be used (e.g. general purpose processors 134 such as those marketed by Intel® and AMD, application specific integrated circuits, and the like). For example, the processor 134 may include, but is not limited to, one or more logic blocks capable of performing one or more computational functions, such as user identification logic 136, user-authentication logic 138, billing logic 140, access logic 142, and the like.

The service provider module 130 may include a memory 144. Numerous types of memory 144 may be used (e.g. RAM, ROM, flash memory, and the like). The memory 144 may include, but is not limited to, a user identification database 146 including user data 148 for one or more users 110. A user identification database 146 item for a user 110 may include one or more fields including identity authentication data 150.

The user data 148 may include data representing various identification characteristics of one or more users 110. The identification characteristics of the one or more users 110 may include, but are not limited to, user names, identification numbers, telephone numbers (e.g., area codes, international codes), images, voice prints, locations, ages, gender, physical trait, and the like.

Sensor Control Unit

System 100 may include one or more sensor control units 154. In some embodiments, one or more sensor control units 154 may be operably associated with one or more sensors 156. In some embodiments, one or more sensor control units 154 may be operably associated with one or more sensor interface modules 158. In some embodiments, one or more sensor control units 154 may be operably associated with one or more sensor processors 154A. In some embodiments, one or more sensor control units 154 may be operably associated with sensor processor memory 154B. In some embodiments, one or more sensor control units 154 may be operably associated with one or more sensor processor instructions 154C. In some embodiments, one or more sensor control units 154 may be operably associated with sensor memory 154D. In some embodiments, one or more sensor control units 154 may be operably associated with one or more sensor instructions 154E. In some embodiments, one or more sensor control units 154 may facilitate the transmission of one or more signals 170 that include information associated with one or more changes in sensor 156 response. For example, in some embodiments, one or more signals 170 that include information associated with a change in one or more features associated with one or more projection surfaces 166 may be transmitted. The one or more signals 170 may be received by one or more projection control units 162 and used to facilitate projection by one or more projectors 164 in response to the one or more signals. In some embodiments, one or more sensor control units 154 may use prior sensor response, user input, or other stimulus, to activate or deactivate one or more sensors 156 or other subordinate features contained within one or more sensor control units 154.

Sensor

System 100 may include one or more sensors 156. In some embodiments, one or more sensors 156 may be operably associated with one or more sensor control units 154. In some embodiments, one or more sensors 156 may be operably associated with one or more sensor interface modules 158. System 100 may include many types of sensors 156 alone or in combination. Examples of sensors 156 include, but are not limited to, 156P cameras, 156H light sensors, 156O range sensors, 156G contact sensors, 156K entity sensors, 156L infrared sensors, 156M yaw rate sensors, 156N ultraviolet sensors, 156E inertial sensors, 156F ultrasonic sensors, 156I imaging sensors, 156J pressure sensors, 156A motion sensors, 156B gyroscopic sensors, 156C acoustic sensors, 156D biometric sensors, and the like. In some embodiments, one or more sensors 156 may be configured to detect motion. In some embodiments, one or more sensors may be configured to detect motion that is imparted to one or more projection surfaces 166. In some embodiments, one or more sensors 156 may be configured to detect the availability of one or more projection surfaces 166.

Sensor Interface Module

System 100 may include one or more sensor interface modules 158. In some embodiments, one or more sensor interface modules 158 may be operably associated with one or more sensor control units 154. In some embodiments, one or more sensor interface modules 158 may be operably associated with one or more sensors 156. In some embodiments, one or more sensor interface modules 158 may be configured to communicate with one or more user interfaces 114. A sensor interface module 158 may communicate with other components of system 100 through use of numerous communication formats and combinations of communications formats. Examples of such formats include, but are not limited to, 158A VGA, 158D USB, 158I wireless USB, 158B RS-232, 158E infrared, 158J Bluetooth, 158C 802.11b/g/n, 158F S-video, 158H Ethernet, 158G DVI-D, and the like. In some embodiments, a sensor interface module 158 may include one or more sensor transmitters 158K. In some embodiments, a sensor interface module 158 may include one or more sensor receivers 158L.

Projection Control Unit

System 100 may include one or more projection control units 162. In some embodiments, one or more projection control units 162 may be operably associated with one or more projectors 164. In some embodiments, one or more projection control units 162 may be operably associated with one or more projection interface modules 160. In some embodiments, one or more projection control units 162 may be operably associated with one or more projectors 164 and one or more projection interface modules 160. In some embodiments, a projection control unit 162 may be operably associated with one or more projection processors 162A. In some embodiments, a projection control unit 162 may be operably associated with projection memory 162J. In some embodiments, a projection control unit 162 may be operably associated with one or more projection instructions 162I. In some embodiments, a projection control unit 162 may be operably associated with one or more projection control transmitters 162H. In some embodiments, a projection control unit 162 may be operably associated with one or more projection control receivers 162G. In some embodiments, a projection control unit 162 may be operably associated with one or more projection processors 162A that include projection logic 162B. Examples of such projection logic 162B include, but are not limited to, prioritization logic 162C (e.g., logic for prioritizing projection in response to one or more requests from one or more specific individuals), scheduling logic 162D (e.g., logic for scheduling projection in response to the availability of one or more projectors 164, one or more projection surfaces 166, or the combination of one or more projectors 164 and one or more projection surfaces 166), selection logic 162E (e.g., logic for selecting content in response to one or more requests from one or more specific individuals), projection logic 162B (e.g., logic for selecting projection parameters in response to one or more features associated with one or more projection surfaces 166), and the like. In some embodiments, a projection control unit 162 may be configured to modulate output projected by one or more projectors 164. In some embodiments, one or more projection control units 162 may be configured to select one or more wavelengths of light that will be projected by one or more projectors 164. For example, in some embodiments, one or more projection control units 162 may select one or more wavelengths of ultraviolet light that will be projected by one or more projectors 164. In some embodiments, one or more projection control units 162 may select one or more wavelengths of visible light that will be projected by one or more projectors 164. In some embodiments, one or more projection control units 162 may select one or more wavelengths of infrared light that will be projected by one or more projectors 164. Accordingly, in some embodiments, one or more projection control units 162 may select numerous wavelengths of light that will be projected by one or more projectors 164.

In some embodiments, one or more projection control units 162 may select content that is to be projected by one or more projectors 164. In some embodiments, one or more projection control units 162 may select content that is to be projected in response to one or more requests from one or more users 110.

For example, in some embodiments, one or more projection control units 162 may select content that is appropriate for children in response to a request from a child. In some embodiments, one or more projection control units 162 may modulate output that is projected by one or more projectors 164. In some embodiments, one or more projection control units 162 may modulate the intensity of light that is projected by one or more projectors 164. In some embodiments, one or more projection control units 162 may modulate the brightness of light that is projected by one or more projectors 164. In some embodiments, one or more projection control units 162 may modulate the contrast of light that is projected by one or more projectors 164. In some embodiments, one or more projection control units 162 may modulate the sharpness of light that is projected by one or more projectors 164.

In some embodiments, one or more projection control units 162 may modulate the direction of output that is projected by one or more projectors 164. In some embodiments, one or more projection control units 162 may direct output from one or more projectors 164 onto one or more moving projection surfaces 166. In some embodiments, one or more projection control units 162 may direct output from one or more projectors 164 onto one or more stationary projection surfaces 166. In some embodiments, one or more projection control units 162 may direct output from one or more projectors 164 onto one or more moving projection surfaces 166 and onto one or more stationary projection surfaces 166. In some embodiments, one or more projection control units 162 may direct output from one or more projectors 164 onto multiple projection surfaces 166. For example, in some embodiments, one or more projection control units 162 may direct output from one or more projectors 164 onto a first projection surface 166 and direct output from one or more projectors 164 onto a second projection surface 166.

In some embodiments, one or more projection control units 162 may dynamically modulate output from one or more projectors 164. For example, in some embodiments, one or more projectors 164 may be carried from room to room such that one or more projection control units 162 modulate output from the one or more projectors 164 in response to the available projection surface 166.

In some embodiments, one or more projection control units 162 may be configured to respond to one or more substantially defined motions. In some embodiments, a user 110 may program one or more projection control units 162 to correlate one or more substantially defined motions with one or more projection commands. For example, in some embodiments, a user 110 may program one or more projection control units 162 to correlate clockwise motion of a user communications device 112 with a command to advance a projected slide presentation by one slide. Accordingly, in some embodiments, a projection control unit 162 may be configured to project in response to substantially defined motions that are programmed according to the preferences of an individual user 110.

Projector

System 100 may include one or more projectors 164. In some embodiments, a projector 164 may be operably associated with one or more projection control units 162. In some embodiments, a projector 164 may be operably associated with one or more projection interface modules 160. In some embodiments, a projector 164 may be operably associated with one or projection processors 162A. In some embodiments, a projector 164 may be operably associated with projection memory 162J. In some embodiments, a projector 164 may be operably associated with one or more projection instructions 162I. In some embodiments, a projector 164 may be operably associated with projection logic 162B. In some embodiments, a projector 164 may be operably associated with one or more projection instructions 162I. In some embodiments, a projector 164 may be an image stabilized projector 164.

System 100 may include numerous types of projectors 164. In some embodiments, a projector 164 may include inertia and yaw rate sensors that detect motion and provide for adjustment of projected content to compensate for the detected motion. In some embodiments, a projector 164 may include an optoelectronic inclination sensor and an optical position displacement sensor to provide for stabilized projection (e.g., U.S. Published Patent Application No. 2003/0038927). In some embodiments, a projector 164 may include an optoelectronic inclination sensor, an optical position sensitive detector, and a piezoelectric accelerometer that provide for stabilized projection (e.g., U.S. Published Patent Application No. 2003/0038928). Image stabilized projectors 164 have been described (e.g., U.S. Pat. No. 7,284,866; U.S. Published Patent Application Nos. 20050280628; 20060103811, and 2006/0187421). In some embodiments, one or more projectors 164 may be modified to become image stabilized projectors 164. Examples of such projectors 164 have been described (e.g., U.S. Pat. Nos. 6,002,505; 6,764,185; 6,811,264; 7,036,936; 6,626,543; 7,134,078; 7,355,584; U.S. Published Patent Application No. 2007/0109509).

Projectors 164 may be configured to project numerous wavelengths of light. In some embodiments, a projector 164 may be configured to project ultraviolet light. In some embodiments, a projector 164 may be configured to project visible light. In some embodiments, a projector 164 may be configured to project infrared light. In some embodiments, a projector 164 may be configured to project numerous combinations of light. For example, in some embodiments, a projector 164 may project one or more infrared calibration images and one or more visible images.

Projection Interface Module

System 100 may include one or more projection interface modules 160. In some embodiments, one or more projection interface modules 160 may be operably associated with one or more projection control units 162. In some embodiments, one or more projection interface modules 160 may be operably associated with one or more projectors 164. A projection interface module 160 may communicate with other components of system 100 through use of numerous communication formats and combinations of communications formats. Examples of such formats include, but are not limited to, 160A VGA, 160D USB, 160I wireless USB, 160B RS-232, 160E infrared, 160J Bluetooth, 160C 802.11b/g/n, 160F S-video, 160H Ethernet, 160G DVI-D, and the like. In some embodiments, a projection interface module 160 may include one or more projection transmitters 160K. In some embodiments, a projection interface module 160 may include one or more projection receivers 160L.

Projection Surface

System 100 may include one or more projection surfaces 166. In some embodiments, nearly any surface may be utilized as a projection surface 166. In some embodiments, a projection surface 166 may be mounted (e.g., mounted on a wall, ceiling, floor, etc). In some embodiments, a projection surface 166 may be portable. In some embodiments, a projection surface 166 may be carried by an individual person. For example, in some embodiments, a projection surface 166 may be configured as a sheet of material, a tablet, two or more sheets of material that may be separated from each other, and the like. Accordingly, in some embodiments, a projection surface 166 may be configured as a sheet of material that a user 110 may unfold and place on a surface, such as a desk, wall, floor, ceiling, etc. In some embodiments, a projection surface 166 may be a wall, a floor, a ceiling, a portion of a wall, a portion of a floor, a portion of a ceiling, and combinations thereof.

In some embodiments, a projection surface 166 may include one or more surface sensors 166F that are associated with the projection surface 166. In some embodiments, a projection surface 166 may include one or more magnetic surface sensors 166F. For example, in some embodiments, a projection surface 166 may include magnetic surface sensors 166F that are configured to detect magnetic ink that is applied to the projection surface 166. In some embodiments, a projection surface 166 may include one or more pressure surface sensors 166F. For example, in some embodiments, a projection surface 166 may include pressure surface sensors 166F that are configured to detect pressure that is applied to the projection surface 166 (e.g., contact of a stylus with the projection surface 166, contact of a pen with the projection surface 166, contact of a pencil with the projection surface 166, etc.). In some embodiments, a projection surface 166 may include one or more motion surface sensors 166F. For example, in some embodiments, a projection surface 166 may include motion surface sensors 166F that are configured to detect movement associated with the projection surface 166. In some embodiments, a projection surface 166 may include one or more strain surface sensors 166F. For example, in some embodiments, a projection surface 166 may include strain surface sensors 166F that are configured to detect changes in conformation associated with the projection surface 166. In some embodiments, a projection surface 166 may include one or more positional surface sensors 166F (e.g., global positioning surface sensors 166F). For example, in some embodiments, a projection surface 166 may include positional surface sensors 166F that are configured to detect changes in position associated with the projection surface 166.

A projection surface 166 may be constructed from numerous types of materials and combinations of materials. Examples of such materials include, but are not limited to, cloth, plastic, metal, ceramics, paper, wood, leather, glass, and the like. In some embodiments, one or more projection surfaces 166 may exhibit electrochromic properties. In some embodiments, one or more projection surfaces 166 may be coated. For example, in some embodiments, a projection surface 166 may be coated with paint. In some embodiments, a projection surface 166 may include one or more materials that alter light. For example, in some embodiments, a projection surface 166 may convert light (e.g., up-convert light, down-convert light).

In some embodiments, a projection surface 166 may be associated with one or more fiducials. For example, in some embodiments, one or more fluorescent marks may be placed on a projection surface 166. In some embodiments, one or more phosphorescent marks may be placed on a projection surface 166. In some embodiments, one or more magnetic materials may be placed on a projection surface 166. In some embodiments, fiducials may be placed on a projection surface 166 in numerous configurations. For example, in some embodiments, fiducials may be positioned in association with a projection surface 166 such that they form a pattern. In some embodiments, a projection surface 166 may include one or more calibration images.

In some embodiments, a projection surface 166 may include one or more surface transmitters 166D. Accordingly, in some embodiments, a projection surface 166 may be configured to transmit one or more signals 170. Such signals 170 may include numerous types of information 168. Examples of such information 168 may include, but are not limited to, information 168 associated with: one or more positions of one or more projection surfaces 166, one or more conformations of one or more projection surfaces 166, one or more changes in the position of one or more projection surfaces 166, one or more changes in the conformation of one or more projection surfaces 166, one or more motions associated with one or more projection surfaces 166, one or more changes in the motion of one or more projection surfaces 166, and the like.

In some embodiments, a projection surface 166 may include one or more surface receivers 166E. Accordingly, in some embodiments, a projection surface 166 may be configured to receive one or more signals 170. For example, in some embodiments, one or more surface receivers 166E may receive one or more signals 170 that are transmitted by one or more projection transmitters 160K. In some embodiments, one or more surface receivers 166E may receive one or more signals 170 that are transmitted by one or more sensor transmitters 158K.

In some embodiments, a projection surface 166 may include one or more surface processors 166A. Accordingly, in some embodiments, a surface processor 166A may be configured to process information received from one or more surface sensors 166F. In some embodiments, a projection surface 166 may include surface memory 166B. In some embodiments, surface memory 166B may include one or more lookup tables that include correlation information associated with the position of one or more fiducials associated with a projection surface 166 and one or more conformations of the projection surface 166. In some embodiments, surface memory 166B may include surface instructions 166C. In some embodiments, surface instructions 166C may include instructions for a projection surface 166 to transmit one or more signals 170 that indicate that a projection surface 166 has undergone a change in conformation. In some embodiments, surface instructions 166C may include instructions for a projection surface 166 to transmit one or more signals 170 that indicate that a projection surface 166 has undergone a change in position. In some embodiments, surface instructions 166C may include instructions for a projection surface 166 to transmit one or more signals 170 that indicate that a projection surface 166 has undergone a change in motion.

In some embodiments, a projection surface 166 may be configured to include one or more recording attributes. For example, in some embodiments, a projection surface 166 may be configured to communicate with other devices. In some embodiments, a projection surface 166 may be configured to communicate with one or more printers. Accordingly, in some embodiments, a projection surface 166 may be configured to facilitate printing of content that is projected onto the projection surface 166. In some embodiments, a projection surface 166 may be configured to communicate with memory. Accordingly, in some embodiments, a projection surface 166 may be configured to facilitate capture and storage of content that is projected onto the projection surface 166 into memory. In some embodiments, a projection surface 166 may be configured to communicate with one or more communications networks 128. Accordingly, in some embodiments, a projection surface 166 may be configured to facilitate transmission of content that is projected onto the projection surface 166 over one or more communications networks 128. In some embodiments, a projection surface 166 may be configured to communicate with the internet. Accordingly, in some embodiments, a projection surface 166 may be configured to facilitate transmission of content that is projected onto the projection surface 166 over the internet.

Signal

Numerous types of signals 170 may be used in association with system 100. Examples of such signals 170 include, but are not limited to, analog signals 170, digital signals 170, acoustic signals 170, optical signals 170, radio signals 170, wireless signals 170, hardwired signals 170, infrared signals 170, ultrasonic signals 170, Bluetooth signals 170, 802.11 signals 170, and the like. In some embodiments, one or more signals 170 may not be encrypted. In some embodiments, one or more signals 170 may be encrypted. In some embodiments, one or more signals 170 may be authenticated. In some embodiments, one or more signals 170 may be sent through use of a secure mode of transmission. In some embodiments, one or more signals 170 may be coded for receipt by a specific recipient. In some embodiments, such code may include anonymous code that is specific for the recipient. Accordingly, information included within one or more signals 170 may be protected against being accessed by others who are not the intended recipient. In some embodiments, one or more signals 170 may include information as one or more content packets.

In some embodiments, one or more signals 170 may include processed information. In some embodiments, one or more signals 170 may include information that has been processed by one or more sensor processors 154A. For example, in some embodiments, a sensor processor 154A may receive input from one or more sensors 156 that is processed. In some embodiments, this processed information may then be included within a signal 170 that is transmitted. In some embodiments, one or more signals 170 may include processed information that contains information that has been retrieved from sensor processor memory 154B. In some embodiments, one or more signals 170 may include processed information that contains information that has been processed through use of sensor processor instructions 154C. Accordingly, in some embodiments, one or more signals 170 may include numerous types of information that is processed. Examples of such processing may include, but are not limited to, sub-setting, generating projection commands, selecting content, selecting content for projection, selecting content that is not for projection, summarizing sensor data, transforming sensor data, supplementing sensor data, supplementing sensor data with data from external sources, and the like.

In some embodiments, one or more signals 170 may include information that has not been processed. In some embodiments, a sensor transmitter 158K may act as a conduit to transmit one or more signals 170 that include raw data. For example, in some embodiments, one or more sensor transmitters 158K may receive information from one or more sensors 156 and transmit one or more signals 170 that include the unprocessed information. Accordingly, in some embodiments, one or more signals 170 may include unprocessed information.

User

System 100 may be operated by one or more users 110. In some embodiments, a user 110 may be human. In some embodiments, a user 110 may be a non-human user 110. For example, in some embodiments, a user 110 may be a computer, a robot, and the like. In some embodiments, a user 110 may be proximate to system 100. In some embodiments, a user 110 may be remote from system 100. In some embodiments, a user 110 may be an individual.

Figure 2:
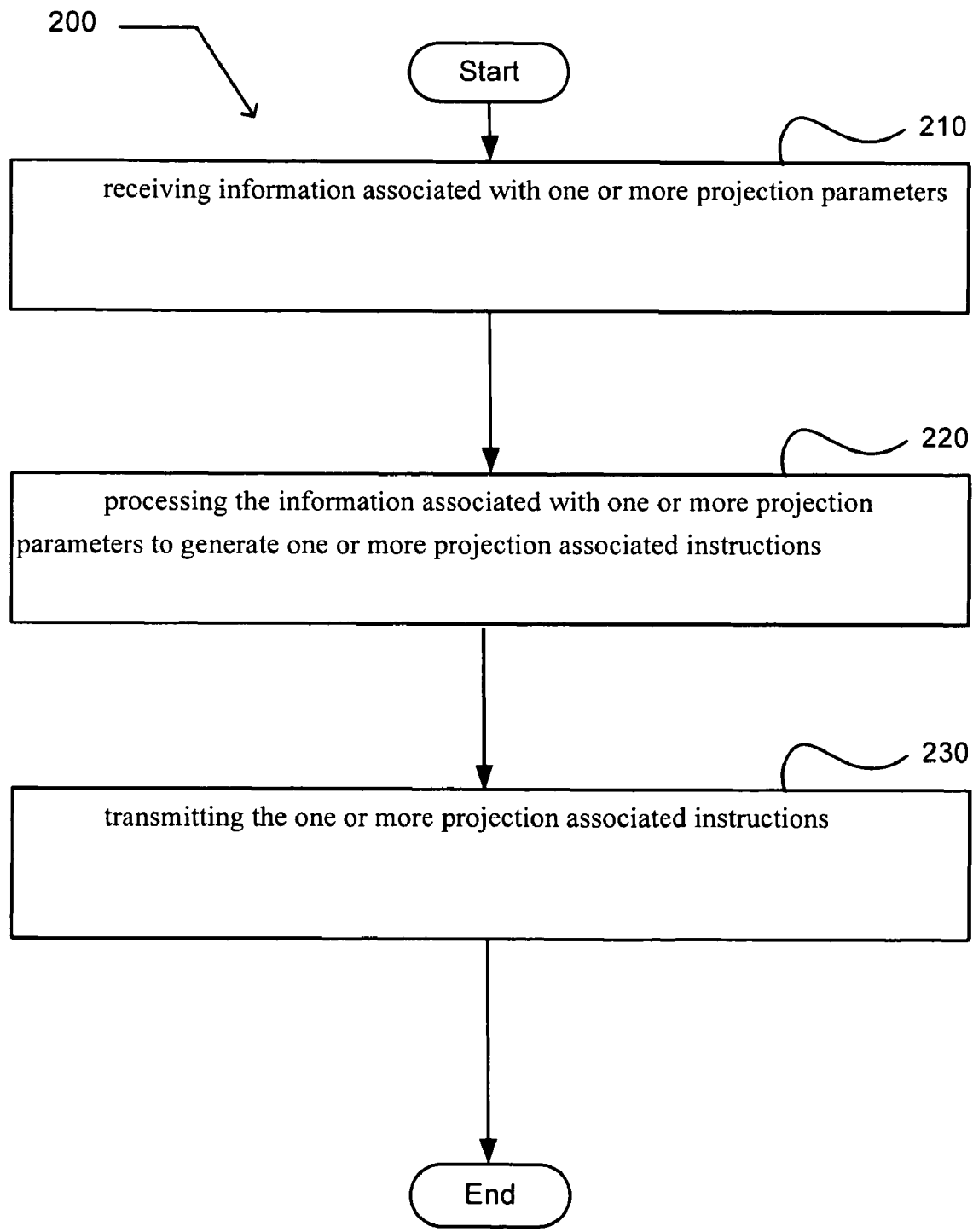
FIG. 2 illustrates an operational flow 200 representing example operations related to receiving information associated with one or more projection parameters, processing the information associated with one or more projection parameters to generate one or more projection associated instructions, and transmitting the one or more projection associated instructions.

In FIG. 2 and in following figures that include various examples of operations used during performance of a method, discussion and explanation may be provided with respect to any one or combination of the above-described examples of FIG. 1, and/or with respect to other examples and contexts. However, it should be understood that the operations may be executed in a number of other environments and contexts, and/or modified versions of FIG. 1. Also, although the various operations are presented in the sequence(s) illustrated, it should be understood that the various operations may be performed in other orders than those which are illustrated, or may be performed concurrently.

After a start operation, the operational flow 200 includes a receiving operation 210 involving receiving information associated with one or more projection parameters. In some embodiments, one or more service provider receivers 132A may receive information 168 associated with one or more projection parameters. In some embodiments, one or more service provider receivers 132A may receive information 168 associated with one or more projection parameters from one or more user communications devices 112. For example, in some embodiments, one or more service provider receivers 132A may receive one or more signals 170 that include information 168 associated with one or more projection parameters that were transmitted from one or more user communications devices 112. One or more service provider receivers 132A may receive numerous types of information 168 associated with projection parameters. In some embodiments, a projection parameter may be a request for projection. Examples of requests for projection include, but are not limited to, requests for projection at one or more times, requests for projection onto one or more projection surfaces 166, requests for projection of selected content, and the like. In some embodiments, a projection parameter may be associated with the identity of one or more individuals. Examples of such projection parameters include, but are not limited to, the identity of an individual, the status of an individual, the location of the individual, and the like. In some embodiments, a projection parameter may be associated with financial information 126 that is associated with one or more individuals. Examples of such financial information 126 include, but are not limited to, funds present in one or more accounts, credit limits, passwords that are associated with one or more accounts, association with one or more financial entities 122, and the like. In some embodiments, a projection parameter may be associated with membership information 168 that is associated with one or more individuals. Examples of such membership information 168 include, but are not limited to, frequent flier memberships, credit card associated memberships, retail store memberships (e.g., coffee shop memberships, department store memberships, conference center memberships), club memberships (e.g., social clubs, athletic clubs, diners club, travel clubs), and the like.

In some embodiments, a user 110 may establish a projection account that is associated with system 100. For example, in some embodiments, system 100 may be configured for use in a commercial establishment (e.g., a café) that offers projection services. In some embodiments, a user 110 may pay to utilize system 100 within the commercial establishment. Accordingly, in some embodiments, a user 110 may create an account (e.g., a prepaid account, a monthly service fee, a prepaid card, etc.) that may be used to purchase projection services within a commercial establishment. In some embodiments, projection parameters may include information 168 associated with payment for projection services.

In some embodiments, one or more service provider receivers 132A may receive information 168 associated with projection parameters that are related to conditions of projection. For example, in some embodiments, projection parameters may include light conditions surrounding a projection surface 166, movement of a projection surface 166, shape of a projection surface 166, location of a projection surface 166, and the like. Accordingly, in some embodiments, one or more service provider receivers 132A may receive information 168 associated with one or more projection parameters from one or more projection surfaces 166.

After a start operation, the operational flow 200 includes a processing operation 220 involving processing the information associated with one or more projection parameters to generate one or more projection associated instructions. In some embodiments, one or more processors 134 may process the information 168 associated with one or more projection parameters to generate one or more projection associated instructions. Many types of projection associated instructions may be generated by processing information 168 associated with one or more projection parameters. For example, in some embodiments, one or more service provider receivers 132A may receive information 168 associated with one or more requests to project onto one or more selected projection surfaces 166. Accordingly, in some embodiments, one or more processors 134 may process the information 168 to identify one or more projectors 164 that are able to project onto the one or more requested projection surfaces 166 and generate one or more instructions to project from the identified projectors 164. In some embodiments, one or more processors 134 may process information 168 associated with multiple requests for projection from two or more users 110. Accordingly, in some embodiments, one or more processors 134 may process information 168 associated with the status of the users 110 to prioritize use of projection services by each of the users 110. For example, in some embodiments, a first user 110 may have higher status than a second user 110 and the first user 110 may therefore be given preferential use of projection services over the second user 110. Accordingly, one or more instructions may be generated that instruct projection of content received from the first user 110 over projection of content received from the second user 110. In some embodiments, one or more processors 134 may process information 168 associated with the location of a user 110. Accordingly, in some embodiments, the one or more processors 134 may locate one or more projectors that are proximate to a user 110 and generate instructions to project from the located projectors 164. In some embodiments, the one or more processors 134 may locate one or more projection surfaces that are proximate to a user 110 and generate instructions to project from one or more projectors that are able to project onto the one or more projection surfaces. In some embodiments, one or more processors 134 may schedule projection and generate instructions to project according to a schedule. In some embodiments, one or more processors 134 may generate instructions associated with locating content for projection. For example, in some embodiments, one or more processors 134 may generate instructions to access one or more databases to obtain content. In some embodiments, one or more processors 134 may generate instructions to access one or more lookup tables to obtain content. In some embodiments, one or more processors 134 may generate instructions to access the internet to obtain content. Accordingly, one or more processors 134 may process many types of information 168 and generate numerous types of instructions.

After a start operation, the operational flow 200 includes a transmitting operation 230 involving transmitting the one or more projection associated instructions. In some embodiments, one or more service provider transmitters 132B may transmit the one or more projection associated instructions. Numerous types of instructions may be transmitted. In some embodiments, one or more service provider transmitters 132B may transmit one or more instructions to project from one or more selected projectors 164. In some embodiments, one or more service provider transmitters 132B may transmit one or more instructions to project onto one or more selected projection surfaces 166. In some embodiments, one or more service provider transmitters 132B may transmit one or more instructions to project selected content. In some embodiments, one or more service provider transmitters 132B may transmit one or more instructions to project content received from one or more users 110. In some embodiments, one or more service provider transmitters 132B may transmit one or more instructions to obtain content for projection. In some embodiments, one or more service provider transmitters 132B may transmit one or more instructions to not project select content. In some embodiments, one or more service provider transmitters 132B may transmit one or more instructions to project from one or more projectors that are proximate to one or more users 110. In some embodiments, one or more service provider transmitters 132B may transmit one or more instructions to project onto one or more projection surfaces that are proximate to one or more users 110. In some embodiments, one or more service provider transmitters 132B may transmit one or more instructions to adjust the projection parameters in accordance with conditions that occur at one or more projection sites. For example, in some embodiments, one or more instructions may include instructions to increase light output. In some embodiments, one or more instructions may include instructions to decrease light output. In some embodiments, one or more instructions may include instructions to project selected wavelengths of light. In some embodiments, one or more instructions may include instructions not to project selected wavelengths of light. In some embodiments, one or more instructions may include instructions that are to be transmitted to one or more financial entities. For example, in some embodiments, one or more instructions may be transmitted to one or more financial entities to debit one or more financial accounts. Accordingly, many types of instructions may be transmitted.

Figure 3:
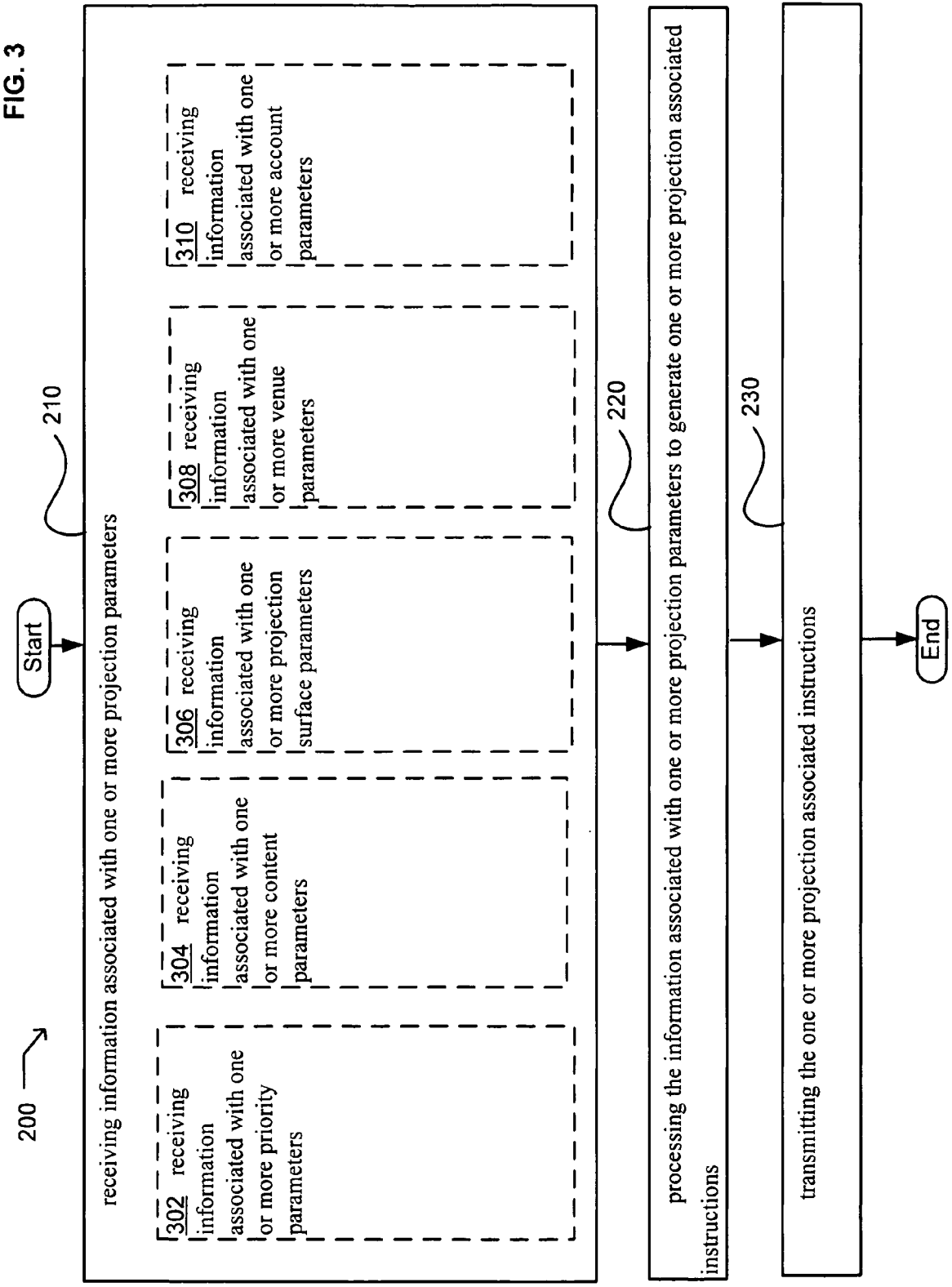
FIGS. 3-22 illustrate alternative embodiments of the example operation flow of FIG. 2.

FIG. 3 illustrates alternative embodiments of the example operational flow 200 of FIG. 2. FIG. 3 illustrates example embodiments where the receiving operation 210 may include at least one additional operation. Additional operations may include an operation 302, operation 304, operation 306, operation 308, and/or operation 310.

At operation 302, the receiving operation 210 may include receiving information associated with one or more priority parameters. In some embodiments, one or more service provider receivers 132A may receive information 168 associated with one or more priority parameters. One or more service provider receivers 132A may receive information 168 associated with numerous types of priority parameters. Examples of such priority parameters include, but are not limited to, status that is associated with one or more users 110 (e.g., credit card level), financial information 126 that is associated with one or more users 110 (e.g., fund availability in a user account 124, debit card), membership that is associated with one or more users 110 (e.g., frequent flier membership), possession of a prepaid account (e.g., prepaid merchant card), and the like.

In some embodiments, system 100 may be configured for public use (e.g., a café). Accordingly, in some embodiments, an establishment may configure system 100 to offer projection services to customers. In some embodiments, an establishment may provide projection services that are available for purchase. Numerous methods may be used to provide for the purchase of projection services. In some embodiments, a user 110 may purchase a prepaid account to pay for projection services. In some embodiments, a user 110 may purchase a prepaid card to pay for projection services. In some embodiments, such a card may include a code that may be entered to obtain access for projection. In some embodiments, such a card may include a code that may be read by a card reader to provide projection services to a user 110. In some embodiments, system 100 may include a card reader that is enabled to access one or more user accounts 124 (e.g., credit card reader, debit card reader, etc.). In some embodiments, a user communications device 112 may include a card reader that is enabled to access one or more user accounts 124 (e.g., credit card reader, debit card reader, etc.).

In some embodiments, prioritized projection services may be provided to a user 110. In some embodiments, users 110 may be provided with an opportunity to obtain preferential projection services. In some embodiments, a user 110 may be able to purchase projection services that are provided at different levels of priority. For example, in some embodiments, a user 110 may be provided with an opportunity to purchase projection services at the high priority level which would provide the user 110 preferred access for projection over other users 110 who purchased projection services at lower levels of priority. In some embodiments, a user 110 may be able to adjust their priority level in response to the priority level of other users 110. In some embodiments, users 110 may be able to dynamically increase or decrease their priority levels. For example, in some embodiments, users 110 may be able to increase their priority level over other users 110 so that they are able to utilize projection services before other users 110 who have not increased their priority level.

At operation 304, the receiving operation 210 may include receiving information associated with one or more content parameters. In some embodiments, one or more service provider receivers 132A may receive information 168 associated with one or more content parameters. One or more service provider receivers 132A may receive information 168 associated with numerous types of content parameters. Examples of such content parameters include, but are not limited to, format of content (e.g., JPEG, GIF, TIFF, XML, SVG), type of content (e.g., children's content, adult content, financial information 126, sports information 168, text, pictures, etc.), location of content (e.g., internet address, filename, file folder), and the like.

At operation 306, the receiving operation 210 may include receiving information associated with one or more projection surface parameters. In some embodiments, one or more service provider receivers 132A may receive information 168 associated with one or more projection surface parameters. One or more service provider receivers 132A may receive information 168 associated with numerous types of projection surface parameters. Examples of such projection surface parameters include, but are not limited to, availability of one or more projection surfaces 166, location of one or more projection surfaces 166, light transmission properties of one or more projection surfaces 166, image capture capabilities associated with one or more projection surfaces 166, physical characteristics of one or more projection surfaces 166 (e.g., size, shape, contours), one or more scheduled times of projection for one or more projection surfaces 166, one or more scheduled time periods of projection for one or more projection surfaces 166, and the like.

At operation 308, the receiving operation 210 may include receiving information associated with one or more venue parameters. In some embodiments, one or more service provider receivers 132A may receive information 168 associated with one or more venue parameters. One or more service provider receivers 132A may receive information 168 associated with numerous types of venue parameters. Examples of such venue parameters include, but are not limited to, type of venue (e.g., café, coffee shop, restaurant, boat, automobile, bus, train, airplane, bar, pub, arena, child care center, medical office, dental office, hospital, assembly line), location of venue (e.g., GPS coordinates, address, country), and the like.

At operation 310, the receiving operation 210 may include receiving information associated with one or more account parameters. In some embodiments, one or more service provider receivers 132A may receive information 168 associated with one or more account parameters. One or more service provider receivers 132A may receive information 168 associated with numerous types of account parameters. Examples of such account parameters include, but are not limited to, one or more codes for accessing one or more accounts, one or more locations of one or more accounts, one or more account numbers of one or more accounts, one or more routing codes associated with one or more accounts, availability of funds contained within one or more accounts, assets contained within one or more accounts, and the like.

Figure 4:
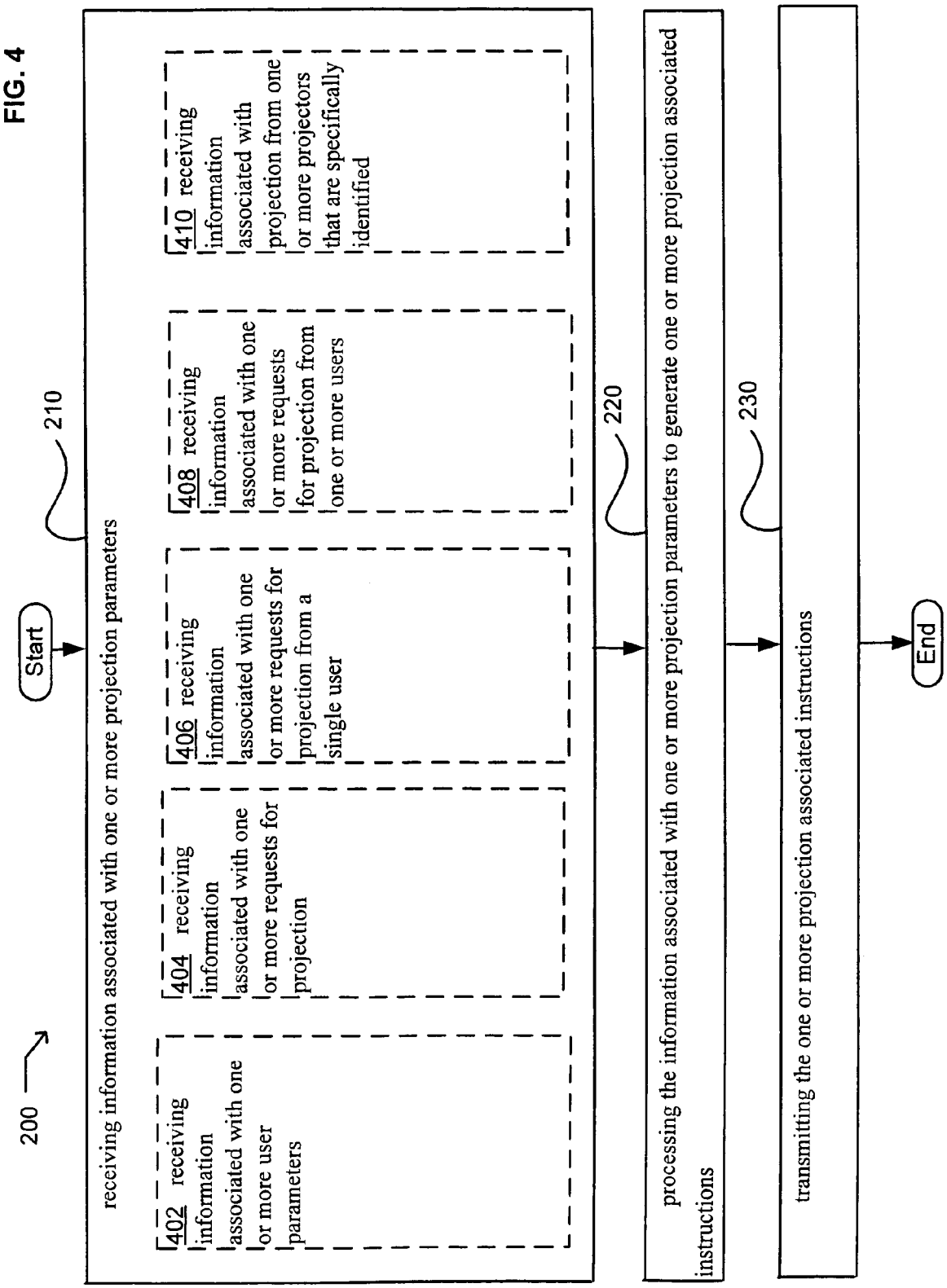

FIG. 4 illustrates alternative embodiments of the example operational flow 200 of FIG. 2. FIG. 4 illustrates example embodiments where the receiving operation 210 may include at least one additional operation. Additional operations may include an operation 402, operation 404, operation 406, operation 408, and/or operation 410.

At operation 402, the receiving operation 210 may include receiving information associated with one or more user parameters. In some embodiments, one or more service provider receivers 132A may receive information 168 associated with one or more user parameters. One or more service provider receivers 132A may receive information 168 associated with numerous types of user parameters. Examples of such user parameters include, but are not limited to, ages of one or more users 110, genders of one or more users 110, financial accounts associated with one or more users 110, status associated with one or more users 110, priority associated with one or more users 110, hobbies associated with one or more users 110, activities associated with one or more users 110, memberships associated with one or more users 110, locations associated with one or more users 110, and the like.

At operation 404, the receiving operation 210 may include receiving information associated with one or more requests for projection. In some embodiments, one or more service provider receivers 132A may receive information 168 associated with one or more requests for projection. One or more service provider receivers 132A may receive information 168 associated with numerous types of requests for projection. Examples of such parameters include, but are not limited to, one or more times requested for projection, one or more projection surfaces 166 requested for projection, one or more time periods requested for projection, one or more requests to charge a financial account, one or more requests to increase priority associated with projection, one or more requests to decrease priority associated with projection, and the like.

At operation 406, the receiving operation 210 may include receiving information associated with one or more requests for projection from a single user. In some embodiments, one or more service provider receivers 132A may receive information 168 associated with one or more requests for projection from a single user 110. Numerous types of information 168 may be associated with one or more requests for projection from a single user 110. Examples of such information 168 include, but are not limited to, the identity of the user 110, status associated with the user 110, financial information 126 associated with the user 110, priority associated with the user 110, location of the user 110, gender of the user 110, age of the user 110, and the like.

At operation 408, the receiving operation 210 may include receiving information associated with one or more requests for projection from one or more users. In some embodiments, one or more service provider receivers 132A may receive information 168 associated with one or more requests for projection from one or more users 110. Numerous types of information 168 may be associated with one or more requests for projection from one or more users 110. Examples of such information 168 include, but are not limited to, the identities of the one or more users 110, status associated with the one or more users 110, financial information 126 associated with the one or more users 110, priorities associated with the one or more users 110, locations of the one or more users 110, genders of the one or more users 110, ages of the one or more users 110, and the like.

At operation 410, the receiving operation 210 may include receiving information associated with projection from one or more projectors that are specifically identified. In some embodiments, one or more service provider receivers 132A may receive information 168 associated with projection from one or more projectors 164 that are specifically identified. Numerous types of information 168 may be associated with one or more requests for projection from one or more projectors 164 that are specifically identified. Examples of such information 168 include, but are not limited to, one or more serial numbers that are associated with one or more projectors 164, one or more locations that are associated with one or more projectors 164, one or more access codes that are associated with one or more projectors 164, one or more locations of one or more projection surfaces 166, one or more identifiers that are associated with one or more projectors 164, and the like.

Figure 5:
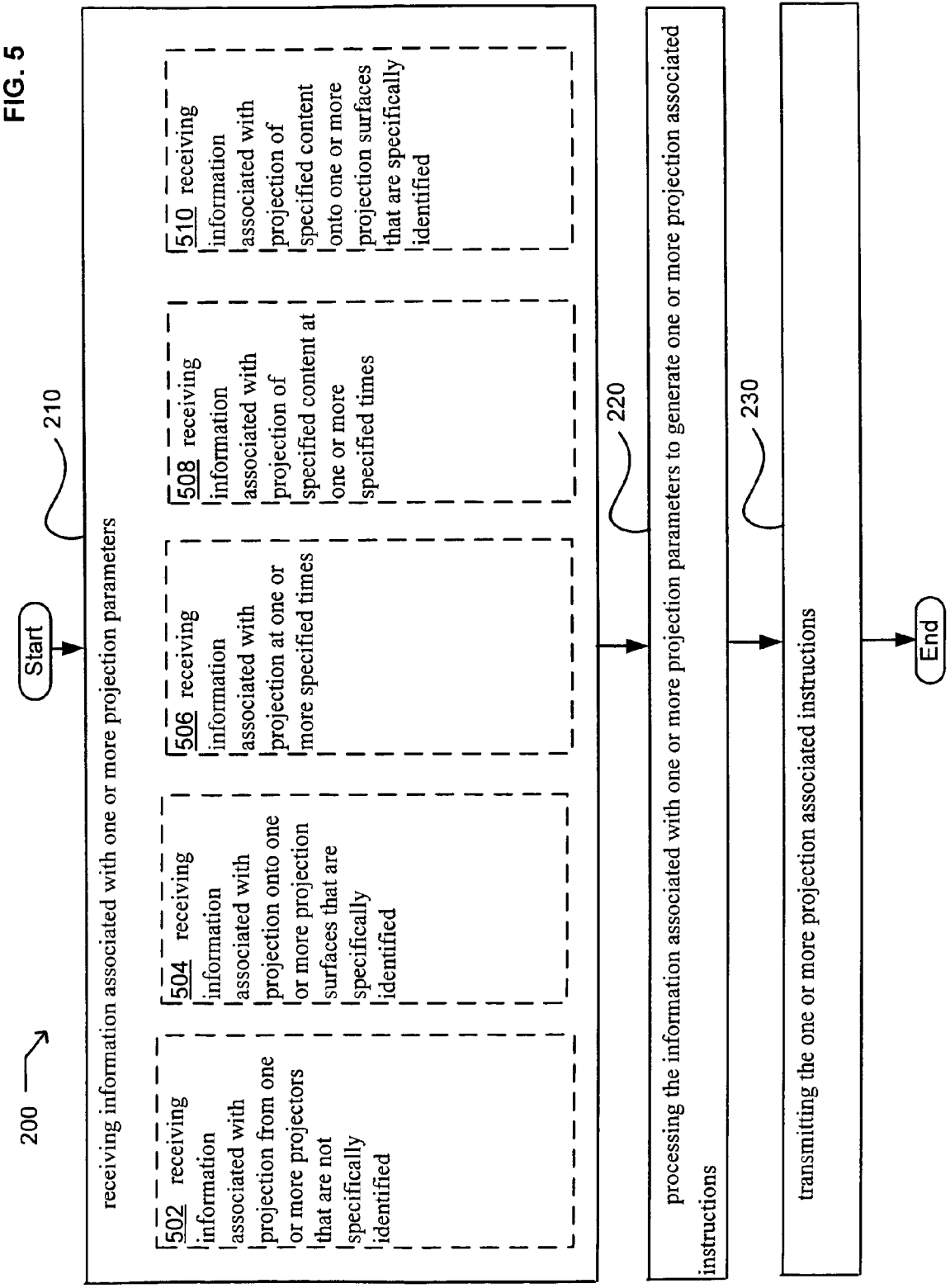

FIG. 5 illustrates alternative embodiments of the example operational flow 200 of FIG. 2. FIG. 5 illustrates example embodiments where the receiving operation 210 may include at least one additional operation. Additional operations may include an operation 502, operation 504, operation 506, operation 508, and/or operation 510.

At operation 502, the receiving operation 210 may include receiving information associated with projection from one or more projectors that are not specifically identified. In some embodiments, one or more service provider receivers 132A may receive information 168 associated with projection from one or more projectors that are not specifically identified. Numerous types of information 168 may be associated with one or more requests for projection from one or more projectors 164 that are not specifically identified. Examples of such information 168 include, but are not limited to, one or more locations that are associated with one or more projectors 164, one or more locations of one or more projection surfaces 166, and the like.

At operation 504, the receiving operation 210 may include receiving information associated with projection onto one or more projection surfaces that are specifically identified. In some embodiments, one or more service provider receivers 132A may receive information 168 associated with projection onto one or more projection surfaces that are specifically identified. Numerous types of information 168 may be associated with projection onto one or more projection surfaces 166 that are specifically identified. Examples of such information 168 include, but are not limited to, the location of the one or more projection surfaces 166, one or more identifiers that are associated with the one or more projection surfaces 166, and the like.

At operation 506, the receiving operation 210 may include receiving information associated with projection at one or more specified times. In some embodiments, one or more service provider receivers 132A may receive information 168 associated with projection at one or more specified times. Numerous types of information 168 may be associated with projection at one or more specified times. Examples of such information 168 include, but are not limited to, one or more dates for projection, one or more times for projection, one or more time periods for projection, one or more requests for projection from one or more specified projectors 164 at one or more specified times, one or more requests for projection from one or more specified projectors 164 at one or more specified time periods, and the like.

At operation 508, the receiving operation 210 may include receiving information associated with projection of specified content at one or more specified times. In some embodiments, one or more service provider receivers 132A may receive information 168 associated with projection of specified content at one or more specified times. Numerous types of information 168 may be associated with projection of specified content at one or more specified times. Examples of such information 168 include, but are not limited to, one or more locations of specified content, one or more codes that may be used to access specified content, one or more descriptions of specified content, one or more filenames for files that include the specified content, one or more internet addresses that may be used to access the specified content, one or more dates for projection, one or more times for projection, one or more time periods for projection, one or more requests for projection from one or more specified projectors 164 at one or more specified times, one or more requests for projection from one or more specified projectors 164 at one or more specified time periods, and the like.

At operation 510, the receiving operation 210 may include receiving information associated with projection of specified content onto one or more projection surfaces that are specifically identified. In some embodiments, one or more service provider receivers 132A may receive information 168 associated with projection of specified content onto one or more projection surfaces 166 that are specifically identified. Numerous types of information 168 may be associated with projection of specified content onto one or more projection surfaces 166 that are specifically identified. Examples of such information 168 include, but are not limited to, one or more locations of specified content, one or more codes that may be used to access specified content, one or more descriptions of specified content, one or more filenames for files that include the specified content, one or more internet addresses that may be used to access the specified content, one or more dates for projection, one or more times for projection, one or more time periods for projection, one or more requests for projection from one or more specified projectors 164 at one or more specified times, one or more requests for projection from one or more specified projectors 164 at one or more specified time periods, the location of the one or more projection surfaces 166, one or more identifiers that are associated with the one or more projection surfaces 166, and the like.

Figure 6:
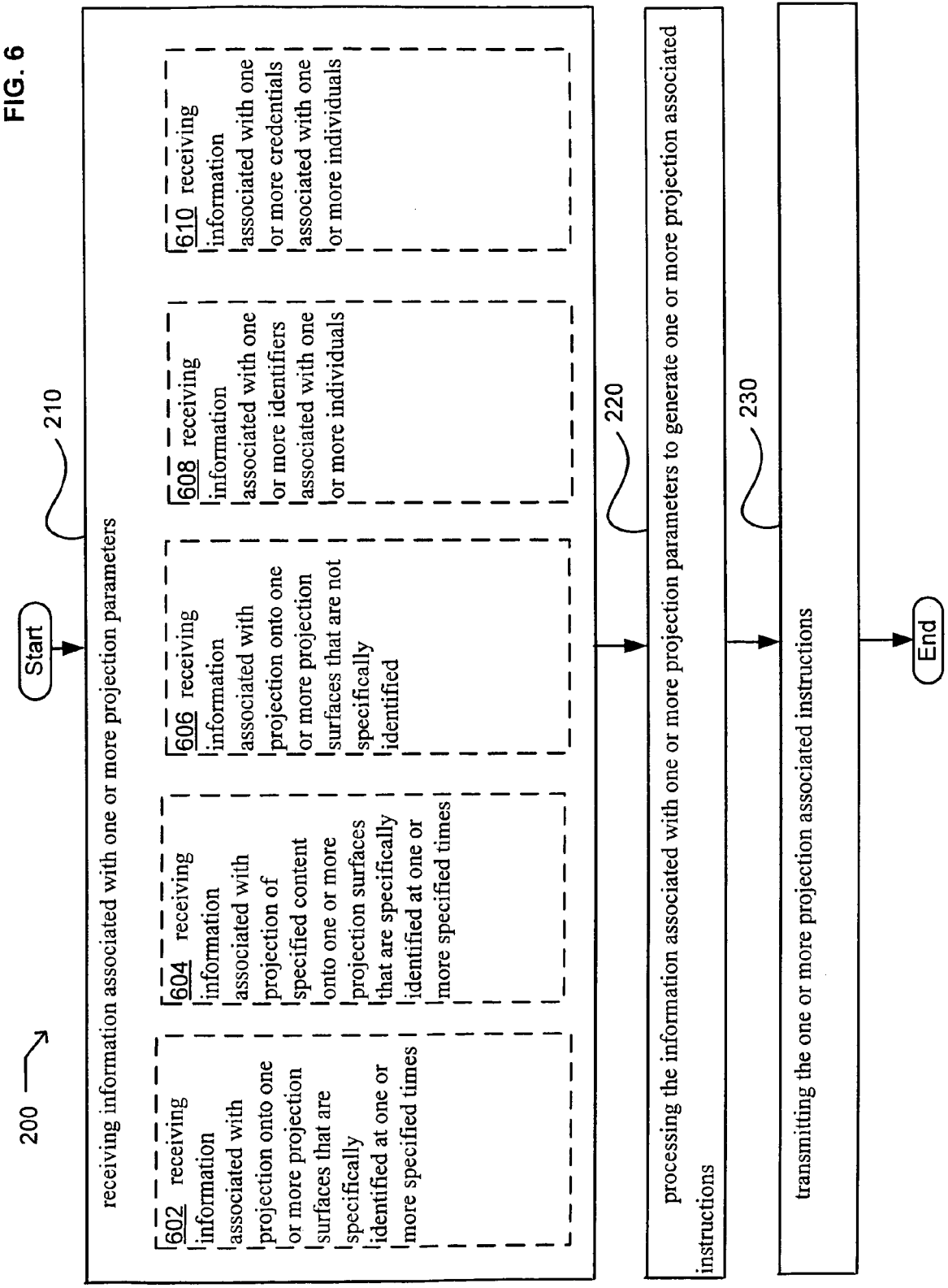

FIG. 6 illustrates alternative embodiments of the example operational flow 200 of FIG. 2. FIG. 6 illustrates example embodiments where the receiving operation 210 may include at least one additional operation. Additional operations may include an operation 602, operation 604, operation 606, operation 608, and/or operation 610.

At operation 602, the receiving operation 210 may include receiving information associated with projection onto one or more projection surfaces that are specifically identified at one or more specified times. In some embodiments, one or more service provider receivers 132A may receive information 168 associated with projection onto one or more projection surfaces 166 that are specifically identified at one or more specified times. Numerous types of information 168 may be associated with projection onto one or more projection surfaces 166 that are specifically identified at one or more specified times. Examples of such information 168 include, but are not limited to, one or more dates for projection, one or more times for projection, one or more time periods for projection, one or more requests for projection from one or more specified projectors 164 at one or more specified times, one or more requests for projection from one or more specified projectors 164 at one or more specified time periods, the location of the one or more projection surfaces 166, one or more identifiers that are associated with the one or more projection surfaces 166, and the like.

At operation 604, the receiving operation 210 may include receiving information associated with projection of specified content onto one or more projection surfaces that are specifically identified at one or more specified times. In some embodiments, one or more service provider receivers 132A may receive information 168 associated with projection of specified content onto one or more projection surfaces 166 that are specifically identified at one or more specified times. Numerous types of information 168 may be received that are associated with projection of specified content onto one or more projection surfaces 166 that are specifically identified at one or more specified times. Examples of such information 168 include, but are not limited to, one or more locations of specified content, one or more codes that may be used to access specified content, one or more descriptions of specified content, one or more filenames for files that include the specified content, one or more internet addresses that may be used to access the specified content, one or more dates for projection, one or more times for projection, one or more time periods for projection, one or more requests for projection from one or more specified projectors 164 at one or more specified times, one or more requests for projection from one or more specified projectors 164 at one or more specified time periods, the location of the one or more projection surfaces 166, one or more identifiers that are associated with the one or more projection surfaces 166, one or more user parameters, and the like.

At operation 606, the receiving operation 210 may include receiving information associated with projection onto one or more projection surfaces that are not specifically identified. In some embodiments, one or more service provider receivers 132A may receive information 168 associated with projection onto one or more projection surfaces 166 that are not specifically identified. Numerous types of information 168 may be associated with projection onto one or more projection surfaces 166 that are not specifically identified. Examples of such information 168 include, but are not limited to, availability of one or more projection surfaces 166, location of one or more projection surfaces 166, proximity of one or more individuals to one or more projection surfaces 166, proximity of one or more users 110 to one or more projection surfaces 166, projection scheduling associated with one or more projection surfaces 166, one or more user parameters, and the like.

At operation 608, the receiving operation 210 may include receiving information associated with one or more identifiers associated with one or more individuals. In some embodiments, one or more service provider receivers 132A may receive information 168 associated with one or more identifiers associated with one or more individuals. Numerous types of information 168 may be associated with one or more identifiers associated with one or more individuals. Examples of such identifiers include, but are not limited to, one or more names associated with one or more individuals, one or more access codes associated with one or more individuals, one or more accounts associated with one or more individuals, one or more financial accounts associated with one or more individuals, one or more biometric identifiers associated with one or more individuals (e.g., fingerprints, retinal scans, facial recognition, gait recognition), and the like. Accordingly, in some embodiments, one or more service provider receivers 132A may receive information 168 associated with one or more identifiers associated with one or more individuals from one or more sensors 156.

At operation 610, the receiving operation 210 may include receiving information associated with one or more credentials associated with one or more individuals. In some embodiments, one or more service provider receivers 132A may receive information 168 associated with one or more credentials associated with one or more individuals. Numerous types of information 168 may be associated with one or more credentials associated with one or more individuals. Examples of such credentials include, but are not limited to, credit ratings, credit card levels, financial accounts, licenses, and the like.

Figure 7:
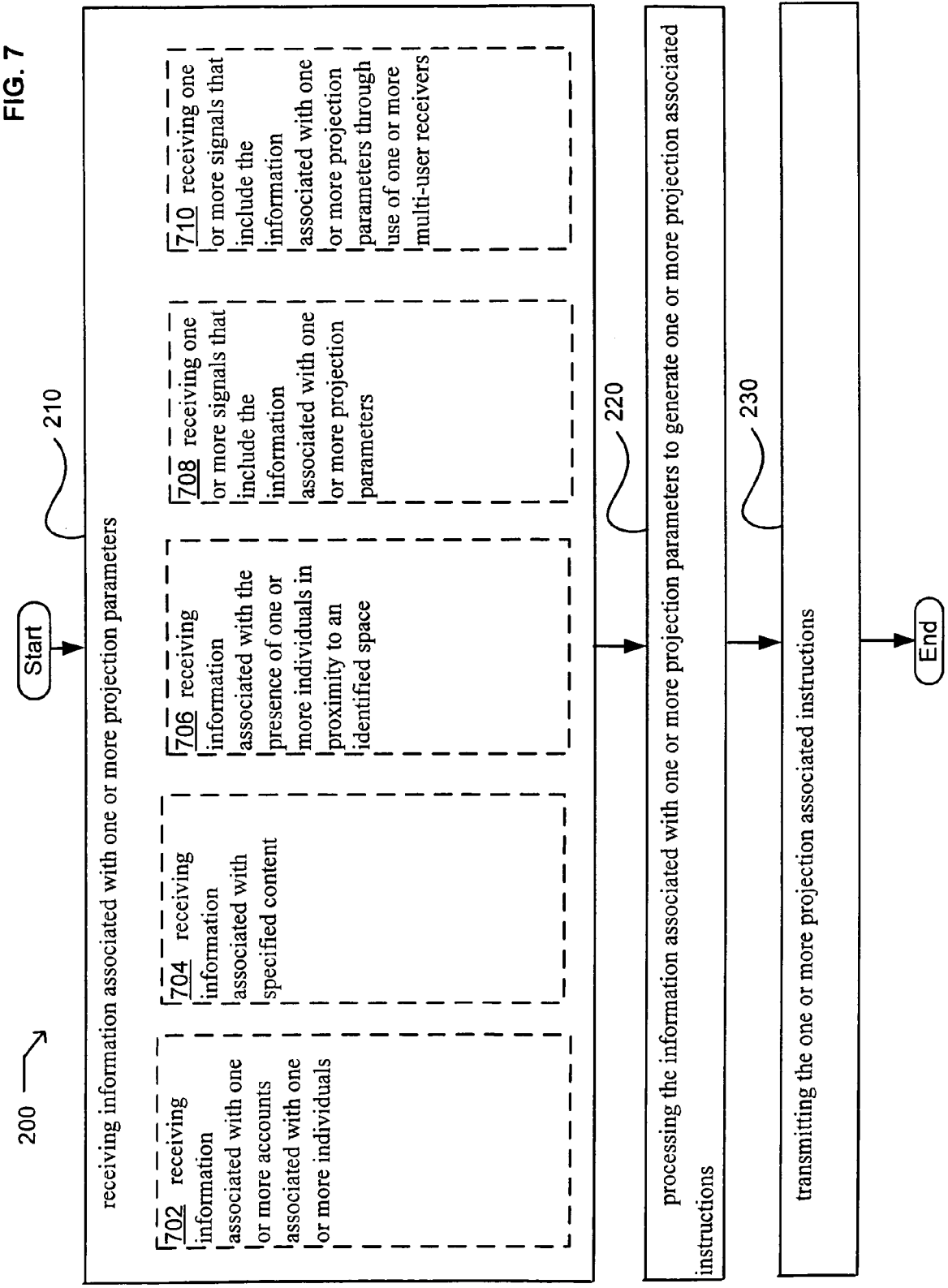

FIG. 7 illustrates alternative embodiments of the example operational flow 200 of FIG. 2. FIG. 7 illustrates example embodiments where the receiving operation 210 may include at least one additional operation. Additional operations may include an operation 702, operation 704, operation 706, operation 708, and/or operation 710.

At operation 702, the receiving operation 210 may include receiving information associated with one or more accounts associated with one or more individuals. In some embodiments, one or more service provider receivers 132A may receive information 168 associated with one or more accounts associated with one or more individuals. Numerous types of information 168 may be received that are associated with one or more accounts associated with one or more individuals. Examples of such information 168 include, but are not limited to, information 168 associated with one or more projection accounts, information 168 associated with one or more financial accounts, information 168 associated with the availability of funds, information 168 associated with one or more credit ratings, information 168 associated with the location of one or more accounts, information 168 associated with the identity of one or more financial entities 122 that maintain one or more accounts for one or more individuals, and the like.

At operation 704, the receiving operation 210 may include receiving information associated with specified content. In some embodiments, one or more service provider receivers 132A may receive information 168 associated with specified content. Numerous types of information 168 may be associated with specified content. Examples of such information 168 include, but are not limited to, information 168 associated with the type of specified content (e.g., children's content, adult content, movies, text, pictures, instructions), information 168 associated with the location of specified content (e.g., one or more filenames, one or more internet addresses, one or more databases), and the like. In some embodiments, one or more service provider receivers 132A may receive specified content. For example, in some embodiments, one or more service provider receivers 132A may receive one or more signals 170 that include the specified content.

At operation 706, the receiving operation 210 may include receiving information associated with the presence of one or more individuals in proximity to an identified space. In some embodiments, one or more service provider receivers 132A may receive information 168 associated with the presence of one or more individuals in proximity to an identified space. For example, in some embodiments, one or more service provider receivers 132A may receive information 168 associated with one or more individuals who are within an identified space. In some embodiments, one or more service provider receivers 132A may receive information 168 associated with tags (e.g., radio frequency identification tags, key cards) that are associated with one or more individuals within an identified space. In some embodiments, one or more service provider receivers 132A may receive information 168 associated with one or more mobile devices (e.g., cellular telephones, pagers, radios) that are associated with one or more individuals within an identified space. In some embodiments, one or more service provider receivers 132A may receive information 168 associated with sensors 156 (e.g., motion sensors 156, infrared sensors 156, voice recognition, facial recognition) that are configured to detect one or more individuals within an identified space.

At operation 708, the receiving operation 210 may include receiving one or more signals that include the information associated with one or more projection parameters. In some embodiments, one or more service provider receivers 132A may receive information 168 associated with one or more projection parameters. A service provider receiver 132A may receive numerous types of signals 170. Examples of such signals 170 include, but are not limited to, infrared signals 170, acoustic signals 170, radiofrequency signals 170, optic signals 170, radio signals 170, and the like. One or more service provider receivers 132A may receive one or more signals 170 from numerous sources. Examples of such sources include, but are not limited to, a user communications device 112, a device interface module 116, a financial entity 122, a sensor interface module 158, a communications network 128, and the like. One or more service provider receivers 132A may receive numerous types of information 168 associated with projection parameters. In some embodiments, a projection parameter may be a request for projection. Examples of requests for projection include, but are not limited to, requests for projection at one or more times, requests for projection onto one or more projection surfaces 166, requests for projection of selected content, and the like. In some embodiments, a projection parameter may be associated with the identity of one or more individuals. Examples of such projection parameters include, but are not limited to, the identity of an individual, the status of an individual, the location of the individual, and the like. In some embodiments, a projection parameter may be associated with financial information 126 that is associated with one or more individuals. Examples of such financial information 126 include, but are not limited to, funds present in one or more accounts, credit limits, passwords that are associated with one or more accounts, association with one or more financial entities 122, and the like. In some embodiments, a projection parameter may be associated with membership information 168 that is associated with one or more individuals. Examples of such membership information 168 include, but are not limited to, frequent flier memberships, credit card associated memberships, retail store memberships (e.g., coffee shop memberships, department store memberships, conference center memberships), club memberships (e.g., social clubs, athletic clubs, diners club, travel clubs), and the like.

In some embodiments, a user 110 may establish a projection account that is associated with system 100. For example, in some embodiments, system 100 may be configured for use in a commercial establishment (e.g., a café) that offers projection services. In some embodiments, a user 110 may pay to utilize system 100 within the commercial establishment. Accordingly, in some embodiments, a user 110 may create an account (e.g., a prepaid account, a monthly service fee, a prepaid card, etc.) that may be used to purchase projection services within a commercial establishment. In some embodiments, projection parameters may include information 168 associated with payment for projection services.

In some embodiments, one or more service provider receivers 132A may receive information 168 associated with projection parameters that are related to conditions of projection. For example, in some embodiments, projection parameters may include light conditions surrounding a projection surface 166, movement of a projection surface 166, shape of a projection surface 166, location of a projection surface 166, and the like. Accordingly, in some embodiments, one or more service provider receivers 132A may receive information 168 associated with one or more projection parameters from one or more projection surfaces 166.

At operation 710, the receiving operation 210 may include receiving one or more signals that include the information associated with one or more projection parameters through use of one or more multi-user receivers. In some embodiments, one or more service provider receivers 132A may receive information 168 associated with one or more projection parameters through use of one or more multi-user receivers. For example, in some embodiments, a service provider receiver 132A may be configured as a multiple user receiver that may receive signals 170 that are transmitted by two or more users 110. In some embodiments, a multiple user receiver may be configured to receive numerous types of signals 170. For example, in some embodiments, a multiple user receiver may receive a text message from a first user 110, a voice command from a second user 110, and a Bluetooth signal from a third user 110.

Figure 8:
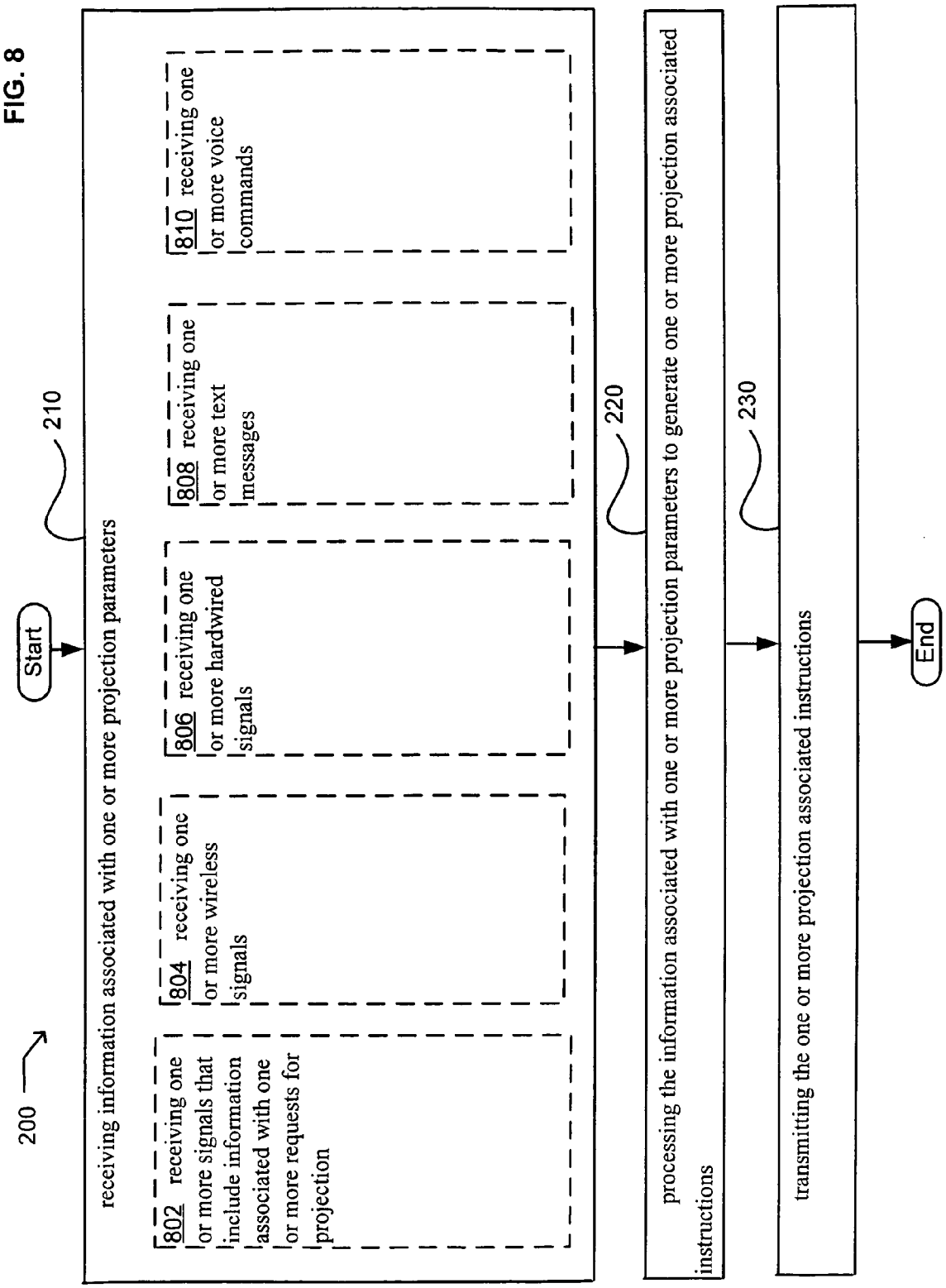

FIG. 8 illustrates alternative embodiments of the example operational flow 200 of FIG. 2. FIG. 8 illustrates example embodiments where the receiving operation 210 may include at least one additional operation. Additional operations may include an operation 802, operation 804, operation 806, operation 808, and/or operation 810.

At operation 802, the receiving operation 210 may include receiving one or more signals that include information associated with one or more requests for projection. In some embodiments, one or more service provider receivers 132A may receive information 168 associated with one or more requests for projection. A service provider receiver 132A may receive numerous types of signals 170. Examples of such signals 170 include, but are not limited to, infrared signals 170, acoustic signals 170, radiofrequency signals 170, optic signals 170, radio signals 170, and the like. One or more service provider receivers 132A may receive one or more signals 170 from numerous sources. Examples of such sources include, but are not limited to, a user communications device 112, a device interface module 116, a financial entity 122, a sensor interface module 158, a communications network 128, and the like. Signals 170 that include numerous types of information 168 may be received. Examples of such information 168 include, but are not limited to, requests to project specified content, requests to project at one or more requested times, requests to project for one or more time intervals, requests to project for an indicated duration, and the like.

At operation 804, the receiving operation 210 may include receiving one or more wireless signals. In some embodiments, one or more service provider receivers 132A may receive one or more wireless signals 170. Numerous types of wireless signals 170 may be received by one or more service provider receivers 132A. For example, in some embodiments, one or more service provider receivers 132A may receive one or more Bluetooth signals 170 that include information 168 associated with one or more requests for projection.

At operation 806, the receiving operation 210 may include receiving one or more hardwired signals. In some embodiments, one or more service provider receivers 132A may receive one or more hardwired signals 170. Numerous types of hardwired signals 170 may be received by one or more service provider receivers 132A. For example, in some embodiments, one or more service provider receivers 132A may receive one or more optical signals 170 that include information 168 associated with one or more requests for projection.

At operation 808, the receiving operation 210 may include receiving one or more text messages. In some embodiments, one or more service provider receivers 132A may receive one or more text messages. For example, in some embodiments, a user 110 may use a cellular telephone to send a text message that is received by one or more service provider receivers 132A. A text message may include numerous types of information 168. Examples of such information 168 include, but are not limited to, requests to project specified content, requests to project at one or more requested times, requests to project for one or more time intervals, requests to project for an indicated duration, and the like.

At operation 810, the receiving operation 210 may include receiving one or more voice commands. In some embodiments, one or more service provider receivers 132A may receive one or more voice commands. For example, in some embodiments, a user 110 may use a cellular telephone to send a voice command that is received by one or more service provider receivers 132A. A voice command may include numerous types of requests for projection. Examples of such requests include, but are not limited to, requests to project specified content, requests to project at one or more requested times, requests to project for one or more time intervals, request to project for an indicated duration, and the like.

Figure 9:
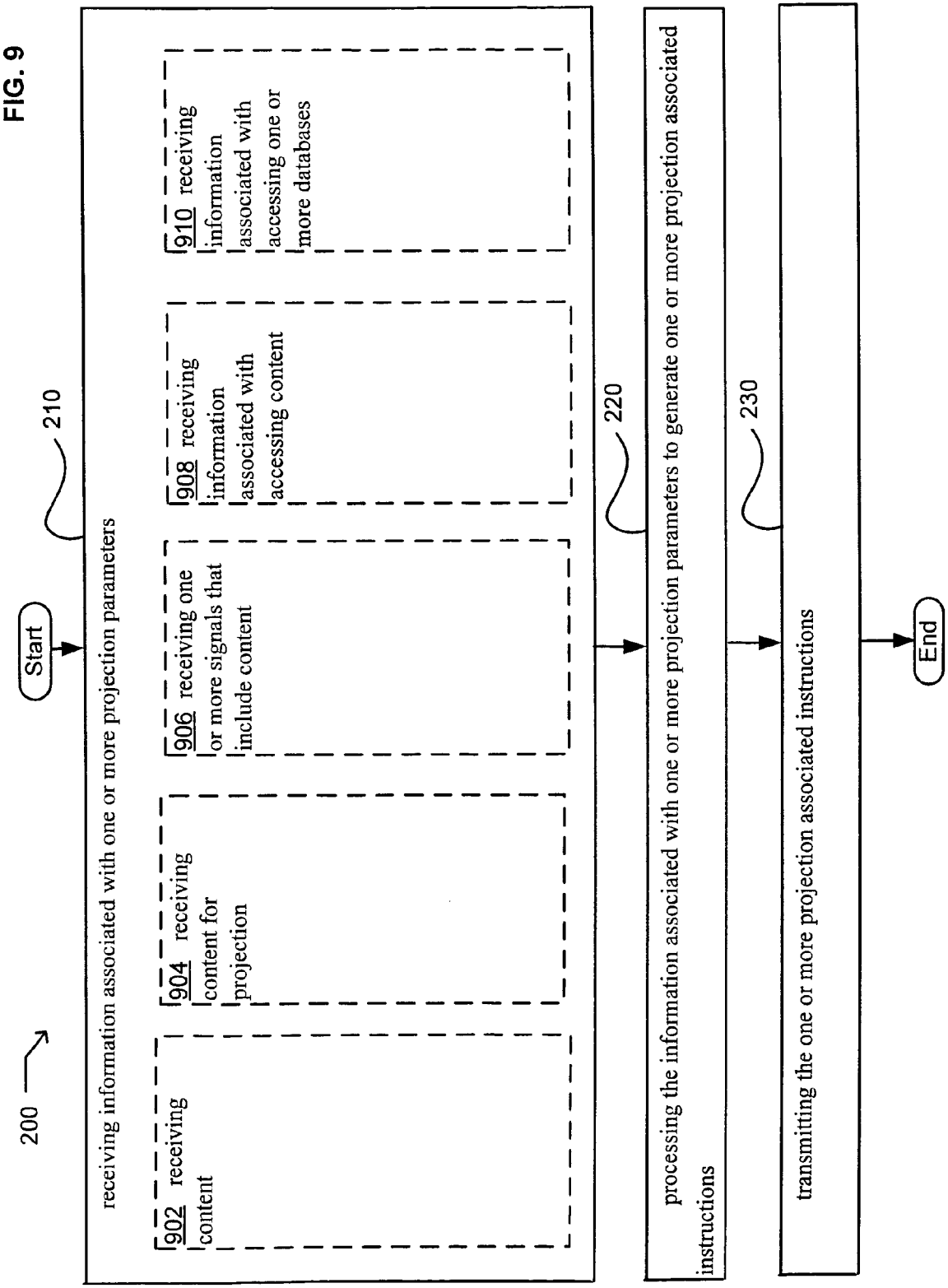

FIG. 9 illustrates alternative embodiments of the example operational flow 200 of FIG. 2. FIG. 9 illustrates example embodiments where the receiving operation 210 may include at least one additional operation. Additional operations may include an operation 902, operation 904, operation 906, operation 908, and/or operation 910.

At operation 902, the receiving operation 210 may include receiving content. In some embodiments, one or more service provider receivers 132A may receive content. In some embodiments, one or more service provider receivers 132A may receive content from one or more databases. In some embodiments, one or more service provider receivers 132A may receive content from one or more memories. In some embodiments, one or more service provider receivers 132A may receive content from the internet. Accordingly, in some embodiments, one or more service provider receivers 132A may receive content from numerous sources. In some embodiments, one or more service provider receivers 132A may receive numerous types of content. Examples of such content include, but are not limited to, projection instructions, content for projection, content that is not to be projected, and the like.

At operation 904, the receiving operation 210 may include receiving content for projection. In some embodiments, one or more service provider receivers 132A may receive content for projection. In some embodiments, one or more service provider receivers 132A may receive content for projection from one or more databases. In some embodiments, one or more service provider receivers 132A may receive content for projection from one or more memories. In some embodiments, one or more service provider receivers 132A may receive content for projection from the internet. Accordingly, in some embodiments, one or more service provider receivers 132A may receive content for projection from numerous sources. In some embodiments, one or more service provider receivers 132A may receive numerous types of content for projection. Examples of such content include, but are not limited to, instructions, text, pictures, movies, videos, music videos, and the like.

At operation 906, the receiving operation 210 may include receiving one or more signals that include content. In some embodiments, one or more service provider receivers 132A may receive one or more signals 170 that include content. A service provider receiver 132A may receive numerous types of signals 170 that include content. Examples of such signals 170 include, but are not limited to, infrared signals 170, acoustic signals 170, radiofrequency signals 170, optic signals 170, radio signals 170, and the like. One or more service provider receivers 132A may receive one or more signals 170 from numerous sources. Examples of such sources include, but are not limited to, a user communications device 112, a device interface module 116, a financial entity 122, a sensor interface module 158, a communications network 128, and the like. In some embodiments, one or more signals 170 may include numerous types of content. Examples of such content include, but are not limited to, projection instructions, content for projection, content that is not to be projected, and the like.

At operation 908, the receiving operation 210 may include receiving information associated with accessing content. In some embodiments, one or more service provider receivers 132A may receive information 168 associated with accessing content. For example, in some embodiments, one or more service provider receivers 132A may receive access codes that may be used to access content. In some embodiments, one or more service provider receivers 132A may receive passwords that may be used to access content. In some embodiments, one or more service provider receivers 132A may receive one or more internet addresses that may be used to access content. In some embodiments, one or more service provider receivers 132A may receive the locations of memory that includes content. Accordingly, one or more service provider receivers 132A may receive many types of information 168 that may be used to access content.

At operation 910, the receiving operation 210 may include receiving information associated with accessing one or more databases. In some embodiments, one or more service provider receivers 132A may receive information 168 associated with accessing one or more databases. In some embodiments, one or more service provider receivers 132A may receive numerous types of information 168 associated with accessing one or more databases. Examples of such information 168 include, but are not limited to, access codes, location of one or more databases, internet addresses of one or more databases, and the like.

Figure 10:
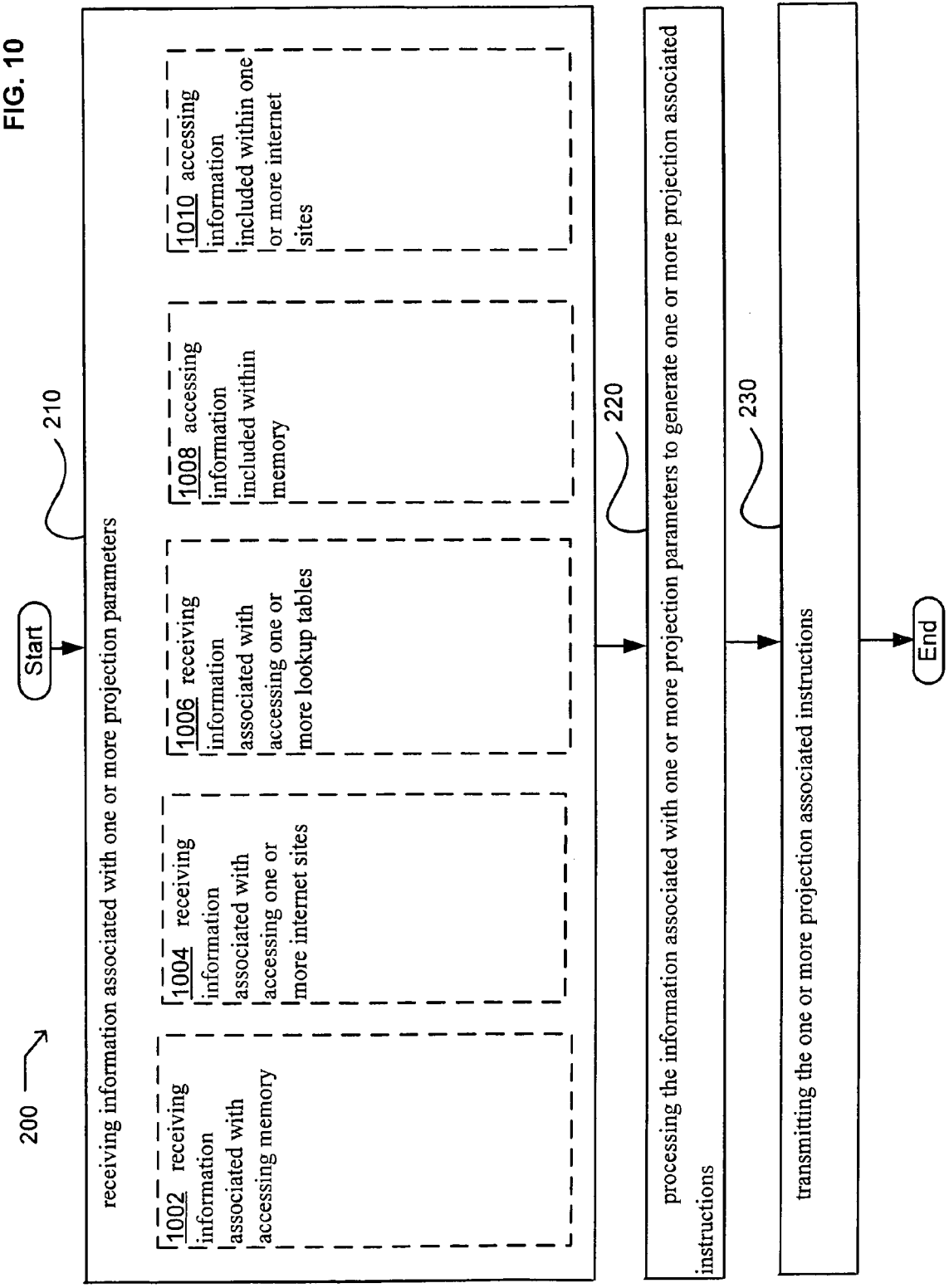

FIG. 10 illustrates alternative embodiments of the example operational flow 200 of FIG. 2. FIG. 10 illustrates example embodiments where the receiving operation 210 may include at least one additional operation. Additional operations may include an operation 1002, operation 1004, operation 1006, operation 1008, and/or operation 1010.

At operation 1002, the receiving operation 210 may include receiving information associated with accessing memory. In some embodiments, one or more service provider receivers 132A may receive information 168 associated with accessing memory 144. In some embodiments, one or more service provider receivers 132A may receive numerous types of information 168 associated with accessing memory 144. Examples of such information 168 include, but are not limited to, access codes, location of memory, and the like.

At operation 1004, the receiving operation 210 may include receiving information associated with accessing one or more internet sites. In some embodiments, one or more service provider receivers 132A may receive information 168 associated with accessing one or more internet sites. In some embodiments, one or more service provider receivers 132A may receive numerous types of information 168 associated with accessing one or more internet sites. Examples of such information 168 include, but are not limited to, access codes, location of one or more internet sites, internet addresses of one or more internet sites, and the like.

At operation 1006, the receiving operation 210 may include receiving information associated with accessing one or more lookup tables. In some embodiments, one or more service provider receivers 132A may receive information 168 associated with accessing one or more lookup tables. In some embodiments, one or more service provider receivers 132A may acquire numerous types of information 168 associated with accessing one or more lookup tables. Examples of such information 168 include, but are not limited to, access codes, location of one or more lookup tables, and the like.

At operation 1008, the receiving operation 210 may include accessing information included within memory. In some embodiments, one or more service provider receivers 132A may access information 168 included within memory. For example, in some embodiments, one or more service provider receivers 132A may receive one or more signals 170 that include information 168 that is stored in memory.

At operation 1010, the receiving operation 210 may include accessing information included within one or more internet sites. In some embodiments, one or more service provider receivers 132A may access information 168 included within one or more internet sites. For example, in some embodiments, one or more service provider receivers 132A may receive one or more signals 170 that include information 168 that is included within one or more internet sites.

Figure 11:
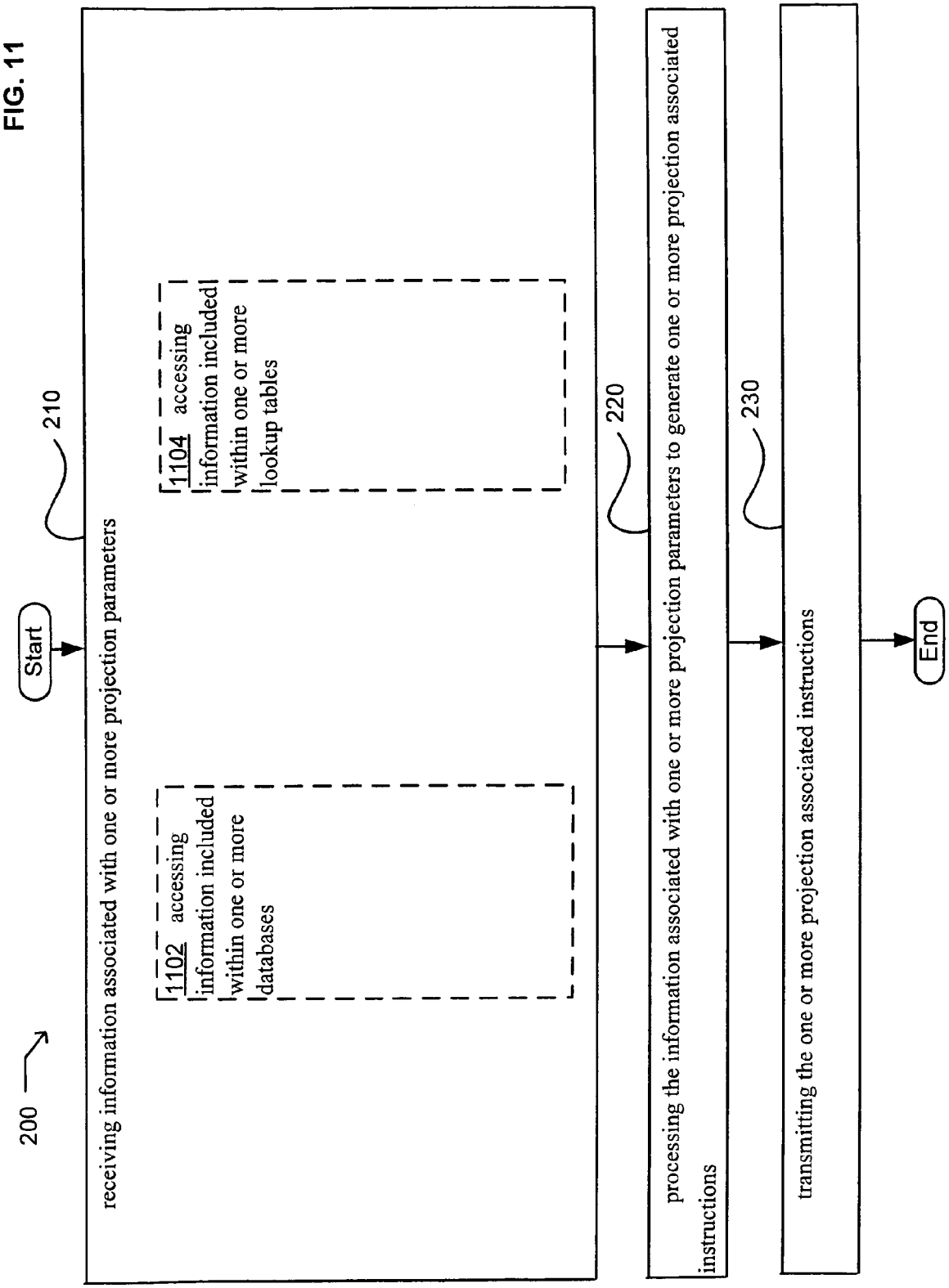

FIG. 11 illustrates alternative embodiments of the example operational flow 200 of FIG. 2. FIG. 11 illustrates example embodiments where the receiving operation 210 may include at least one additional operation. Additional operations may include an operation 1102, and/or operation 1104.

At operation 1102, the receiving operation 210 may include accessing information included within one or more databases. In some embodiments, one or more service provider receivers 132A may receive information 168 associated with accessing information 168 included within one or more databases. For example, in some embodiments, one or more service provider receivers 132A may receive one or more signals 170 that include information 168 that is included within one or more databases.

At operation 1104, the receiving operation 210 may include accessing information included within one or more lookup tables. In some embodiments, one or more service provider receivers 132A may receive information 168 associated with accessing information 168 included within one or more lookup tables. For example, in some embodiments, one or more service provider receivers 132A may receive one or more signals 170 that include information 168 that is included within one or more lookup tables.

Figure 12:
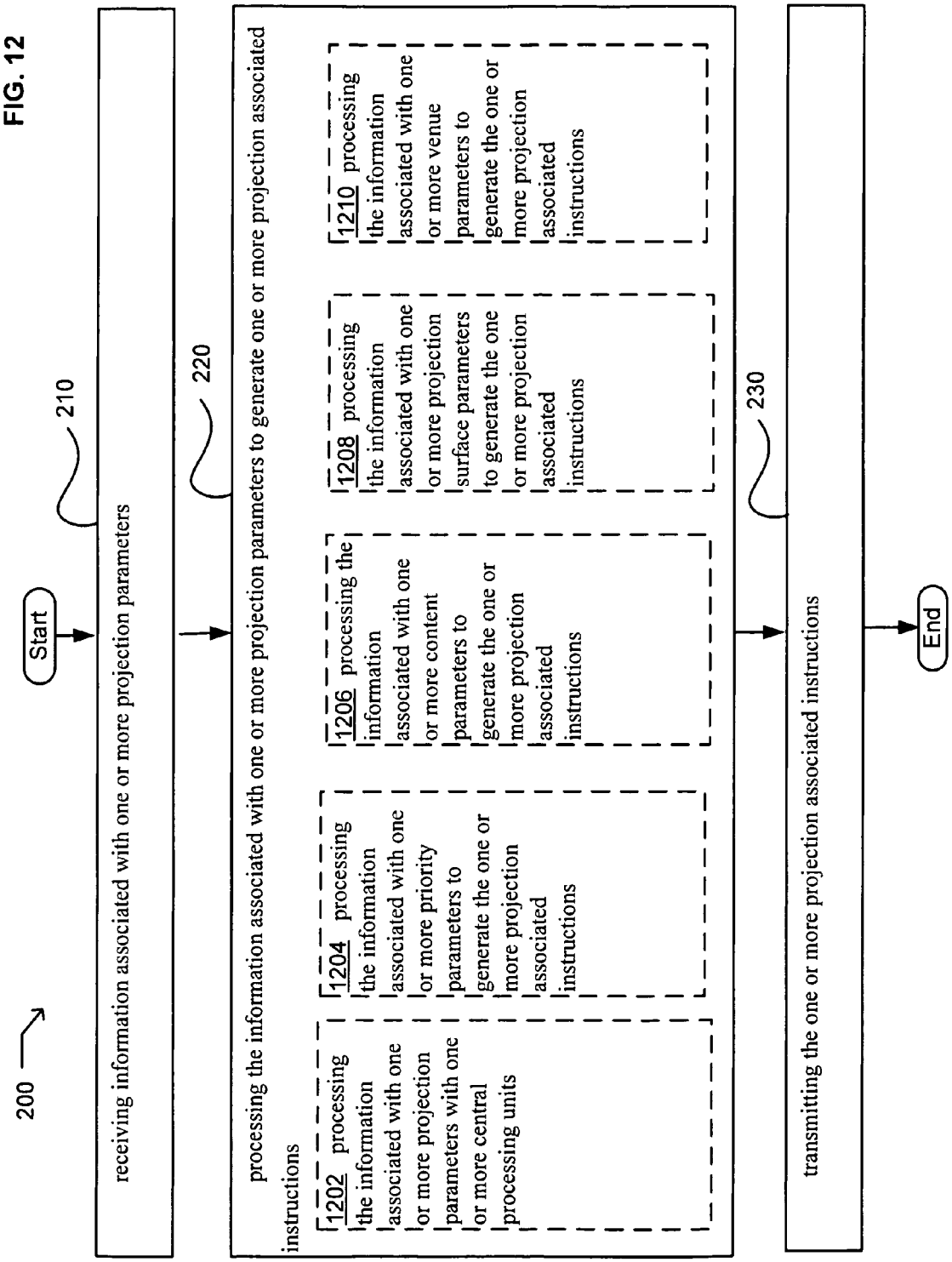

FIG. 12 illustrates alternative embodiments of the example operational flow 200 of FIG. 2. FIG. 12 illustrates example embodiments where the processing operation 220 may include at least one additional operation. Additional operations may include an operation 1202, operation 1204, operation 1206, operation 1208, and/or operation 1210.

At operation 1202, the processing operation 220 may include processing the information associated with one or more projection parameters with one or more central processing units. In some embodiments, one or more processors 134 may process the information 168 associated with one or more projection parameters with one or more central processing units.

At operation 1204, the processing operation 220 may include processing the information associated with one or more priority parameters to generate the one or more projection associated instructions. In some embodiments, one or more processors 134 may process the information 168 associated with one or more priority parameters to generate one or more projection associated instructions. In some embodiments, one or more processors 134 may process information 168 associated with the status of two or more users 110 who request projection services to prioritize projection for the two or more users 110. For example, in some embodiments, one or more processors 134 may assign higher priority to a first user 110 who has a higher status rating and assign lower priority to a second user 110 who has lower status to generate one or more instructions to prioritize projection for the first user 110. Accordingly, in some embodiments, a first user 110 with a higher status rating may receive preferred use of projection services over other users 110 having lower status ratings. In some embodiments, one or more processors 134 may dynamically process information 168 associated with the status of two or more users 110 who request projection services to prioritize projection for the two or more users 110. For example, in some embodiments, one or more processors 134 may substantially continuously receive information 168 associated with the status of one or more users 110 and substantially continuously process the information 168 to dynamically assign priority for use of projection services based on the substantially continuously adjusted status rating of the one or more users 110. Accordingly, one or more instructions may be generated to project in accordance with the assigned priority. Many types of information 168 may be used as priority parameters. Examples of such types of information 168 include, but are not limited to, club memberships, credit card memberships, credit ratings, credit limits, and the like.

At operation 1206, the processing operation 220 may include processing the information associated with one or more content parameters to generate the one or more projection associated instructions. In some embodiments, one or more processors 134 may process the information 168 associated with one or more content parameters to generate one or more projection associated instructions. Numerous types of content parameters may be processed. Examples of such content parameters include, but are not limited to, format of content (e.g., JPEG, GIF, TIFF, XML, SVG), type of content (e.g., children's content, adult content, financial information 126, sports information 168, text, pictures, etc.), location of content (e.g., internet address, filename, file folder), and the like. In some embodiments, one or more processors 134 may process the content information 168 to assign the content to one or more projectors and generate one or more instructions in accordance with projector assignment. For example, in some embodiments, content that is related to statistics associated with a sports team may be assigned for projection on a projection surface 166 that is proximate to an area where a game involving the sports team is being displayed. Accordingly, one or more instructions may be generated to instruct the selected projector 164 to project the selected content. In some embodiments, content that is appropriate for children may be assigned for projection on a projection surface 166 that is located within a play area for children and one or more instructions may be generated in accordance with the assignment.

At operation 1208, the processing operation 220 may include processing the information associated with one or more projection surface parameters to generate the one or more projection associated instructions. In some embodiments, one or more processors 134 may process the information 168 associated with one or more projection surface parameters to generate one or more projection associated instructions. One or more processors 134 may process information 168 associated with numerous types of projection surface parameters. Examples of such projection surface parameters include, but are not limited to, availability of one or more projection surfaces 166, location of one or more projection surfaces 166, light transmission properties of one or more projection surfaces 166, image capture capabilities associated with one or more projection surfaces 166, physical characteristics of one or more projection surfaces 166 (e.g., size, shape, contours), one or more scheduled times of projection for one or more projection surfaces 166, one or more scheduled time periods of projection for one or more projection surfaces 166, and the like. For example, in some embodiments, one or more processors 134 may process information 168 associated with capture capabilities associated with one or more projection surfaces 166 to determine whether to project confidential information on the one or more projection surfaces 166. Accordingly, one or more instructions may be generated that instruct one or more projectors 164 to project or not to project onto one or more projection surfaces 166. In some embodiments, one or more processors 134 may process information 168 associated with the light transmission characteristics of one or more projection surfaces 166 to generate one or more instruction for one or more projectors to project wavelengths of light that are appropriate for the one or more projection surfaces 166.

At operation 1210, the processing operation 220 may include processing the information associated with one or more venue parameters to generate the one or more projection associated instructions. In some embodiments, one or more processors 134 may process the information 168 associated with one or more venue parameters to generate one or more projection associated instructions. One or more processors 134 may process information 168 associated with numerous types of venue parameters. Examples of such venue parameters include, but are not limited to, type of venue (e.g., café, coffee shop, restaurant, boat, automobile, bus, train, airplane, bar, pub, arena, child care center, medical office, dental office, hospital, assembly line), location of venue (e.g., GPS coordinates, address, country), and the like. In some embodiments, one or more processors 134 may process information 168 associated with the type of venue to select content for projection at the venue. Accordingly, one or more instructions may be generated that instruct one or more projectors 164 to project selected content. For example, in some embodiments, one or more processors 134 may process information 168 associated with projection on an airplane to select one or more movies for projection on the airplane. In some embodiments, one or more processors 134 may process information 168 associated with projection on an airplane to select content for projection having a projection time that is matched to the flight time of the airplane.

Figure 13:
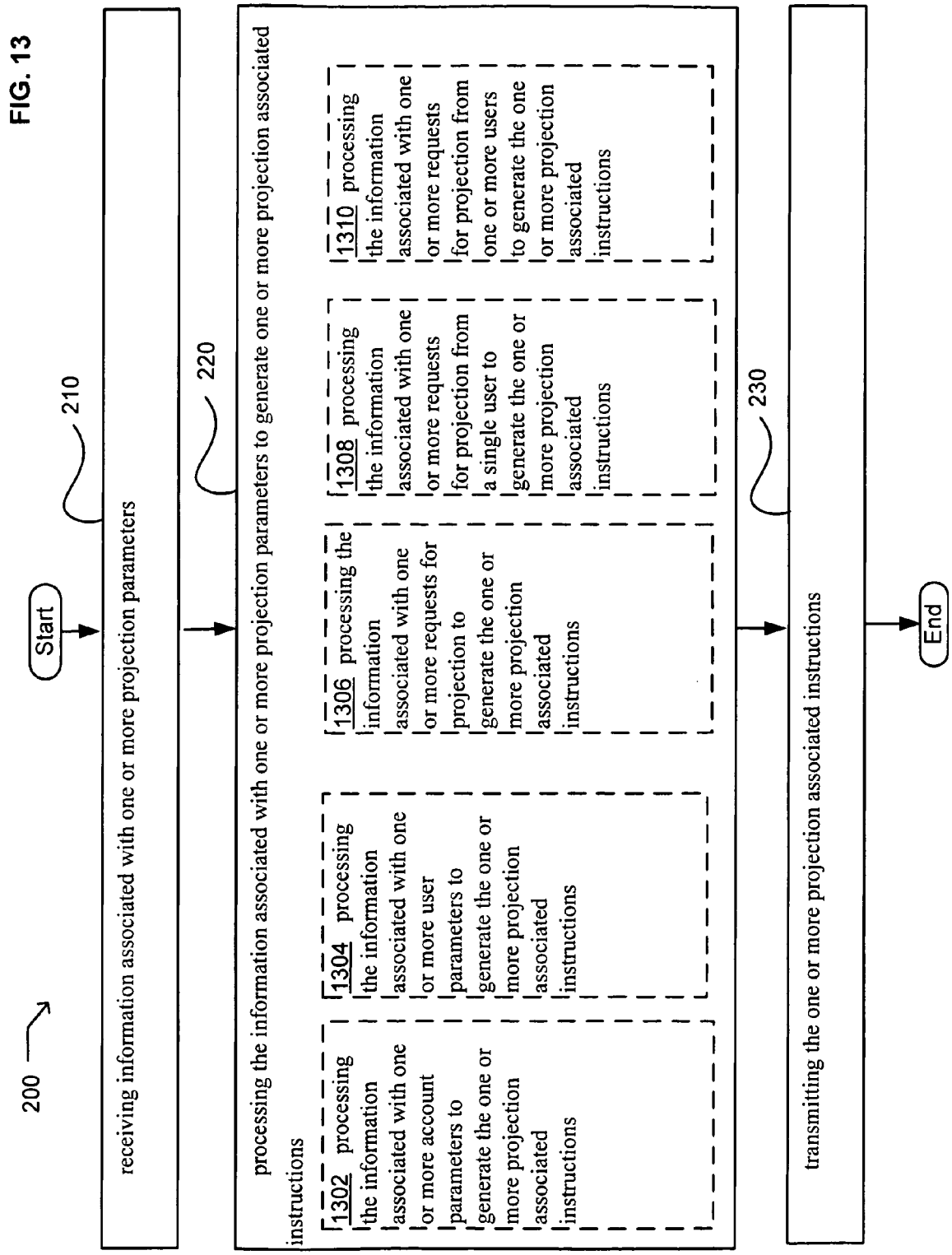

FIG. 13 illustrates alternative embodiments of the example operational flow 200 of FIG. 2. FIG. 13 illustrates example embodiments where the processing operation 220 may include at least one additional operation. Additional operations may include an operation 1302, operation 1304, operation 1306, operation 1308, and/or operation 1310.

At operation 1302, the processing operation 220 may include processing the information associated with one or more account parameters to generate the one or more projection associated instructions. In some embodiments, one or more processors 134 may process the information 168 associated with one or more account parameters to generate one or more projection associated instructions. One or more processors 134 may process information 168 associated with numerous types of account parameters. Examples of such account parameters include, but are not limited to, one or more codes for accessing one or more accounts, one or more locations of one or more accounts, one or more account numbers of one or more accounts, one or more routing codes associated with one or more accounts, availability of funds contained within one or more accounts, assets contained within one or more accounts, and the like. In some embodiments, one or more processors 134 may process information 168 associated with the availability of funds in an account to authorize a request for projection by a user 110. Accordingly, one or more instructions to project in accordance with the availability of funds in a financial account may be generated. In some embodiments, one or more processors 134 may process information 168 associated with the financial accounts of two or more users 110 to prioritize projection for the two or more users 110 based on the ability of the two or more users 110 to pay for the projection services. Accordingly, one or more instructions to project in accordance with the ability to pay for projection services may be generated.

At operation 1304, the processing operation 220 may include processing the information associated with one or more user parameters to generate the one or more projection associated instructions. In some embodiments, one or more processors 134 may process the information 168 associated with one or more user parameters to generate one or more projection associated instructions. One or more processors 134 may process information 168 associated with numerous types of user parameters. Examples of such user parameters include, but are not limited to, ages of one or more users 110, genders of one or more users 110, financial accounts associated with one or more users 110, status associated with one or more users 110, priority associated with one or more users 110, hobbies associated with one or more users 110, activities associated with one or more users 110, memberships associated with one or more users 110, locations associated with one or more users 110, and the like. In some embodiments, one or more processors 134 may process information 168 associated with the ages of one or more users to determine if content that is requested is appropriate to project. Accordingly, in some embodiments, one or more processors 134 may process user information 168 to determine whether it is appropriate or not to project requested content and generate one or more associated instructions. In some embodiments, one or more processors 134 may process user information 168 to generate instructions for one or more projectors to project content that is related to one or more interests associated with one or more individuals. For example, in some embodiments, one or more processors 134 may process information 168 associated with an activity in which an individual engages and instructs one or more projectors to project content related to the activity.

At operation 1306, the processing operation 220 may include processing the information associated with one or more requests for projection to generate the one or more projection associated instructions. In some embodiments, one or more processors 134 may process the information 168 associated with one or more requests for projection to generate one or more projection associated instructions. One or more processors 134 may process information 168 associated with numerous types of requests for projection. Examples of such parameters include, but are not limited to, one or more times requested for projection, one or more projection surfaces 166 requested for projection, one or more time periods requested for projection, one or more requests to charge a financial account, one or more requests to increase priority associated with projection, one or more requests to decrease priority associated with projection, and the like. For example, in some embodiments, one or more processors 134 may process information 168 associated with one or more requests to project at an indicated time to generate one or more instructions to project from one or more projectors 164 that are available for projection at the requested time. In some embodiments, one or more processors 134 may process information 168 associated with one or more requests to bill an indicated financial account to generate one or more instructions to bill the indicated financial account in accordance with the requested projection services.

At operation 1308, the processing operation 220 may include processing the information associated with one or more requests for projection from a single user to generate the one or more projection associated instructions. In some embodiments, one or more processors 134 may process the information 168 associated with one or more requests for projection from a single user 110 to generate one or more projection associated instructions. One or more processors 134 may process information 168 associated with numerous types of requests for projection from a single user 110. Examples of such information 168 include, but are not limited to, the identity of the user 110, status associated with the user 110, financial information 126 associated with the user 110, priority associated with the user 110, location of the user 110, gender of the user 110, age of the user 110, and the like. For example, in some embodiments, one or more processors 134 may process information 168 associated with the status of the single user 110 to generate instructions associated with the priority assigned to the request for projection services from the single user 110. For example, in some embodiments, a request for projection from a first single user 110 having a lower status than a request for projection from a second user 110 may be processed to generate one or more instructions to project content requested by the second user 110 before projecting content requested by the first single user 110.

At operation 1310, the processing operation 220 may include processing the information associated with one or more requests for projection from one or more users to generate the one or more projection associated instructions. In some embodiments, one or more processors 134 may process the information 168 associated with one or more requests for projection from one or more users 110 to generate one or more projection associated instructions. One or more processors 134 may process information 168 associated with numerous types of requests for projection from one or more users 110. Examples of such information 168 include, but are not limited to, the identities of the one or more users 110, status associated with the one or more users 110, financial information 126 associated with the one or more users 110, priorities associated with the one or more users 110, locations of the one or more users 110, genders of the one or more users 110, ages of the one or more users 110, and the like. In some embodiments, one or more processors 134 may process requests for projection from one or more users 110 to generate instructions associated with priority given to the projection request from the one or more users 110. For example, in some embodiments, one or more processors 134 may process requests for projection from two or more members of a group by combining one or more status parameters that are associated with each of the two or more members of a group and generate instructions associated with prioritization of projection for the two or more members of the group that are based on the combined status parameters. Accordingly, in some embodiments, one or more processors 134 may process one or more requests for projection and generate one or more projection associated instructions that instruct one or more projectors 164 to project in accordance with the requests from a group of users 110 having the highest combined status parameter.

Figure 14:
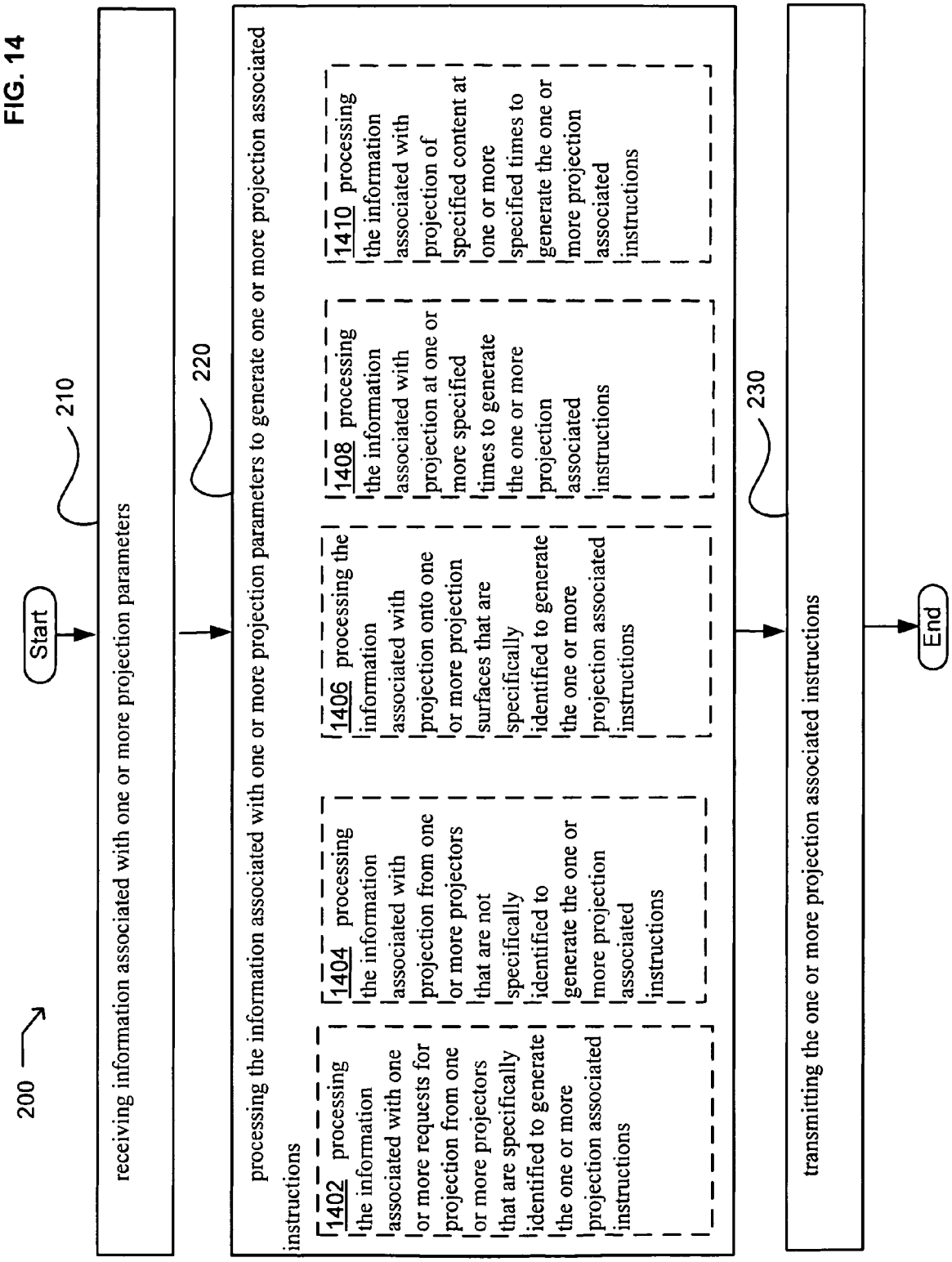

FIG. 14 illustrates alternative embodiments of the example operational flow 200 of FIG. 2. FIG. 14 illustrates example embodiments where the processing operation 220 may include at least one additional operation. Additional operations may include an operation 1402, operation 1404, operation 1406, operation 1408, and/or operation 1410.

At operation 1402, the processing operation 220 may include processing the information associated with one or more requests for projection from one or more projectors that are specifically identified to generate the one or more projection associated instructions. In some embodiments, one or more processors 134 may process the information 168 associated with one or more requests for projection from one or more projectors 164 that are specifically identified to generate one or more projection associated instructions. Numerous types of information 168 may be associated with one or more requests for projection from one or more projectors 164 that are specifically identified. Examples of such information 168 include, but are not limited to, one or more serial numbers that are associated with one or more projectors 164, one or more locations that are associated with one or more projectors 164, one or more access codes that are associated with one or more projectors 164, one or more locations of one or more projection surfaces 166, one or more identifiers that are associated with one or more projectors 164, and the like. In some embodiments, one or more processors 134 may process information 168 associated with projection from one or more specifically identified projectors 164 to generate one or more instructions to project from the one or more specifically identified projectors 164. In some embodiments, one or more processors 134 may process information 168 associated with projection from one or more specifically identified projectors 164 to generate one or more instructions to project from the one or more specifically identified projectors 164 at one or more times. In some embodiments, one or more processors 134 may process information 168 associated with projection from one or more specifically identified projectors 164 to generate one or more instructions to project from the one or more specifically identified projectors 164 for one or more time periods. In some embodiments, one or more processors 134 may process information 168 associated with projection from one or more specifically identified projectors 164 to generate one or more instructions to project specified content from the one or more specifically identified projectors 164. In some embodiments, one or more processors 134 may process information 168 associated with projection from one or more specifically identified projectors 164 to generate one or more instructions to project from the one or more specifically identified projectors 164 onto one or more specified projection surfaces 166.

At operation 1404, the processing operation 220 may include processing the information associated with projection from one or more projectors that are not specifically identified to generate the one or more projection associated instructions. In some embodiments, one or more processors 134 may process the information 168 associated with projection from one or more projectors 164 that are not specifically identified to generate one or more projection associated instructions. Numerous types of information 168 may be processed that is associated with one or more requests for projection from one or more projectors 164 that are not specifically identified. Examples of such information 168 include, but are not limited to, one or more locations that are associated with one or more projectors 164, one or more locations of one or more projection surfaces 166, and the like. For example, in some embodiments, one or more processors 134 may process one or more requests to project onto one or more projection surfaces 166 within an identified area. Accordingly, in some embodiments, one or more processors 134 may process information 168 to identify projectors 164 that are able to project onto the one or more projection surfaces 166 within the identified area and generate one or more instructions that instruct the one or more identified projectors 164 to project onto the one or more projection surfaces 166 within the identified area.

At operation 1406, the processing operation 220 may include processing the information associated with projection onto one or more projection surfaces that are specifically identified to generate the one or more projection associated instructions. In some embodiments, one or more processors 134 may process the information 168 associated with projection onto one or more projection surfaces 166 that are specifically identified to generate one or more projection associated instructions. Numerous types of information 168 may be associated with projection onto one or more projection surfaces 166 that are specifically identified. Examples of such information 168 include, but are not limited to, the location of the one or more projection surfaces 166, one or more identifiers that are associated with the one or more projection surfaces 166, and the like. For example, in some embodiments, one or more processors 134 may process information 168 to identify projectors 164 that are able to project onto the one or more identified projection surfaces 166 and generate one or more instructions that instruct the one or more identified projectors 164 to project onto the one or more identified projection surfaces 166. In some embodiments, one or more processors 134 may process information 168 to identify projectors 164 that are able to project onto the one or more identified projection surfaces 166 and generate one or more instructions that instruct the one or more identified projectors 164 to project selected content onto the one or more identified projection surfaces 166.

At operation 1408, the processing operation 220 may include processing the information associated with projection at one or more specified times to generate the one or more projection associated instructions. In some embodiments, one or more processors 134 may process the information 168 associated with projection at one or more specified times to generate one or more projection associated instructions. Numerous types of information 168 may be processed that are associated with projection at one or more specified times. Examples of such information 168 include, but are not limited to, one or more dates for projection, one or more times for projection, one or more time periods for projection, one or more requests for projection from one or more specified projectors 164 at one or more specified times, one or more requests for projection from one or more specified projectors 164 at one or more specified time periods, and the like. For example, in some embodiments, one or more processors 134 may process information 168 to identify one or more projectors 164 that are available for projection at one or more specified times and generate one or more instructions to project from the identified projectors 164. In some embodiments, one or more processors 134 may process information 168 to identify one or more projection surfaces 166 that are available for projection at one or more specified times and generate one or more instructions to project from one or more projectors 164 onto the one or more identified projection surfaces 166.

At operation 1410, the processing operation 220 may include processing the information associated with projection of specified content at one or more specified times to generate the one or more projection associated instructions. In some embodiments, one or more processors 134 may process the information 168 associated with projection of specified content at one or more specified times to generate one or more projection associated instructions. Numerous types of information 168 may be processed that are associated with projection of specified content at one or more specified times. Examples of such information 168 include, but are not limited to, one or more locations of specified content, one or more codes that may be used to access specified content, one or more descriptions of specified content, one or more filenames for files that include the specified content, one or more internet addresses that may be used to access the specified content, one or more dates for projection, one or more times for projection, one or more time periods for projection, one or more requests for projection from one or more specified projectors 164 at one or more specified times, one or more requests for projection from one or more specified projectors 164 at one or more specified time periods, and the like. For example, in some embodiments, one or more processors 134 may process information 168 associated with the location of specified content for projection and generate one or more instructions to access the specified content at the indicated location and to project the content at one or more specified times.

Figure 15:
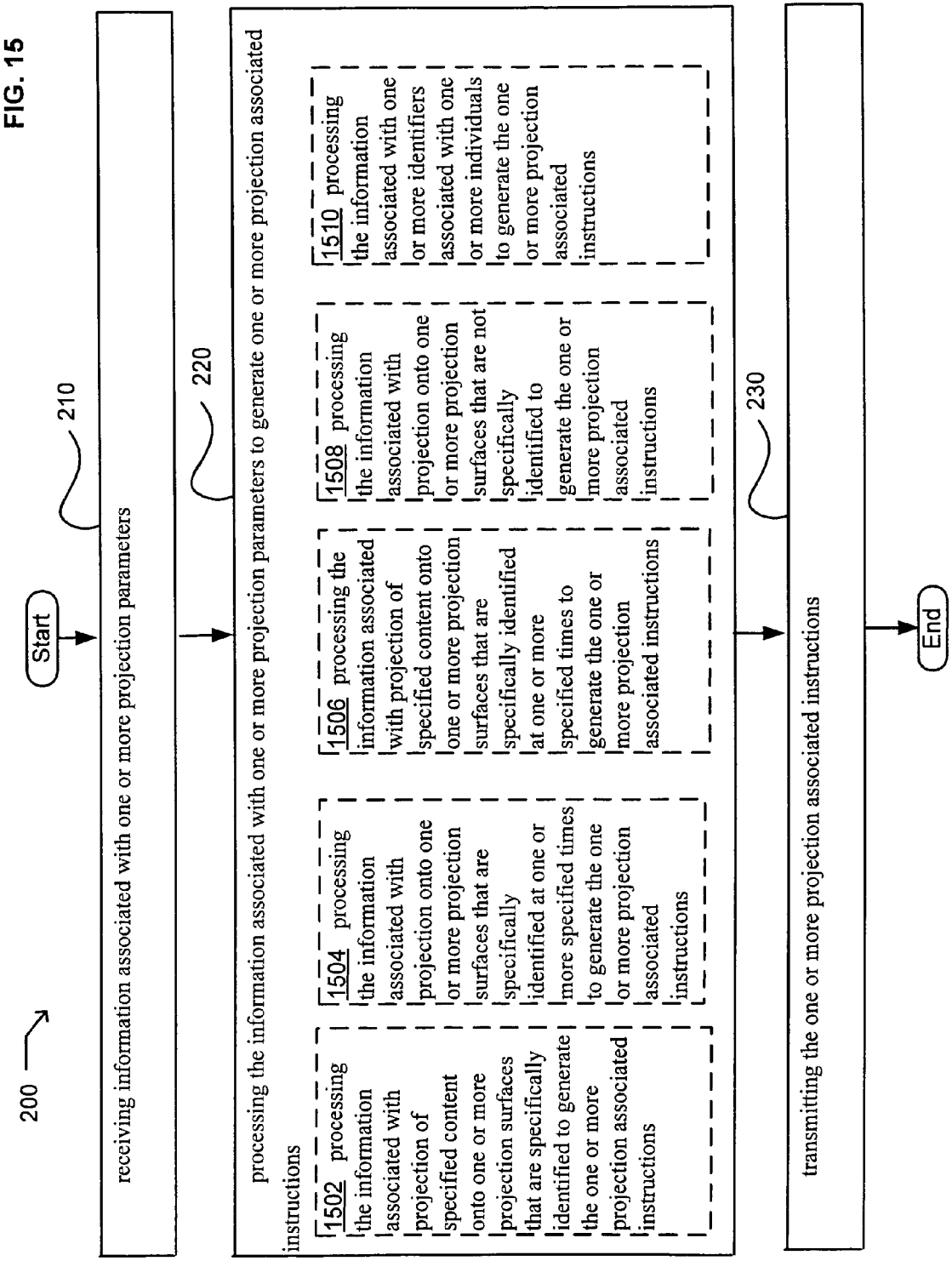

FIG. 15 illustrates alternative embodiments of the example operational flow 200 of FIG. 2. FIG. 15 illustrates example embodiments where the processing operation 220 may include at least one additional operation. Additional operations may include an operation 1502, operation 1504, operation 1506, operation 1508, and/or operation 1510.

At operation 1502, the processing operation 220 may include processing the information associated with projection of specified content onto one or more projection surfaces that are specifically identified to generate the one or more projection associated instructions. In some embodiments, one or more processors 134 may process the information 168 associated with projection of specified content onto one or more projection surfaces 166 that are specifically identified to generate one or more projection associated instructions. Numerous types of information 168 may be processed that are associated with projection of specified content onto one or more projection surfaces 166 that are specifically identified. Examples of such information 168 include, but are not limited to, one or more locations of specified content, one or more codes that may be used to access specified content, one or more descriptions of specified content, one or more filenames for files that include the specified content, one or more internet addresses that may be used to access the specified content, one or more dates for projection, one or more times for projection, one or more time periods for projection, one or more requests for projection from one or more specified projectors 164 at one or more specified times, one or more requests for projection from one or more specified projectors 164 at one or more specified time periods, the location of the one or more projection surfaces 166, one or more identifiers that are associated with the one or more projection surfaces 166, and the like. For example, in some embodiments, one or more processors 134 may process information 168 associated with the location of specified content for projection and the location of one or more projectors 164 that can project onto one or more specified projection surfaces 166. The one or more processors 134 can then generate one or more instructions to access the specified content at the indicated location and to project the content onto one or more specified projection surfaces 166.

At operation 1504, the processing operation 220 may include processing the information associated with projection onto one or more projection surfaces that are specifically identified at one or more specified times to generate the one or more projection associated instructions. In some embodiments, one or more processors 134 may process the information 168 associated with projection onto one or more projection surfaces 166 that are specifically identified at one or more specified times to generate one or more projection associated instructions. Numerous types of information 168 may be processed that is associated with projection onto one or more projection surfaces 166 that are specifically identified at one or more specified times. Examples of such information 168 include, but are not limited to, one or more dates for projection, one or more times for projection, one or more time periods for projection, one or more requests for projection from one or more specified projectors 164 at one or more specified times, one or more requests for projection from one or more specified projectors 164 at one or more specified time periods, the location of the one or more projection surfaces 166, one or more identifiers that are associated with the one or more projection surfaces 166, and the like. For example, in some embodiments, one or more processors 134 may process information 168 associated with the location of one or more specified projection surfaces 166 and one or more requested times for projection to identify one or more projectors 164 that are available to project onto the one or more specified projection surfaces 166 at the one or more specified times. The one or more processors 134 can then generate one or more instructions for the one or more identified projectors 164 to project onto one or more specified projection surfaces 166 at one or more specified times.

At operation 1506, the processing operation 220 may include processing the information associated with projection of specified content onto one or more projection surfaces that are specifically identified at one or more specified times to generate the one or more projection associated instructions. In some embodiments, one or more processors 134 may process the information 168 associated with projection of specified content onto one or more projection surfaces 166 that are specifically identified at one or more specified times to generate one or more projection associated instructions. Numerous types of information 168 may be processed that are associated with projection of specified content onto one or more projection surfaces 166 that are specifically identified at one or more specified times. Examples of such information 168 include, but are not limited to, one or more locations of specified content, one or more codes that may be used to access specified content, one or more descriptions of specified content, one or more filenames for files that include the specified content, one or more internet addresses that may be used to access the specified content, one or more dates for projection, one or more times for projection, one or more time periods for projection, one or more requests for projection from one or more specified projectors 164 at one or more specified times, one or more requests for projection from one or more specified projectors 164 at one or more specified time periods, the location of the one or more projection surfaces 166, one or more identifiers that are associated with the one or more projection surfaces 166, one or more user parameters, and the like. For example, in some embodiments, one or more processors 134 may process information 168 associated with the location of specified content, the location of one or more specified projection surfaces 166, and one or more requested times for projection to identify one or more projectors 164 that are available to project the specified content onto the one or more specified projection surfaces 166 at the one or more specified times. The one or more processors 134 can then generate one or more instructions for the one or more identified projectors 164 to project the specified content onto the one or more specified projection surfaces 166 at the one or more specified times.

At operation 1508, the processing operation 220 may include processing the information associated with projection onto one or more projection surfaces that are not specifically identified to generate the one or more projection associated instructions. In some embodiments, one or more processors 134 may process the information 168 associated with projection onto one or more projection surfaces 166 that are not specifically identified to generate one or more projection associated instructions. Numerous types of information 168 may be processed that are associated with projection onto one or more projection surfaces 166 that are not specifically identified. Examples of such information 168 include, but are not limited to, availability of one or more projection surfaces 166, location of one or more projection surfaces 166, proximity of one or more individuals to one or more projection surfaces 166, proximity of one or more users 10 to one or more projection surfaces 166, projection scheduling associated with one or more projection surfaces 166, one or more user parameters, and the like. For example, in some embodiments, one or more processors 134 may process information 168 associated with the location of one or more users 110 requesting projection services, the location of one or more projection surfaces 166 proximate to the one or more users 110, and one or more projectors 164 that are available to project onto the one or more identified projection surfaces 166. The one or more processors 134 can then generate one or more instructions for the one or more identified projectors 164 to project onto the one or more specified projection surfaces 166 that are proximate to the one or more users 110.

At operation 1510, the processing operation 220 may include processing the information associated with one or more identifiers associated with one or more individuals to generate the one or more projection associated instructions. In some embodiments, one or more processors 134 may process the information 168 associated with one or more identifiers associated with one or more individuals to generate one or more projection associated instructions. Numerous types of information 168 may be processed that are associated with one or more identifiers associated with one or more individuals. Examples of such identifiers include, but are not limited to, one or more names associated with one or more individuals, one or more access codes associated with one or more individuals, one or more accounts associated with one or more individuals, one or more financial accounts associated with one or more individuals, one or more biometric identifiers associated with one or more individuals (e.g., fingerprints, retinal scans, facial recognition, gait recognition), one or more telephone numbers associated with the one or more individuals, and the like. In some embodiments, one or more processors 134 may process information 168 associated with one or more identifiers associated with one or more individuals that are detected with one or more sensors 156. In some embodiments, one or more processors 134 may process information 168 associated with one or more identifiers associated with one or more individuals to generate one or more instructions to project content that is selected in response to the one or more identifiers that are associated with the one or more individuals. In some embodiments, one or more processors 134 may process information 168 associated with one or more identifiers associated with one or more individuals to generate one or more instructions to not project content in response to the one or more identifiers that are associated with the one or more individuals. For example, in some embodiments, one or more processors 134 may process information 168 associated with one or more identifiers that indicate that an individual is a child and generate one or more instructions to avoid projecting inappropriate content.

Figure 16:
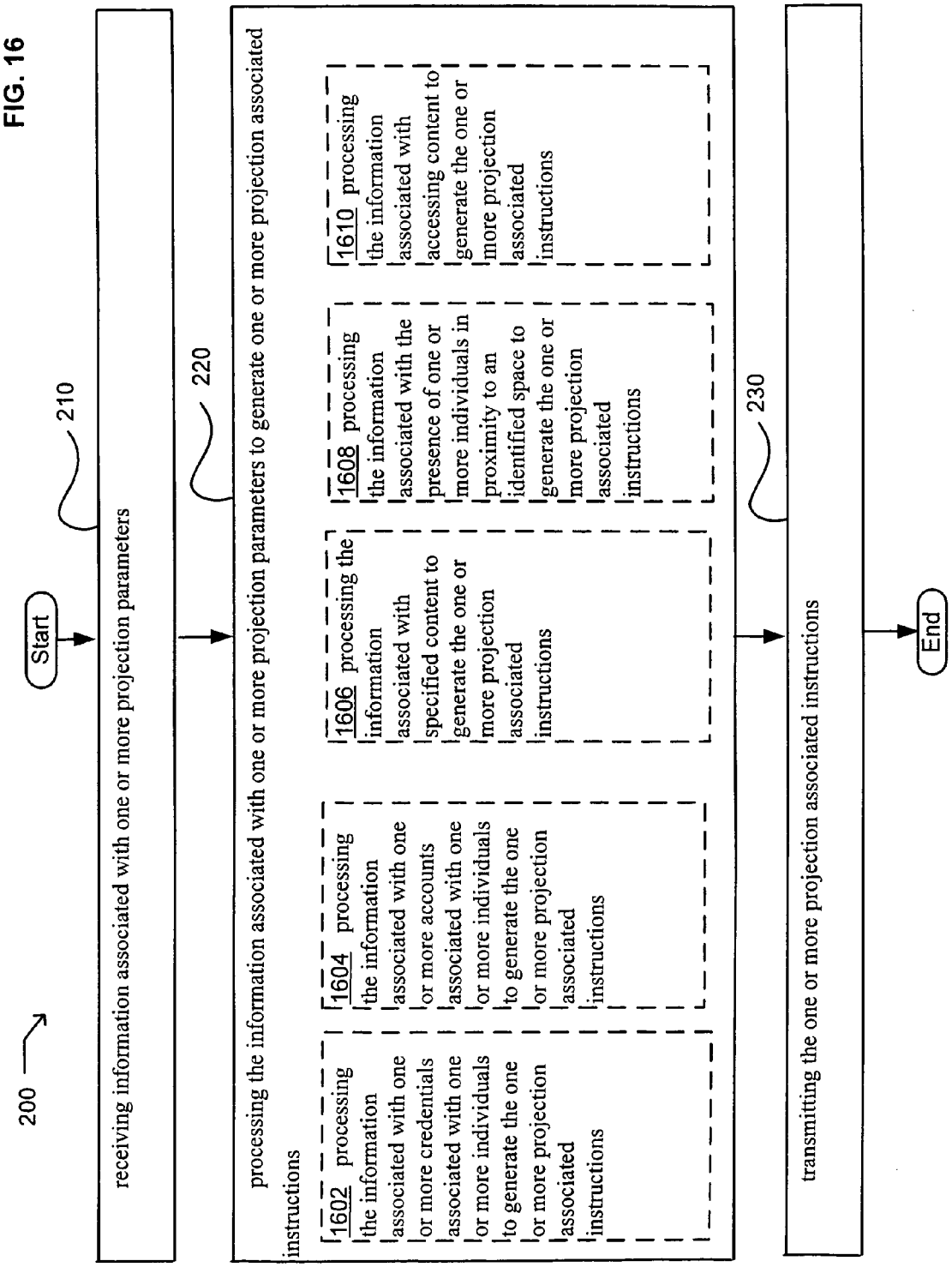

FIG. 16 illustrates alternative embodiments of the example operational flow 200 of FIG. 2. FIG. 16 illustrates example embodiments where the processing operation 220 may include at least one additional operation. Additional operations may include an operation 1602, operation 1604, operation 1606, operation 1608, and/or operation 1610.

At operation 1602, the processing operation 220 may include processing the information associated with one or more credentials associated with one or more individuals to generate the one or more projection associated instructions. In some embodiments, one or more processors 134 may process the information 168 associated with one or more credentials associated with one or more individuals to generate one or more projection associated instructions. Numerous types of information 168 may be processed that are associated with one or more credentials associated with one or more individuals. Examples of such credentials include, but are not limited to, credit ratings, credit card levels, financial accounts, licenses, and the like. For example, in some embodiments, one or more processors 134 may process information 168 indicating that an individual is a teacher and generate one or more instructions to project test scores. In some embodiments, one or more processors 134 may process information 168 indicating that an individual is a teacher and generate one or more instructions to project test answers. In some embodiments, one or more processors 134 may process information 168 indicating that an individual is a student and generate one or more instructions to prohibit projection of test answers. In some embodiments, one or more processors 134 may process information 168 indicating that an individual is a police officer and generate one or more instructions to project the criminal record of a suspect.

At operation 1604, the processing operation 220 may include processing the information associated with one or more accounts associated with one or more individuals to generate the one or more projection associated instructions. In some embodiments, one or more processors 134 may process the information 168 associated with one or more accounts associated with one or more individuals to generate one or more projection associated instructions. Numerous types of information 168 may be processed that is associated with one or more accounts associated with one or more individuals. Examples of such information 168 include, but are not limited to, information 168 associated with one or more projection accounts, information 168 associated with one or more financial accounts, information 168 associated with the availability of funds, information 168 associated with one or more credit ratings, information 168 associated with the location of one or more accounts, information 168 associated with the identity of one or more financial entities 122 that maintain one or more accounts for one or more individuals, and the like. In some embodiments, one or more processors 134 may process information 168 associated with the location and one or more personal identification numbers (PIN number) that are associated with one or more financial accounts and generate one or more instructions to access the one or more financial accounts and bill the account for projection services.

At operation 1606, the processing operation 220 may include processing the information associated with specified content to generate the one or more projection associated instructions. In some embodiments, one or more processors 134 may process the information 168 associated with specified content to generate one or more projection associated instructions. Numerous types of information 168 may be processed that are associated with specified content. Examples of such information 168 include, but are not limited to, information 168 associated with the type of specified content (e.g., children's content, adult content, movies, text, pictures, instructions), information 168 associated with the location of specified content (e.g., one or more filenames, one or more internet addresses, one or more databases), and the like. For example, in some embodiments, one or more processors 134 may process information 168 associated with the location of specified content in memory and generate one or more instructions to access and project the specified content. In some embodiments, one or more processors 134 may process information 168 associated with one or more passwords that may be used to access specified content and generate one or more instructions to access the content with the one or more passwords and project the specified content.

At operation 1608, the processing operation 220 may include processing the information associated with the presence of one or more individuals in proximity to an identified space to generate the one or more projection associated instructions. In some embodiments, one or more processors 134 may process the information 168 associated with the presence of one or more individuals in proximity to an identified space to generate one or more projection associated instructions. For example, in some embodiments, one or more processors 134 may process information 168 associated with one or more individuals who are within an identified space and generate one or more projection associated instructions. For example, in some embodiments, one or more processors 134 may process information 168 associated with tags (e.g., radio frequency identification tags, key cards) that are associated with one or more individuals within an identified space and generate one or more instructions to project content that is selected in response to the one or more individuals. In some embodiments, one or more processors 134 may process information 168 associated with one or more mobile devices (e.g., cellular telephones, pagers, radios) that are associated with one or more individuals within an identified space and generate one or more instructions to project content that is selected in response to the one or more individuals. In some embodiments, one or more processors 134 may process information 168 associated with sensors 156 (e.g., motion sensors 156, infrared sensors 156, voice recognition, facial recognition) that are configured to detect one or more individuals within an identified space and generate one or more instructions to project content that is selected in response to the one or more individuals.

At operation 1610, the processing operation 220 may include processing the information associated with accessing content to generate the one or more projection associated instructions. In some embodiments, one or more processors 134 may process the information 168 associated with accessing content to generate one or more projection associated instructions. For example, in some embodiments, one or more processors 134 may process information 168 associated with one or more locations of content and generate one or more instructions to access the content and project the located content. In some embodiments, one or more processors 134 may process information 168 associated with one or more internet addresses that include content and generate one or more instructions to access the content that is available on the internet and project the content. Accordingly, numerous types of information 168 may be processed.

Figure 17:
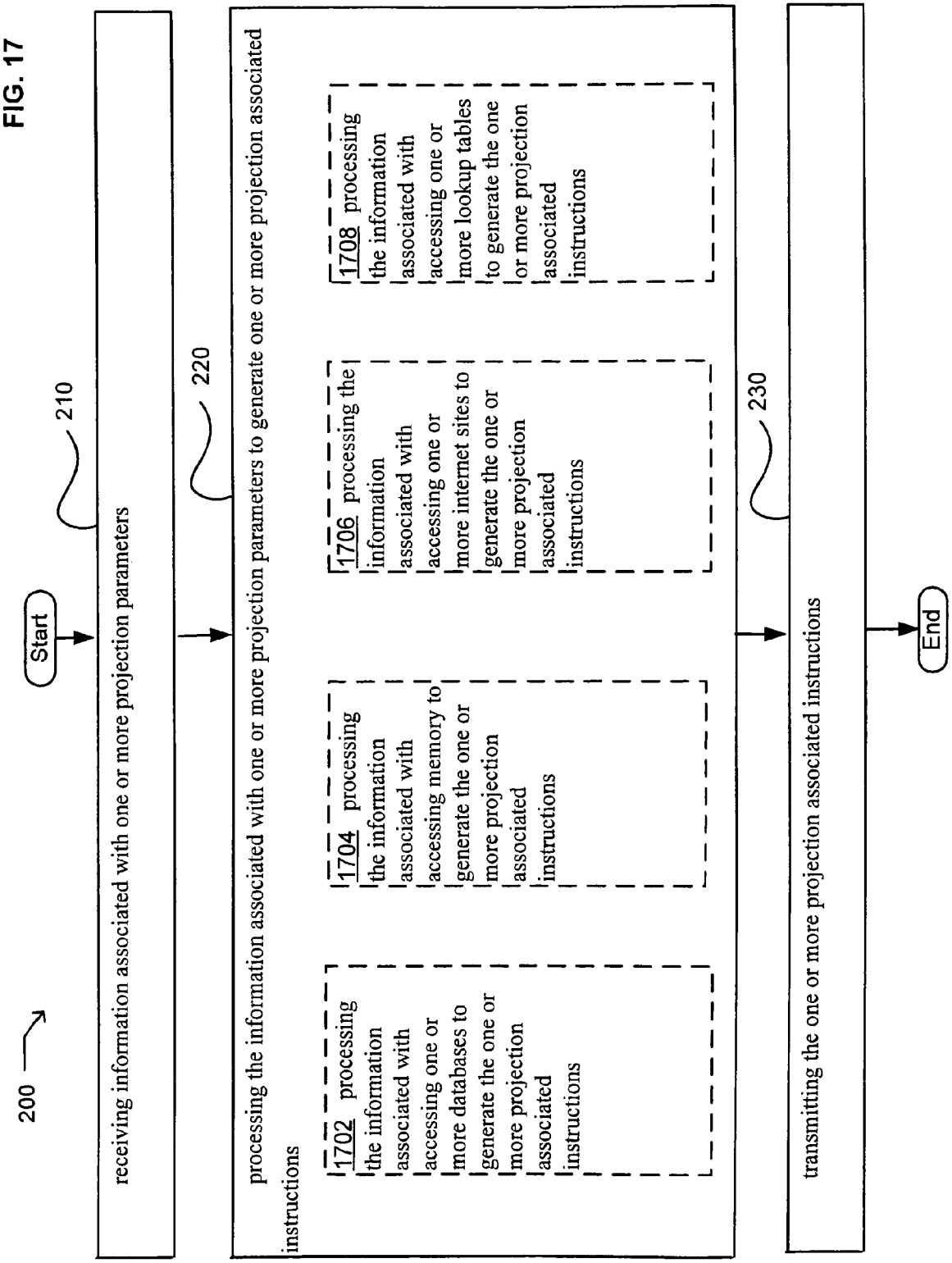

FIG. 17 illustrates alternative embodiments of the example operational flow 200 of FIG. 2. FIG. 17 illustrates example embodiments where the processing operation 220 may include at least one additional operation. Additional operations may include an operation 1702, operation 1704, operation 1706, and/or operation 1708.

At operation 1702, the processing operation 220 may include processing the information associated with accessing one or more databases to generate the one or more projection associated instructions. In some embodiments, one or more processors 134 may process the information 168 associated with accessing one or more databases to generate one or more projection associated instructions. For example, in some embodiments, one or more processors 134 may process information 168 associated with one or more locations of one or more databases and generate one or more instructions to access the one or more databases. In some embodiments, one or more processors 134 may process information 168 associated with one or more locations of one or more databases that include content and generate one or more instructions to access the content that is available in the one or more databases and project the content. Accordingly, numerous types of information 168 may be processed.

At operation 1704, the processing operation 220 may include processing the information associated with accessing memory to generate the one or more projection associated instructions. In some embodiments, one or more processors 134 may process the information 168 associated with accessing memory to generate one or more projection associated instructions. For example, in some embodiments, one or more processors 134 may process information 168 associated with one or more locations of memory and generate one or more instructions to access the memory. In some embodiments, one or more processors 134 may process information 168 associated with one or more locations of memory that includes content and generate one or more instructions to access the content that is available in memory and project the content. Accordingly, numerous types of information 168 may be processed.

At operation 1706, the processing operation 220 may include processing the information associated with accessing one or more internet sites to generate the one or more projection associated instructions. In some embodiments, one or more processors 134 may process the information 168 associated with accessing one or more internet sites to generate one or more projection associated instructions. For example, in some embodiments, one or more processors 134 may process information 168 associated with one or more addresses that are associated with one or more internet sites and generate one or more instructions to access the one or more internet sites. In some embodiments, one or more processors 134 may process information 168 associated with one or more addresses associated with one or more internet sites that include content and generate one or more instructions to access the content that is available at the one or more internet sites and project the content. Accordingly, numerous types of information 168 may be processed.

At operation 1708, the processing operation 220 may include processing the information associated with accessing one or more lookup tables to generate the one or more projection associated instructions. In some embodiments, one or more processors 134 may process the information 168 associated with accessing one or more lookup tables to generate one or more projection associated instructions. For example, in some embodiments, one or more processors 134 may process information 168 associated with one or more lookup tables and generate one or more instructions to access the one or more lookup tables. In some embodiments, one or more processors 134 may process information 168 associated with one or more lookup tables that are associated with content and generate one or more instructions to access the content that is associated with the one or more lookup tables and project the content. Accordingly, numerous types of information 168 may be processed.

Figure 18:
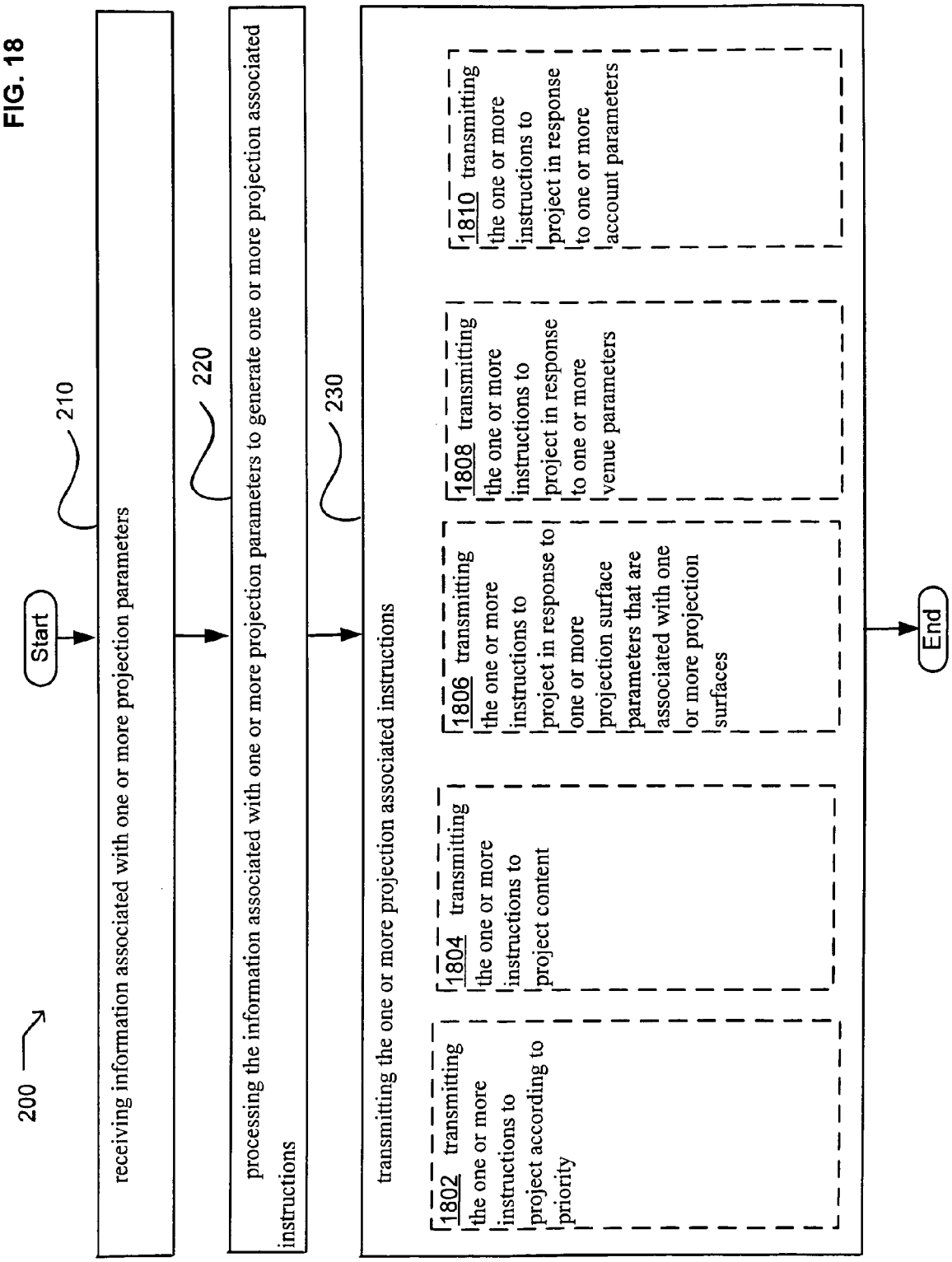

FIG. 18 illustrates alternative embodiments of the example operational flow 200 of FIG. 2. FIG. 18 illustrates example embodiments where the transmitting operation 230 may include at least one additional operation. Additional operations may include an operation 1802, operation 1804, operation 1806, operation 1808, and/or operation 1810.

At operation 1802, the transmitting operation 230 may include transmitting the one or more instructions to project according to priority. In some embodiments, one or more service provider transmitters 132B may transmit the one or more instructions to project according to priority. Numerous types of instructions to project according to priority may be transmitted. For example, in some embodiments, one or more transmitters may transmit one or more instructions to prioritize projection of content received from a first user 110 having higher priority than content received from a second user 110 having lower priority. In some embodiments, one or more transmitters may transmit one or more instructions to project in a more preferred location in accordance with a projection request received from a user 110 having high priority and to project in a less preferred location in accordance with a projection request received from a user 110 having low priority. Accordingly, one or more transmitters may transmit many types of instructions associated with projection according to priority.

At operation 1804, the transmitting operation 230 may include transmitting the one or more instructions to project content. In some embodiments, one or more service provider transmitters 132B may transmit the one or more instructions to project content. Numerous types of instructions to project content may be transmitted. For example, in some embodiments, one or more transmitters may transmit one or more instructions to project identified content. In some embodiments, one or more transmitters may transmit one or more instructions to project content that is selected according to one or more user parameters. For example, in some embodiments, one or more transmitters may transmit one or more instructions to project content that is appropriate for children. In some embodiments, one or more transmitters may transmit one or more instructions to project content that is selected according to one or more interests associated with one or more users 110. For example, in some embodiments, one or more transmitters may transmit one or more instructions to project content that is related to mountain climbing if requested by a user 110 who was identified as a mountain climber. Accordingly, one or more transmitters may transmit many types of instructions associated with projection according to priority.

At operation 1806, the transmitting operation 230 may include transmitting the one or more instructions to project in response to one or more projection surface parameters that are associated with one or more projection surfaces. In some embodiments, one or more service provider transmitters 132B may transmit the one or more instructions to project in response to one or more projection surface parameters that are associated with one or more projection surfaces 166. Numerous types of instructions to project according to one or more surface parameters that are associated with one or more projection surfaces 166 may be transmitted. For example, in some embodiments, one or more transmitters may transmit one or more instructions to project select wavelengths of light that are matched to the transmission characteristics of one or more projection surfaces 166. In some embodiments, one or more transmitters may transmit one or more instructions to avoid projecting confidential information 168 onto one or more projection surfaces 166 that are able to record the projected material. Accordingly, one or more transmitters may transmit many types of instructions associated with one or more projection surface parameters that are associated with one or more projection surfaces 166.

At operation 1808, the transmitting operation 230 may include transmitting the one or more instructions to project in response to one or more venue parameters. In some embodiments, one or more service provider transmitters 132B may transmit the one or more instructions to project in response to one or more venue parameters. Numerous types of instructions to project in response to one or more venue parameters may be transmitted. For example, in some embodiments, one or more transmitters may transmit one or more instructions to project content related to dental care in a dental office. In some embodiments, one or more transmitters may transmit one or more instructions to project content related to sports within a sports bar. In some embodiments, one or more transmitters may transmit one or more instructions to project content related to airplane flight times in an airport. Accordingly, one or more transmitters may transmit many types of instructions associated with one or more venue parameters.

At operation 1810, the transmitting operation 230 may include transmitting the one or more instructions to project in response to one or more account parameters. In some embodiments, one or more service provider transmitters 132B may transmit the one or more instructions to project in response to one or more account parameters. Numerous types of instructions to project in response to one or more account parameters may be transmitted. For example, in some embodiments, one or more transmitters may transmit one or more instructions to project until the funds contained within an account are exhausted. In some embodiments, one or more transmitters may transmit one or more instructions to preferentially allocate projection resources to users 110 having the greatest number of assets in their account. In some embodiments, one or more transmitters may transmit one or more instructions to preferentially allocate projection resources to users 110 based on the status of their account (e.g., platinum card, gold card, etc.).

Figure 19:
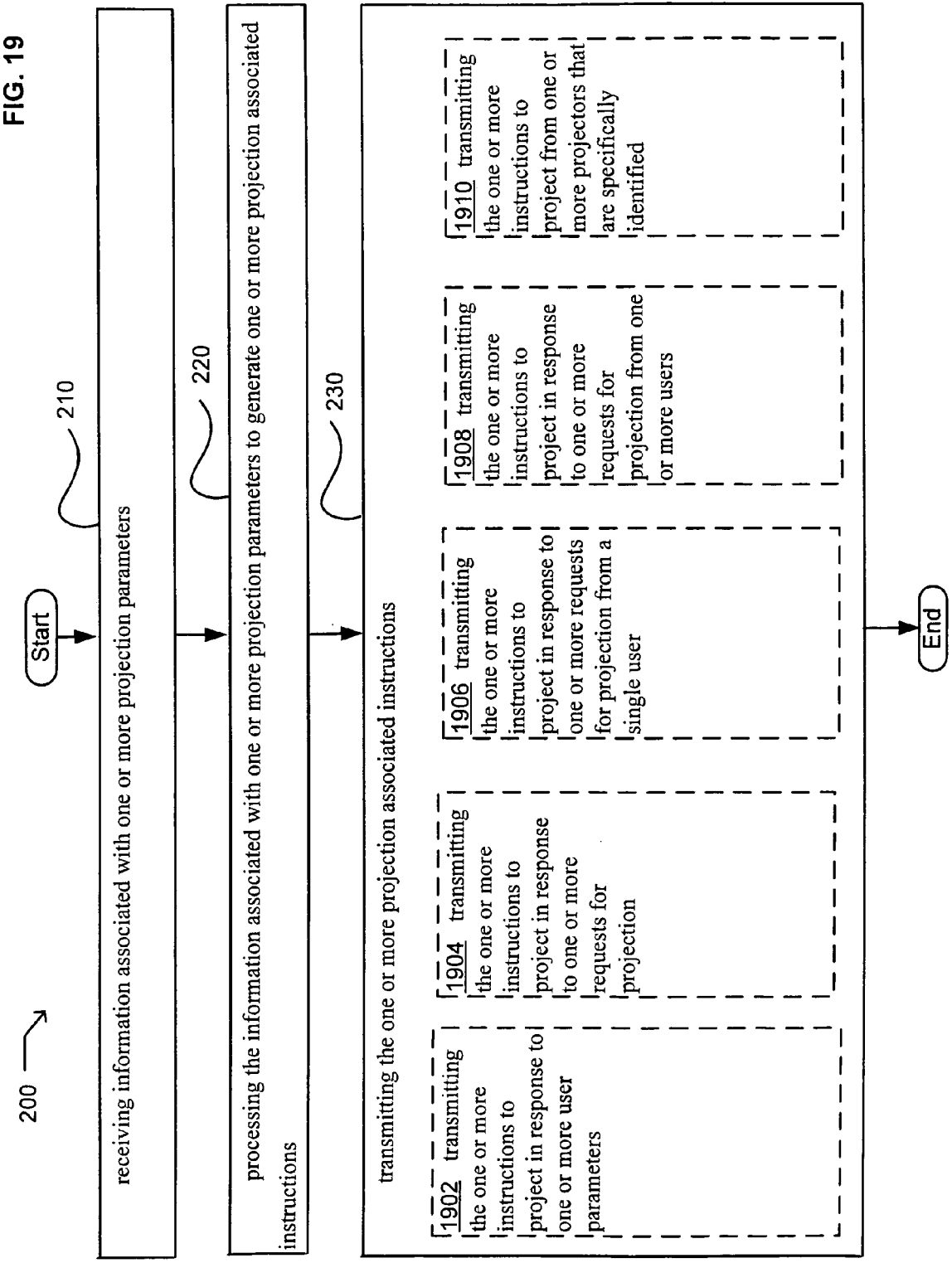

FIG. 19 illustrates alternative embodiments of the example operational flow 200 of FIG. 2. FIG. 19 illustrates example embodiments where the transmitting operation 230 may include at least one additional operation. Additional operations may include an operation 1902, operation 1904, operation 1906, operation 1908, and/or operation 1910.

At operation 1902, the transmitting operation 230 may include transmitting the one or more instructions to project in response to one or more user parameters. In some embodiments, one or more service provider transmitters 132B may transmit the one or more instructions to project in response to one or more user parameters. Numerous types of instructions to project according to one or more user parameters may be transmitted. For example, in some embodiments, one or more transmitters may transmit one or more instructions to project content that is appropriate for children in response to one or more user parameters that indicate that a user 110 is a child. In some embodiments, one or more transmitters may transmit one or more instructions to project content that is appropriate for a venue in which a user 110 is located in response to one or more user parameters that indicate the venue of the user 110. For example, in some embodiments, one or more transmitters may transmit one or more instructions to project flight schedules if a user 110 is located within an airport. Accordingly, one or more transmitters may transmit many types of instructions associated with one or more user parameters.

At operation 1904, the transmitting operation 230 may include transmitting the one or more instructions to project in response to one or more requests for projection. In some embodiments, one or more service provider transmitters 132B may transmit the one or more instructions to project in response to one or more requests for projection. Numerous types of instructions to project in response to one or more requests for projection may be transmitted. For example, in some embodiments, one or more transmitters may transmit one or more instructions to project on a requested projection surface 166. In some embodiments, one or more transmitters may transmit one or more instructions to project with a requested projector 164. In some embodiments, one or more transmitters may transmit one or more instructions to project at one or more requested times. In some embodiments, one or more transmitters may transmit one or more instructions to project requested content. Accordingly, one or more transmitters may transmit many types of instructions associated with one or more requests for projection.

At operation 1906, the transmitting operation 230 may include transmitting the one or more instructions to project in response to one or more requests for projection from a single user. In some embodiments, one or more service provider transmitters 132B may transmit the one or more instructions to project in response to one or more requests for projection from a single user 110. Numerous types of instructions to project in response to one or more requests for projection from a single user 110 may be transmitted. For example, in some embodiments, one or more transmitters may transmit one or more instructions to project content requested by a single user 110. In some embodiments, one or more transmitters may transmit one or more instructions to project with one or more projectors 164 requested by a single user 110. In some embodiments, one or more transmitters may transmit one or more instructions to project onto one or more projection surfaces 166 requested by a single user 110. Accordingly, one or more transmitters may transmit many types of instructions associated with one or more requests for projection from a single user 110.

At operation 1908, the transmitting operation 230 may include transmitting the one or more instructions to project in response to one or more requests for projection from one or more users. In some embodiments, one or more service provider transmitters 132B may transmit the one or more instructions to project in response to one or more requests for projection from one or more users 110. Numerous types of instructions to project in response to one or more requests for projection from one or more users 110 may be transmitted. For example, in some embodiments, one or more transmitters may transmit one or more instructions to project content requested by one or more users 110. In some embodiments, one or more transmitters may transmit one or more instructions to project with one or more projectors 164 requested by one or more users 110. In some embodiments, one or more transmitters may transmit one or more instructions to project onto one or more projection surfaces 166 requested by one or more users 110. Accordingly, one or more transmitters may transmit many types of instructions associated with one or more requests for projection from one or more users 110.

At operation 1910, the transmitting operation 230 may include transmitting the one or more instructions to project from one or more projectors that are specifically identified. In some embodiments, one or more service provider transmitters 132B may transmit the one or more instructions to project from one or more projectors 164 that are specifically identified. Numerous types of instructions to project from one or more projectors 164 that are specifically identified may be transmitted. For example, in some embodiments, one or more transmitters may transmit one or more instructions that are configured to be received by one or more specifically identified projectors 164. In some embodiments, one or more transmitters may transmit one or more instructions that include one or more codes that are configured to be received by one or more specifically identified projectors 164. In some embodiments, one or more transmitters may transmit one or more passwords that are configured to be received by one or more specifically identified projectors 164.

Accordingly, one or more transmitters may transmit many types of instructions associated with one or more requests for projection from one or more projectors 164 that are specifically identified.

Figure 20:
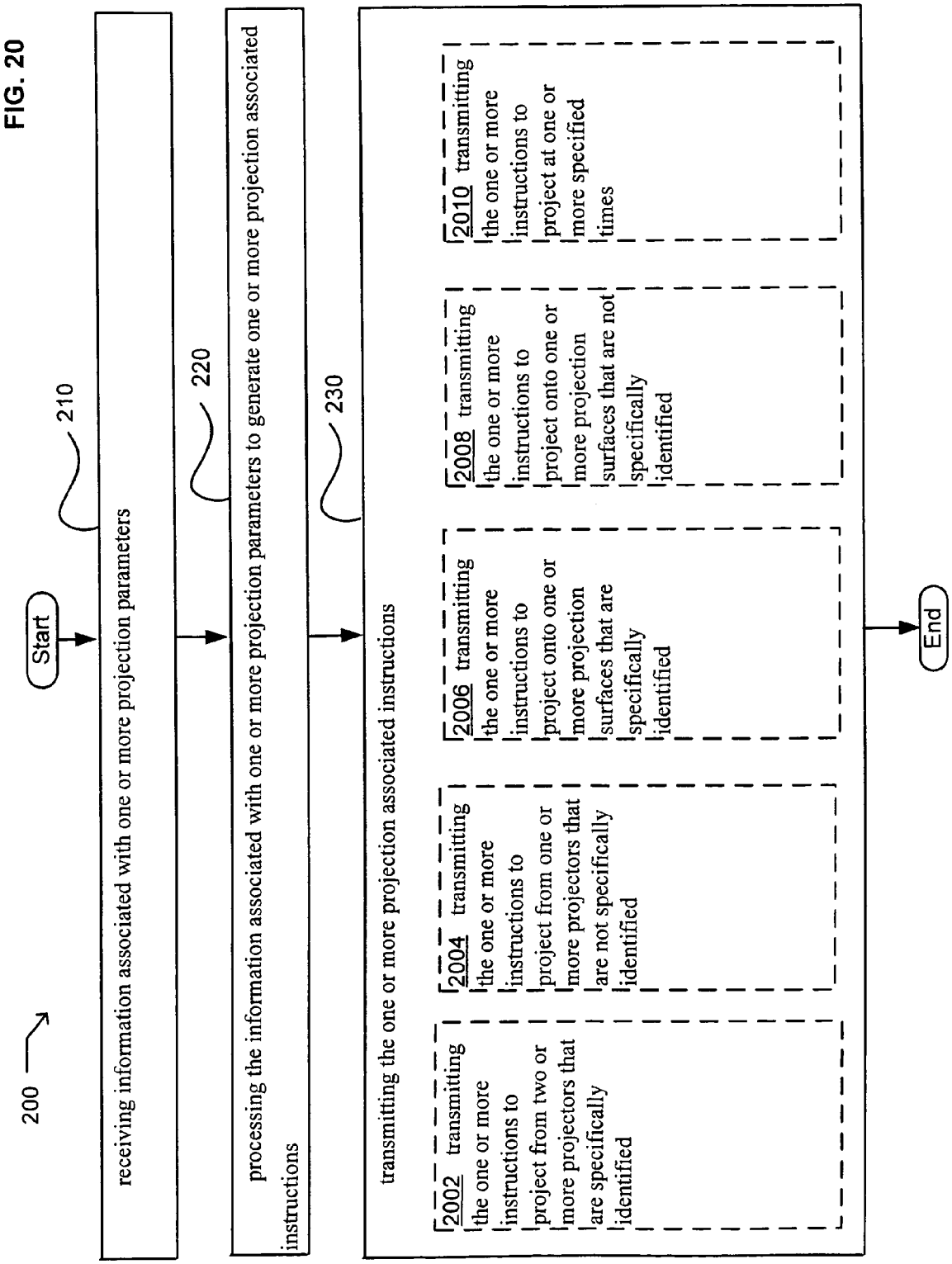

FIG. 20 illustrates alternative embodiments of the example operational flow 200 of FIG. 2. FIG. 20 illustrates example embodiments where the transmitting operation 230 may include at least one additional operation. Additional operations may include an operation 2002, operation 2004, operation 2006, operation 2008, and/or operation 2010.

At operation 2002, the transmitting operation 230 may include transmitting the one or more instructions to project from two or more projectors that are specifically identified. In some embodiments, one or more service provider transmitters 132B may transmit the one or more instructions to project from two or more projectors 164 that are specifically identified. Numerous types of instructions to project from two or more projectors 164 that are specifically identified may be transmitted. In some embodiments, one or more transmitters may transmit one or more instructions to two or more projectors 164 to project onto the same projection surface 166. For example, in some embodiments, one or more instructions may be transmitted that instruct two or more projectors 164 to coordinate projection onto a projection surface 166. In some embodiments, one or more transmitters may transmit one or more instructions to two or more projectors 164 to project onto different projection surfaces 166. Accordingly, one or more transmitters may transmit many types of instructions associated with one or more requests for projection from two or more projectors 164 that are specifically identified.

At operation 2004, the transmitting operation 230 may include transmitting the one or more instructions to project from one or more projectors that are not specifically identified. In some embodiments, one or more service provider transmitters 132B may transmit the one or more instructions to project from one or more projectors 164 that are not specifically identified. Numerous types of instructions to project from one or more projectors 164 that are not specifically identified may be transmitted. For example, in some embodiments, one or more transmitters may transmit one or more instructions to project from one or more projectors 164 that are available for projection. In some embodiments, one or more transmitters may transmit one or more instructions to project onto one or more projection surfaces 166 with one or more projectors 164 that are not preselected. Accordingly, one or more transmitters may transmit many types of instructions associated with one or more requests for projection from one or more projectors 164 that are not specifically identified.

At operation 2006, the transmitting operation 230 may include transmitting the one or more instructions to project onto one or more projection surfaces that are specifically identified. In some embodiments, one or more service provider transmitters 132B may transmit the one or more instructions to project onto one or more projection surfaces 166 that are specifically identified. Numerous types of instructions to project onto one or more projection surfaces 166 that are specifically identified may be transmitted. For example, in some embodiments, one or more transmitters may transmit one or more instructions for a single projector to project onto one or more specifically identified projection surfaces 166. In some embodiments, one or more transmitters may transmit one or more instructions for one or more projectors 164 to project onto one or more specifically identified projection surfaces 166. In some embodiments, one or more transmitters may transmit one or more instructions to project onto one or more specifically identified projection surfaces 166 that include coordinates associated with the one or more projection surfaces 166. In some embodiments, one or more transmitters may transmit one or more instructions to project onto one or more specifically identified projection surfaces 166 that include identifiers that are associated with the one or more projection surfaces 166. Accordingly, one or more transmitters may transmit many types of instructions associated with projection onto one or more projection surfaces 166 that are specifically identified.

At operation 2008, the transmitting operation 230 may include transmitting the one or more instructions to project onto one or more projection surfaces that are not specifically identified. In some embodiments, one or more service provider transmitters 132B may transmit the one or more instructions to project onto one or more projection surfaces 166 that are not specifically identified. Numerous types of instructions to project onto one or more projection surfaces 166 that are not specifically identified may be transmitted. For example, in some embodiments, one or more transmitters may transmit one or more instructions to project onto one or more projection surfaces 166 that are located within one or more specified areas. In some embodiments, one or more transmitters may transmit one or more instructions to project onto one or more projection surfaces 166 that are located within one or more venues. In some embodiments, one or more transmitters may transmit one or more instructions to project onto one or more projection surfaces 166 that are available to one or more specified projectors 164. Accordingly, one or more transmitters may transmit many types of instructions associated with projection onto one or more projection surfaces 166 that are not specifically identified.

At operation 2010, the transmitting operation 230 may include transmitting the one or more instructions to project at one or more specified times. In some embodiments, one or more service provider transmitters 132B may transmit the one or more instructions to project at one or more specified times. Numerous types of instructions to project at one or more specified times may be transmitted. For example, in some embodiments, one or more transmitters may transmit one or more instructions to project at one or more times during a specified day. In some embodiments, one or more transmitters may transmit one or more instructions to project at one or more times during a specified week. In some embodiments, one or more transmitters may transmit one or more instructions to project at one or more times during a specified year. Accordingly, one or more transmitters may transmit many types of instructions associated with projection at one or more specified times.

Figure 21:
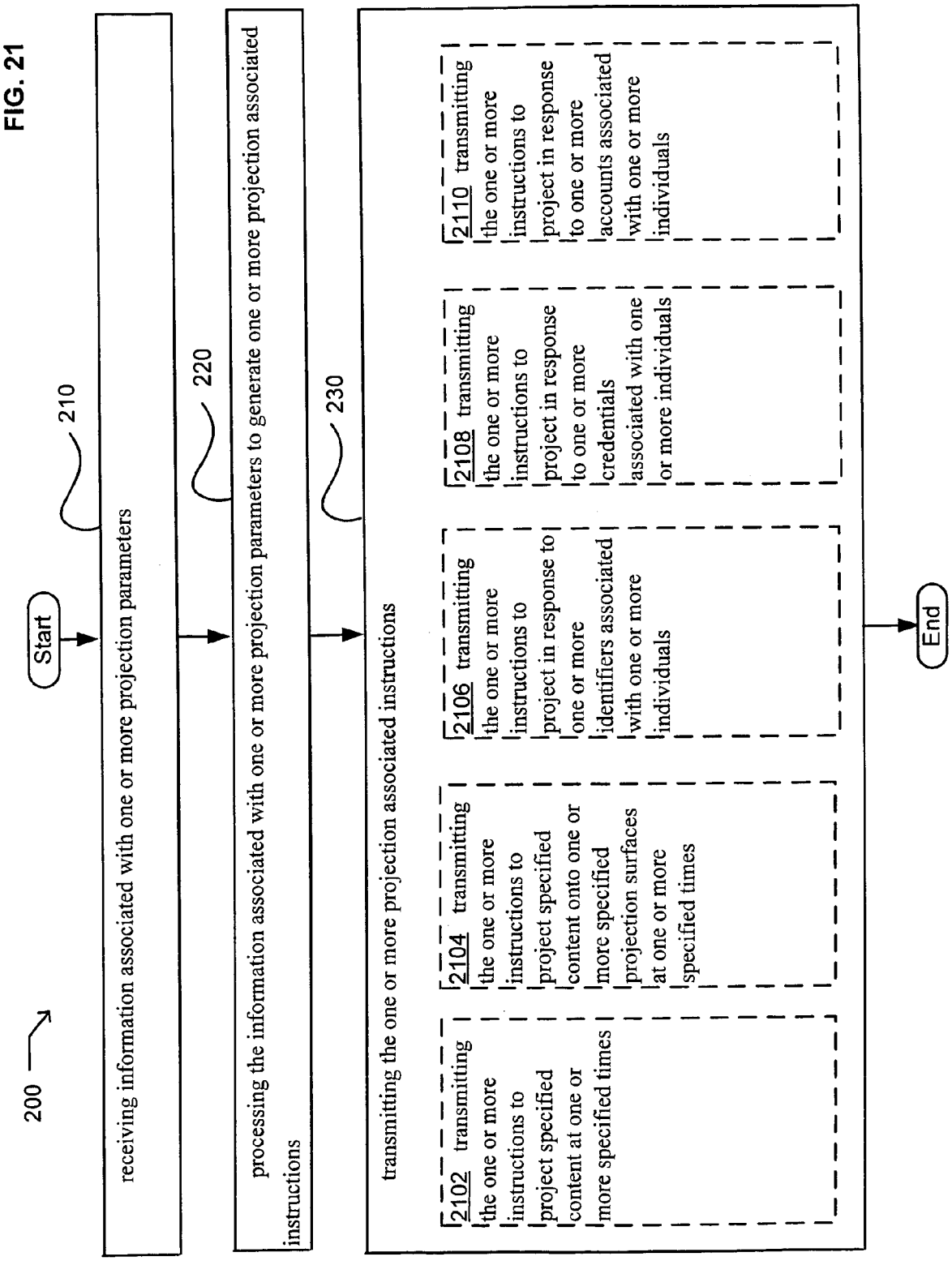

FIG. 21 illustrates alternative embodiments of the example operational flow 200 of FIG. 2. FIG. 21 illustrates example embodiments where the transmitting operation 230 may include at least one additional operation. Additional operations may include an operation 2102, operation 2104, operation 2106, operation 2108, and/or operation 2110.

At operation 2102, the transmitting operation 230 may include transmitting the one or more instructions to project specified content at one or more specified times. In some embodiments, one or more service provider transmitters 132B may transmit the one or more instructions to project specified content at one or more specified times. Numerous types of instructions to project specified content at one or more specified times may be transmitted. For example, in some embodiments, one or more transmitters may transmit one or more instructions to access specified content and project the content at one or more specified times. In some embodiments, one or more transmitters may transmit one or more instructions to receive specified content and project the content at one or more specified times. Accordingly, one or more transmitters may transmit many types of instructions associated with projection of specified content at one or more specified times.

At operation 2104, the transmitting operation 230 may include transmitting the one or more instructions to project specified content onto one or more specified projection surfaces at one or more specified times. In some embodiments, one or more service provider transmitters 132B may transmit the one or more instructions to project specified content onto one or more specified projection surfaces 166 at one or more specified times. Numerous types of instructions to project specified content onto one or more specified projection surfaces 166 at one or more specified times may be transmitted. For example, in some embodiments, one or more transmitters may transmit one or more instructions to access specified content and project the content onto one or more specified projection surfaces 166 at one or more specified times. In some embodiments, one or more transmitters may transmit one or more instructions to receive specified content and project the content onto one or more specified projection surfaces 166 at one or more specified times. Accordingly, one or more transmitters may transmit many types of instructions associated with projection of specified content onto one or more specified projection surfaces 166 at one or more specified times.

At operation 2106, the transmitting operation 230 may include transmitting the one or more instructions to project in response to one or more identifiers associated with one or more individuals. In some embodiments, one or more service provider transmitters 132B may transmit the one or more instructions to project in response to one or more identifiers associated with one or more individuals. Numerous types of instructions to project in response to one or more identifiers associated with one or more individuals may be transmitted. In some embodiments, one or more transmitters may transmit one or more instructions to project content that is related to one or more identifiers that are associated with one or more individuals. For example, in some embodiments, one or more transmitters may transmit one or more instructions to project content related to scuba diving in response to one or more identifiers that indicate that an individual is interested in scuba diving. In some embodiments, one or more transmitters may transmit one or more instructions to project content related to dentistry in response to one or more identifiers that indicate that an individual is attending a dental conference. Accordingly, one or more transmitters may transmit many types of instructions associated with projection in response to one or more identifiers associated with one or more individuals.

At operation 2108, the transmitting operation 230 may include transmitting the one or more instructions to project in response to one or more credentials associated with one or more individuals. In some embodiments, one or more service provider transmitters 132B may transmit the one or more instructions to project in response to one or more credentials associated with one or more individuals. Numerous types of instructions to project in response to one or more credentials associated with one or more individuals may be transmitted. For example, in some embodiments, one or more transmitters may transmit one or more instructions to project test answers in response to one or more credentials that indicate that an individual is a teacher. In some embodiments, one or more transmitters may transmit one or more instructions to project defendant information 168 in response to one or more credentials that indicate that an individual is a police officer. In some embodiments, one or more transmitters may transmit one or more instructions to project electronic mail in response to submission of a password by an individual. Accordingly, one or more transmitters may transmit many types of instructions associated with projection in response to one or more credentials associated with one or more individuals.

At operation 2110, the transmitting operation 230 may include transmitting the one or more instructions to project in response to one or more accounts associated with one or more individuals. In some embodiments, one or more service provider transmitters 132B may transmit the one or more instructions to project in response to one or more accounts associated with one or more individuals. Numerous types of instructions to project in response to one or more accounts associated with one or more individuals may be transmitted. In some embodiments, one or more transmitters may transmit one or more instructions to prioritize projection of content received from one or more individuals who are associated with one or more accounts. For example, in some embodiments, one or more transmitters may transmit one or more instructions to preferentially project content within a department store for a user 110 who possesses a department store credit card. In some embodiments, one or more transmitters may transmit one or more instructions to preferentially project content within an airport for a user 10 who possesses a frequent flier card. Accordingly, one or more transmitters may transmit many types of instructions associated with projection in response to one or more accounts associated with one or more individuals.

Figure 22:
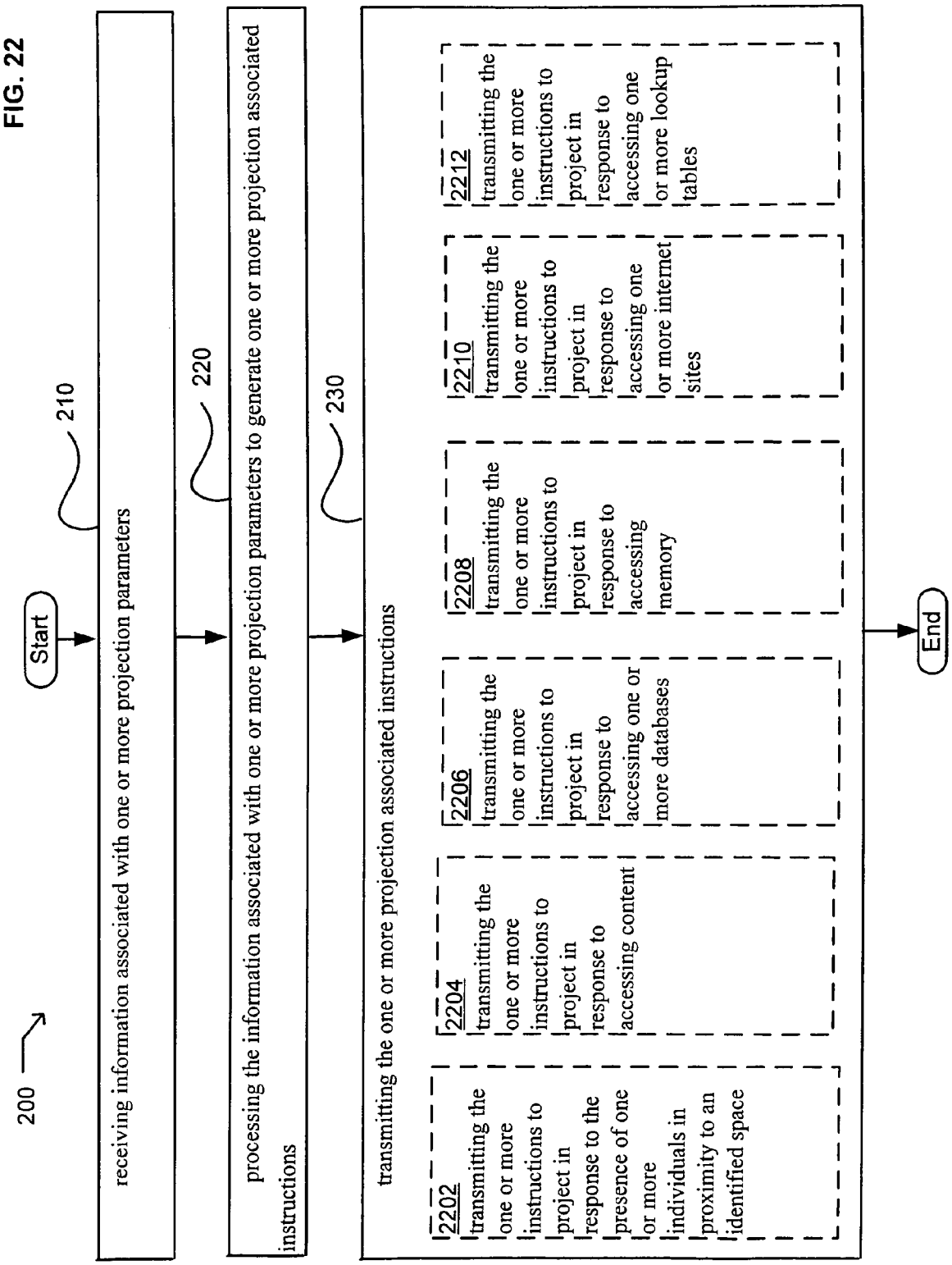

FIG. 22 illustrates alternative embodiments of the example operational flow 200 of FIG. 2. FIG. 22 illustrates example embodiments where the transmitting operation 230 may include at least one additional operation. Additional operations may include an operation 2202, operation 2204, operation 2206, operation 2208, operation 2210, and/or operation 2212.

At operation 2202, the transmitting operation 230 may include transmitting the one or more instructions to project in response to the presence of one or more individuals in proximity to an identified space. In some embodiments, one or more service provider transmitters 132B may transmit the one or more instructions to project in response to the presence of one or more individuals in proximity to an identified space. Numerous types of instructions to project in response to the presence of one or more individuals in proximity to an identified space may be transmitted. For example, in some embodiments, one or more transmitters may transmit one or more instructions to avoid projecting confidential information when one or more individuals who are not authorized to view the confidential information are proximate to an identified area. In some embodiments, one or more transmitters may transmit one or more instructions to project onto one or more projection surfaces 166 that are located within one or more identified spaces in response to the presence of one or more individuals in proximity to the identified spaces. For example, in some embodiments, one or more transmitters may transmit one or more instructions to project promotional material onto one or more projection surfaces 166 that are positioned next to a product that is for sale (e.g., in a department store). Accordingly, one or more transmitters may transmit many types of instructions associated with projection in response to the presence of one or more individuals in proximity to an identified space.

At operation 2204, the transmitting operation 230 may include transmitting the one or more instructions to project in response to accessing content. In some embodiments, one or more service provider transmitters 132B may transmit the one or more instructions to project in response to accessing content. Numerous types of instructions to project in response to accessing content may be transmitted. For example, in some embodiments, one or more transmitters may transmit one or more instructions to project content that is received from one or more users 110. In some embodiments, one or more transmitters may transmit one or more instructions to project content in response to accessing content that is included within one or more databases. In some embodiments, one or more transmitters may transmit one or more instructions to project content in response to accessing content on the internet. In some embodiments, one or more transmitters may transmit one or more instructions to project content in response to accessing content that is included within one or more lookup tables. In some embodiments, one or more transmitters may transmit one or more instructions to project content in response to accessing content that is included within memory. Accordingly, one or more transmitters may transmit many types of instructions associated with projection in response to accessing content.

At operation 2206, the transmitting operation 230 may include transmitting the one or more instructions to project in response to accessing one or more databases. In some embodiments, one or more service provider transmitters 132B may transmit the one or more instructions to project in response to accessing one or more databases. Numerous types of instructions to project in response to accessing one or more databases may be transmitted. For example, in some embodiments, one or more transmitters may transmit one or more passwords that were obtained through accessing one or more databases. In some embodiments, one or more transmitters may transmit one or more instructions to project content that was obtained through accessing one or more databases. In some embodiments, one or more transmitters may transmit one or more instructions to project from one or more projectors 164 that were identified through accessing one or more databases. In some embodiments, one or more transmitters may transmit one or more instructions to project onto one or more projection surfaces 166 that were identified through accessing one or more databases. Accordingly, one or more transmitters may transmit many types of instructions to project in response to accessing one or more databases.

At operation 2208, the transmitting operation 230 may include transmitting the one or more instructions to project in response to accessing memory. In some embodiments, one or more service provider transmitters 132B may transmit the one or more instructions to project in response to accessing memory. Numerous types of instructions to project in response to accessing memory may be transmitted. For example, in some embodiments, one or more transmitters may transmit one or more passwords that were obtained through accessing memory. In some embodiments, one or more transmitters may transmit one or more instructions to project content that was obtained through accessing memory. In some embodiments, one or more transmitters may transmit one or more instructions to project from one or more projectors 164 that were identified through accessing memory. In some embodiments, one or more transmitters may transmit one or more instructions to project onto one or more projection surfaces 166 that were identified through accessing memory. Accordingly, one or more transmitters may transmit many types of instructions to project in response to accessing memory.

At operation 2210, the transmitting operation 230 may include transmitting the one or more instructions to project in response to accessing one or more internet sites. In some embodiments, one or more service provider transmitters 132B may transmit the one or more instructions to project in response to accessing one or more internet sites. Numerous types of instructions to project in response to accessing one or more internet sites may be transmitted. In some embodiments, one or more transmitters may transmit one or more instructions to project content that was obtained through accessing one or more internet sites. For example, in some embodiments, one or more transmitters may transmit one or more instructions to project traffic information 168 that was obtained through accessing one or more internet sites. In some embodiments, one or more transmitters may transmit one or more instructions to project financial information 126 (e.g., stock quotes, etc.) that was obtained through accessing one or more internet sites. In some embodiments, one or more transmitters may transmit one or more instructions to project movies that were obtained through accessing one or more internet sites. In some embodiments, one or more transmitters may transmit one or more instructions to project music videos that were obtained through accessing one or more internet sites. Accordingly, one or more transmitters may transmit many types of instructions to project in response to accessing one or more internet sites.

At operation 2212, the transmitting operation 230 may include transmitting the one or more instructions to project in response to accessing one or more lookup tables. In some embodiments, one or more service provider transmitters 132B may transmit the one or more instructions to project in response to accessing one or more lookup tables. Numerous types of instructions to project in response to accessing one or more lookup tables may be transmitted. For example, in some embodiments, one or more transmitters may transmit one or more instructions to project one or more passwords that were obtained through accessing one or more lookup tables. In some embodiments, one or more transmitters may transmit one or more instructions to project from one or more projectors 164 that were identified through accessing one or more lookup tables. In some embodiments, one or more transmitters may transmit one or more instructions to project onto one or more projection surfaces 166 that were identified through accessing one or more lookup tables. Accordingly, one or more transmitters may transmit many types of instructions to project in response to accessing one or more lookup tables.

Figure 23:
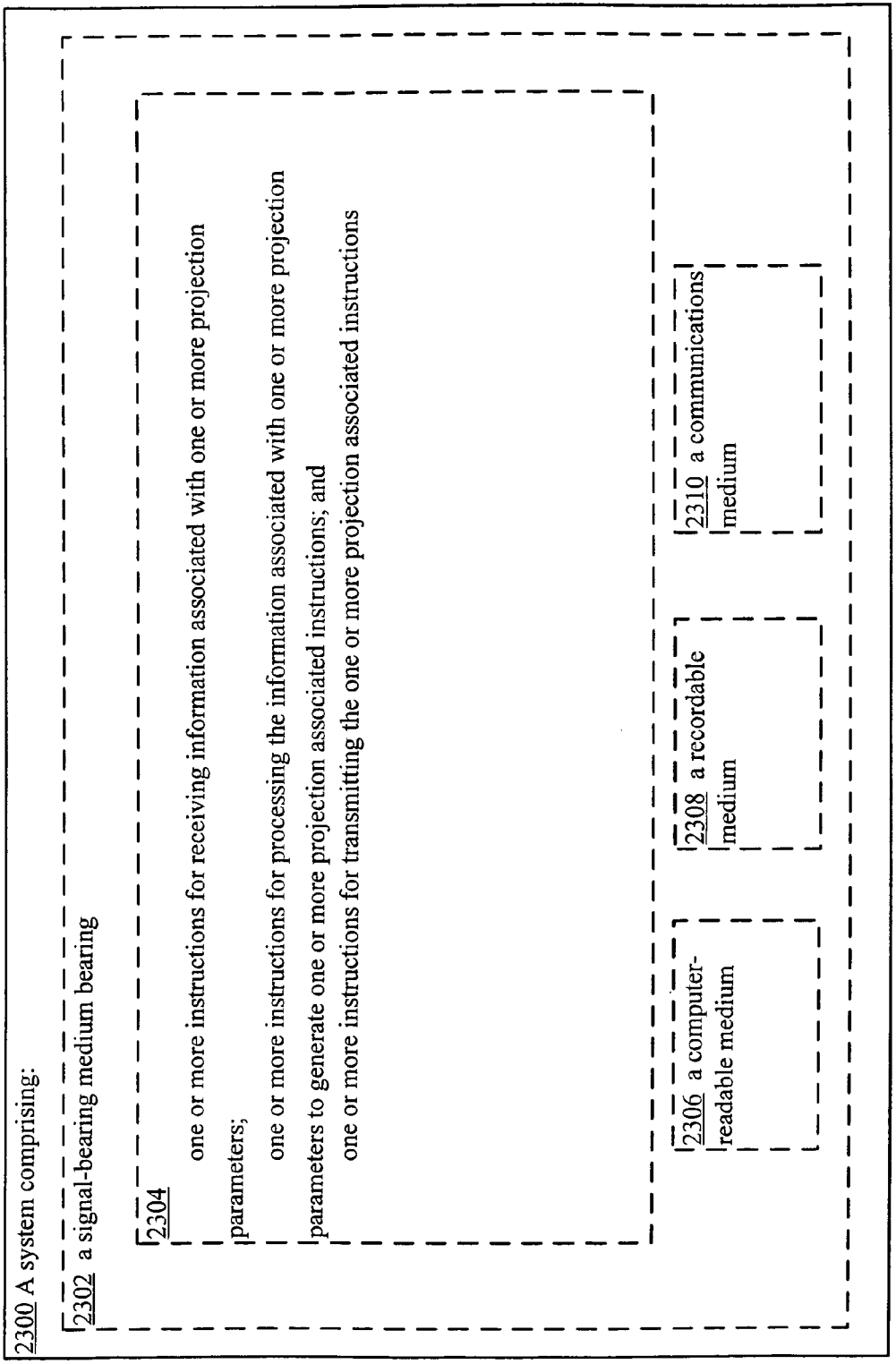
FIG. 23 illustrates a partial view of a system 2300 that includes a computer program for executing a computer process on a computing device.

FIG. 23 illustrates a partial view of a system 2300 that includes a computer program 2304 for executing a computer process on a computing device. An embodiment of system 2300 is provided using a signal-bearing medium 2302 bearing one or more instructions for receiving information associated with one or more projection parameters; one or more instructions for processing the information associated with one or more projection parameters to generate one or more projection associated instructions; and one or more instructions for transmitting the one or more projection associated instructions. The one or more instructions may be, for example, computer executable and/or logic-implemented instructions. In some embodiments; the signal-bearing medium 2302 may include a computer-readable medium 2306. In some embodiments, the signal-bearing medium 2302 may include a recordable medium 2308. In some embodiments, the signal-bearing medium 2302 may include a communications medium 2310.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described above. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution.

Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electromechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electromechanical systems include but are not limited to a variety of consumer electronics systems, medical devices, as well as other systems such as motorized transport systems, factory automation systems, security systems, and/or communication/computing systems. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces 114, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces 114, drivers, sensors 156, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Those skilled in the art will appreciate that a user 110 may be representative of a human user 110, a robotic user 110 (e.g., computational entity), and/or substantially any combination thereof (e.g., a user 110 may be assisted by one or more robotic agents) unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise. While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method comprising:
    receiving one or more projection parameters, the one or more projection parameters including a request for projection at one or more specified times;
    with one or more processing devices, processing the one or more projection parameters to identify one or more projection surfaces that are available for projection at the one or more specified times and to generate one or more instructions to project at the one or more specified times from one or more projectors onto the one or more identified projection surfaces; and
    transmitting the one or more instructions to project at the specified time from the one or more projectors onto the one or more identified projection surfaces.

2. The method of claim 1, wherein the receiving one or more projection parameters and with one or more processing devices, processing the one or more projection parameters generate one or more instructions to project comprises:
    receiving one or more priority parameters and a first request for projection from a first user and a second request for projection from a second user, the one or more priority parameters assigning a higher priority to the first user than to the second user; and
    with one or more processing devices, processing the first request for projection, the second request for projection, and the priority parameters to generate instructions that prioritize projection by the first user over projection by the second user.

3. The method of claim 1, wherein the receiving one or more projection parameters comprises:
    receiving information associated with one or more projection surface parameters.

4. The method of claim 1, wherein the receiving one or more projection parameters comprises:
    receiving information associated with one or more venue parameters.

5. The method of claim 1, wherein the receiving one or more projection parameters comprises:
    receiving a request for projection from one or more projectors that are specifically identified onto one or more projection surfaces, the one or more projectors being specifically identified based on a proximity to one or more locations, the request including a user projection account for payment for the requested projection.

6. The method of claim 1, wherein the receiving one or more projection parameters comprises:
    receiving a request for projection with one or more projectors that are not specifically identified, the request including information about the proximity of one or more users to the one or more projectors that are not specifically identified.

7. The method of claim 1, wherein the receiving one or more projection parameters comprises:
    receiving information associated with projection onto one or more projection surfaces that are specifically identified.

8. The method of claim 1, wherein the receiving one or more projection parameters comprises:
    receiving information associated with projection of specified content onto one or more projection surfaces that are specifically identified at one or more specified times.

9. The method of claim 1, wherein the receiving one or more projection parameters comprises:
    receiving a request for projection onto one or more projection surfaces that are not specifically identified, the request including information about the proximity of one or more users to the one or more projection surfaces that are not specifically identified, the request further including information identifying a projection account for payment for the requested projection.

10. The method of claim 1, wherein the receiving one or more projection parameters comprises:
    receiving information associated with one or more credentials associated with one or more individuals.

11. The method of claim 1, wherein the receiving one or more projection parameters comprises:
    receiving information associated with the presence of one or more individuals in proximity to an identified space.

12. The method of claim 1, wherein the receiving one or more projection parameters comprises:
    receiving one or more signals that include the information associated with one or more projection parameters.

13. The method of claim 1, wherein the receiving one or more projection parameters comprises:
    receiving one or more signals that include the information associated with one or more projection parameters through use of one or more multi-user receivers.

14. The method of claim 1, wherein the receiving one or more projection parameters comprises:
    receiving one or more wireless signals.

15. The method of claim 1, wherein the receiving one or more projection parameters comprises:
    receiving one or more text messages.

16. The method of claim 1, wherein the receiving one or more projection parameters comprises:
    receiving one or more voice commands.

17. The method of claim 1, wherein the receiving one or more projection parameters comprises:
    receiving content for projection.

18. The method of claim 1, wherein the receiving one or more projection parameters comprises:
    receiving information associated with accessing content.

19. The method of claim 1, wherein the receiving one or more projection parameters comprises:
    accessing information included within one or more internet sites.

20. The method of claim 1, wherein the with one or more processing devices, processing the one or more projection parameters to generate one or more instructions to project comprises:
    processing the information associated with the one or more projection parameters with one or more central processing units.

21. The method of claim 1, wherein the with one or more processing devices, processing the one or more projection parameters to generate one or more instructions to project comprises:
processing the information associated with one or more priority parameters to generate the one or more instructions to project.

22. The method of claim 1, wherein the with one or more processing devices, processing the one or more projection parameters to generate one or more instructions to project comprises:
processing the information associated with one or more projection surface parameters to generate the one or more instructions to project.

23. The method of claim 1, wherein the with one or more processing devices, processing the one or more projection parameters to generate one or more instructions to project comprises:
processing the information associated with one or more venue parameters to generate the one or more instructions to project.

24. The method of claim 1, wherein the with one or more processing devices, processing the one or more projection parameters to generate one or more instructions to project comprises:
processing the information associated with one or more requests for projection from one or more projectors that are specifically identified to generate the one or more instructions to project.

25. The method of claim 1, wherein the with one or more processing devices, processing the one or more projection parameters to generate one or more instructions to project comprises:
processing the information associated with projection from one or more projectors that are not specifically identified to generate the one or more instructions to project.

26. The method of claim 1, wherein the with one or more processing devices, processing the one or more projection parameters to generate one or more instructions to project comprises:
processing the information associated with projection onto one or more projection surfaces that are specifically identified to generate the one or more instructions to project.

27. The method of claim 1, wherein the with one or more processing devices, processing the one or more projection parameters to generate one or more instructions to project comprises:
with one or more processing devices, processing a request for projection of specified content, at one or more locations, at one or more specified times, onto one or more projection surfaces that are specifically identified to generate the one or more instructions to project the specified content at the one or more locations, at the one or more specified times, from one or more projectors onto the one or more projection surfaces that are specifically identified; and
wherein the one or more specifically identified projection surfaces are specifically identified with reference to one or more identifiers.

28. The method of claim 1, wherein the with one or more processing devices, processing the one or more projection parameters to generate one or more instructions to project comprises:
processing the information associated with projection onto one or more projection surfaces that are not specifically identified to generate the one or more instructions to project.

29. The method of claim 1, wherein the with one or more processing devices, processing the one or more projection parameters to generate one or more instructions to project comprises:
processing the information associated with one or more credentials associated with one or more individuals to generate the one or more instructions to project.

30. The method of claim 1, wherein the with one or more processing devices, processing the one or more projection parameters to generate one or more instructions to project comprises:
processing the information associated with the presence of one or more individuals in proximity to an identified space to generate the one or more instructions to project.

31. The method of claim 1, wherein the with one or more processing devices, processing the one or more projection parameters to generate one or more instructions to project comprises:
processing the information associated with accessing content to generate the one or more instructions to project.

32. The method of claim 1, wherein the with one or more processing devices, processing the one or more projection parameters to generate one or more instructions to project comprises:
processing the information associated with accessing one or more internet sites to generate the one or more instructions to project.

33. The method of claim 1, wherein the transmitting the one or more instructions to project comprises:
transmitting the one or more instructions to project according to priority.

34. The method of claim 1, wherein the transmitting the one or more instructions to project comprises:
transmitting the one or more instructions to project in response to one or more projection surface parameters that are associated with one or more projection surfaces.

35. The method of claim 1, wherein the transmitting the one or more instructions to project comprises:
transmitting the one or more instructions to project in response to one or more venue parameters.

36. The method of claim 1, wherein the transmitting the one or more instructions to project comprises:
transmitting the one or more instructions to project in response to one or more user parameters.

37. The method of claim 1, wherein the transmitting the one or more instructions to project comprises:
transmitting the one or more instructions to project from two or more projectors that are specifically identified.

38. The method of claim 1, wherein the transmitting the one or more instructions to project comprises:
transmitting the one or more instructions to project onto one or more projection surfaces that are specifically identified.

39. The method of claim 1, wherein the transmitting the one or more instructions to project comprises:
transmitting the one or more instructions to project onto one or more projection surfaces that are not specifically identified.

40. The method of claim 1, wherein the transmitting the one or more instructions to project comprises:
transmitting the one or more instructions to project specified content onto one or more specified projection surfaces at one or more specified times.

41. The method of claim 1, wherein the transmitting the one or more instructions to project comprises:
 transmitting the one or more instructions to project in response to one or more credentials associated with one or more individuals.

42. The method of claim 1, wherein the transmitting the one or more instructions to project comprises:
 transmitting the one or more instructions to project in response to the presence of one or more individuals in proximity to an identified space.

43. The method of claim 1, wherein the transmitting the one or more instructions to project comprises:
 transmitting the one or more instructions to project in response to accessing one or more internet sites.

44. A method comprising:
 receiving one or more wireless signals that include information associated with a presence of one or more individuals in proximity to an identified space, the received wireless signals including one or more projection parameters, the one or more projection parameters including a request for projection at one or more specified times;
 processing the one or more wireless signals to identify one or more projection surfaces that are available for projection at the one or more specified times and that are proximate to the one or more individuals and to generate one or more instructions to project at the one or more specified times from one or more projectors onto the one or more identified projection surfaces;
 transmitting the one or more instructions; and
 wherein at least one of the receiving, the processing or the transmitting is performed at least partly using one or more processing devices.

45. A method comprising:
 receiving one or more projection parameters that include a request for projection at one or more specified times by one or more individuals, the one or more parameters selecting one or more projectors for projection of content that is selected by the one or more individuals;
 processing the one or more parameters to identify one or more projection surfaces that are available for projection at the one or more specified times and to generate one or more instructions to project the selected content at the one or more specified times from the one or more projectors that are selected by the one or more individuals onto the identified one or more projection surfaces;
 transmitting the one or more instructions; and
 wherein at least one of the receiving, the processing or the transmitting is performed at least partly using one or more processing devices.

\* \* \* \* \*